(12) United States Patent
Brown

(10) Patent No.: US 10,271,651 B1
(45) Date of Patent: Apr. 30, 2019

(54) CONTAINER STORAGE APPARATUS AND SYSTEM

(71) Applicant: Daniel Everett Brown, Chowchilla, CA (US)

(72) Inventor: Daniel Everett Brown, Chowchilla, CA (US)

(*) Notice: Subject to any disclaimer, the term of this patent is extended or adjusted under 35 U.S.C. 154(b) by 0 days.

(21) Appl. No.: 15/657,073

(22) Filed: Jul. 21, 2017

Related U.S. Application Data

(63) Continuation-in-part of application No. 15/655,679, filed on Jul. 20, 2017, which is a continuation-in-part
(Continued)

(51) Int. Cl.
| | |
|---|---|
| *A47B 96/06* | (2006.01) |
| *A47B 96/07* | (2006.01) |
| *F16M 11/04* | (2006.01) |
| *F16M 13/02* | (2006.01) |
| *B65D 88/00* | (2006.01) |

(Continued)

(52) U.S. Cl.
CPC ............ *A47B 96/067* (2013.01); *A47B 96/07* (2013.01); *F16M 11/041* (2013.01); *F16M 13/027* (2013.01); *B65D 5/5206* (2013.01); *B65D 88/005* (2013.01); *B65D 88/027* (2013.01)

(58) Field of Classification Search
CPC .. F16M 13/027; F16M 11/041; A47B 96/066; A47B 96/07; A47B 96/067; A47B 96/061; A47B 43/003; A47B 47/0081; A47B 87/007; A47B 88/04; A47B 88/18; A47B 88/0407; B65D 5/50; B65D 5/5206; B65D 88/027; B65D 88/005; A47F 5/08; A47F 5/0838; A47F 5/0876; A47F 5/0861; A47F 1/128; A47F 5/0869; A47F 5/0823; A47F 5/0006; A47F 7/143; A47F 1/126; A47F 5/0892; B25H 3/00; E05B 69/006
See application file for complete search history.

(56) References Cited

U.S. PATENT DOCUMENTS 2,823,056 A * 2/1958 Di Meo .................... F16L 3/26
403/376
2,865,697 A 12/1958 Staley
(Continued)

OTHER PUBLICATIONS

The Family Handyman, "Create a Sliding Storage System on the Garage Ceiling", Internet, Feb. 29, 2016, United States.

*Primary Examiner* — Ko H Chan
(74) *Attorney, Agent, or Firm* — Richard A. Ryan

(57) ABSTRACT

An apparatus and system for removably storing a storage container in an area having one or more overhead area supports so as to position the container below the area supports and above the floor of the area. The apparatus has a support rail that mounts to the area supports and a container engaging section that securely holds the container. The container engaging section has a static support assembly and a dynamic support assembly defining a container space for the container. The static support assembly engages one lip of the container. The dynamic support assembly has a dynamic support that connects to a moving mechanism so it will move along the support rail to engage an opposing lip of the container. A biasing mechanism biases the dynamic support toward the static support assembly to secure the container. The support rail can have a channel that encloses the biasing and moving mechanisms.

22 Claims, 35 Drawing Sheets

Related U.S. Application Data of application No. 15/134,534, filed on Apr. 21, 2016, now Pat. No. 9,685,366, which is a continuation-in-part of application No. 15/060,166, filed on Mar. 3, 2016, now Pat. No. 9,737,144.

(51) Int. Cl.
*B65D 88/02* (2006.01)
*B65D 5/52* (2006.01)

(56) References Cited

U.S. PATENT DOCUMENTS

| | | | | |
|---|---|---|---|---|
| 3,331,645 | A | 7/1967 | Vercellotti | |
| 3,433,446 | A | 3/1969 | Meder | |
| 3,528,718 | A | 9/1970 | Braun | |
| 4,289,292 | A | 9/1981 | Kunjumon | |
| 4,413,801 | A * | 11/1983 | Lancaster | E06C 5/24 224/405 |
| 4,527,694 | A | 7/1985 | Bolt | |
| 4,576,319 | A * | 3/1986 | Brown | B60R 11/00 224/538 |
| 4,699,438 | A | 10/1987 | Genereaux | |
| 4,738,369 | A | 4/1988 | Desjardins | |
| 5,039,902 | A | 8/1991 | Schwarz | |
| 5,242,219 | A | 9/1993 | Tomaka | |
| 5,277,463 | A * | 1/1994 | Singh | E21B 19/06 294/103.1 |
| 5,316,244 | A * | 5/1994 | Zetena, Jr. | G02B 6/4459 174/95 |
| 5,441,322 | A * | 8/1995 | Jobmann | B66C 1/422 294/103.1 |
| 5,484,125 | A | 1/1996 | Anoszko | |
| 5,520,291 | A | 5/1996 | Graham | |
| 5,649,751 | A | 7/1997 | Longhurst | |
| 5,725,293 | A | 3/1998 | Wilkening | |
| 5,749,479 | A | 5/1998 | Belokin | |
| 5,964,359 | A | 10/1999 | Marino | |
| 6,056,378 | A | 5/2000 | Semon | |
| 6,250,655 | B1 * | 6/2001 | Sheeks | B62B 1/268 280/47.18 |
| 7,597,203 | B2 | 10/2009 | Jasnly | |
| 7,681,853 | B2 * | 3/2010 | Trusty | E06C 1/005 182/127 |
| 7,762,636 | B2 | 7/2010 | Veeser | |
| 7,895,955 | B2 | 3/2011 | Ferder | |
| 8,622,493 | B2 | 1/2014 | Roeck | |
| 8,782,962 | B1 | 7/2014 | Schoewe | |
| 8,800,785 | B2 | 8/2014 | Kalafut | |
| 8,851,306 | B2 | 10/2014 | Spun | |
| 9,138,077 | B2 | 9/2015 | Found | |
| 9,290,293 | B2 | 3/2016 | Tilton | |
| 2004/0020915 | A1 | 2/2004 | Shei | |
| 2006/0201899 | A1 | 9/2006 | Lin | |
| 2008/0011928 | A1 | 1/2008 | Adrian | |
| 2008/0036341 | A1 | 2/2008 | Nilsen | |
| 2015/0167356 | A1 | 6/2015 | Leyden | |

* cited by examiner

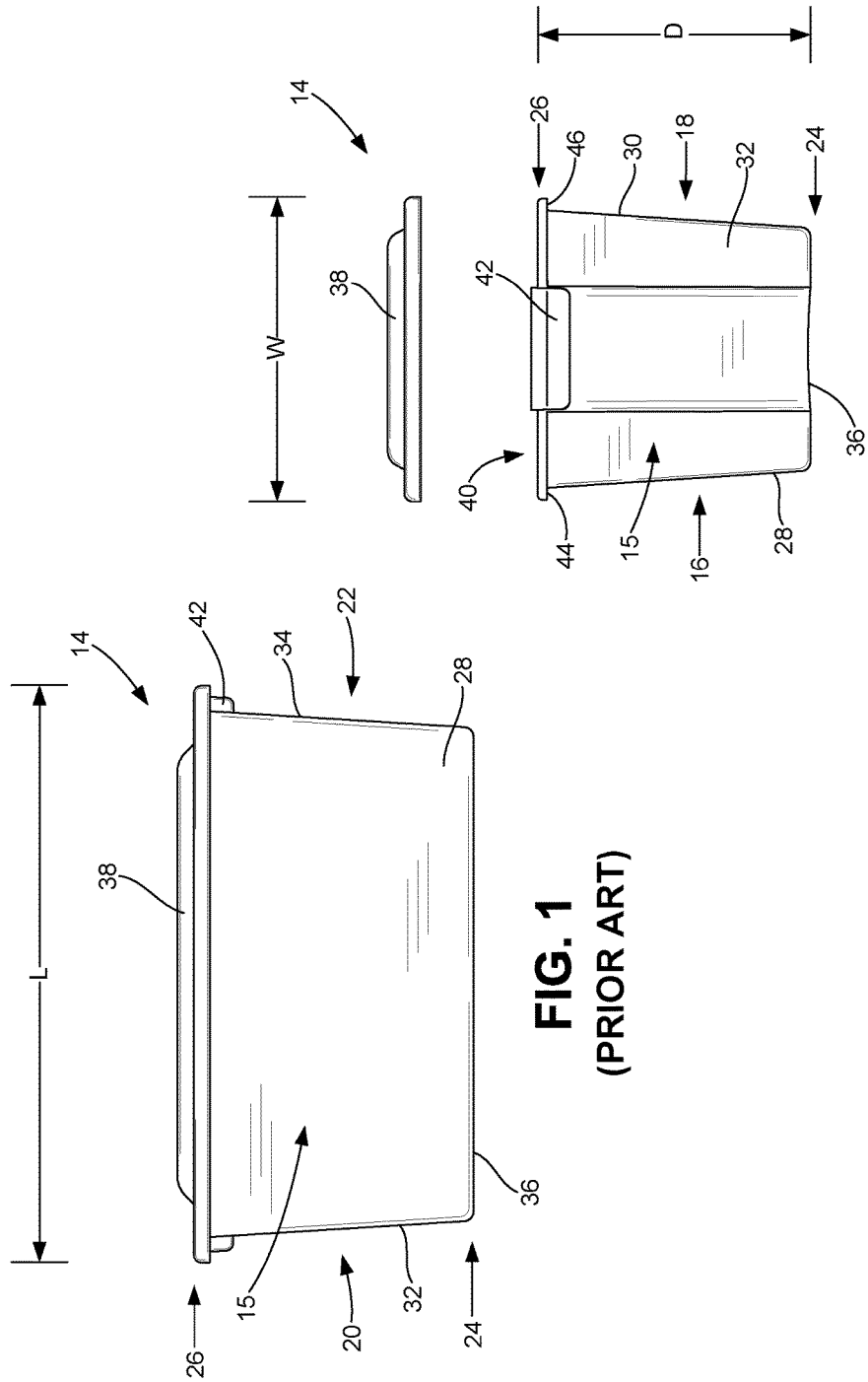

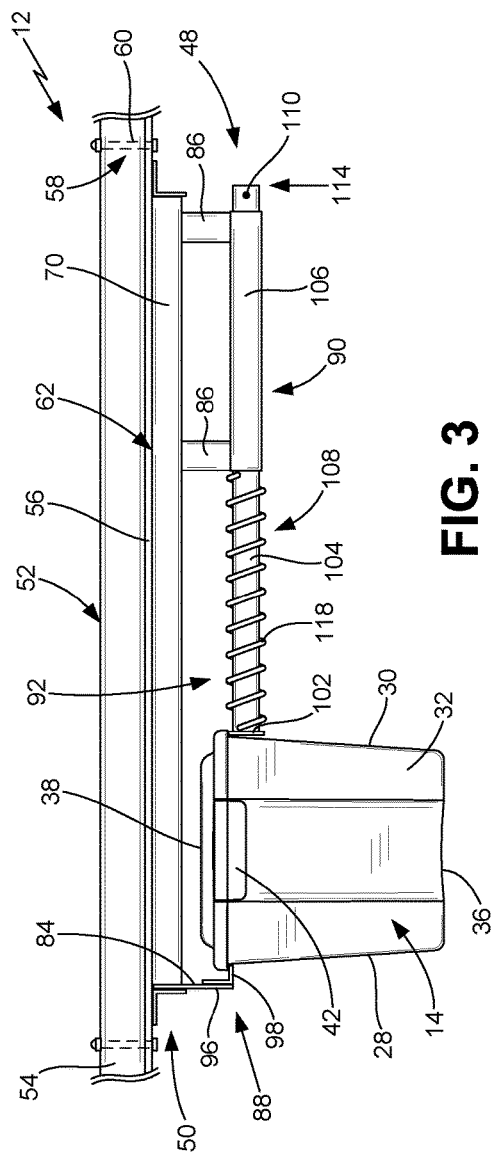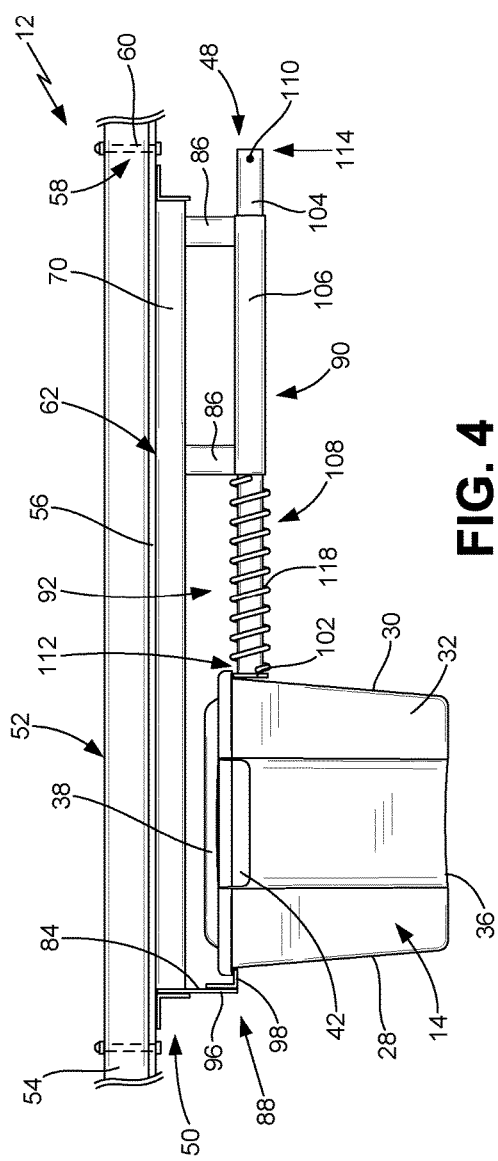

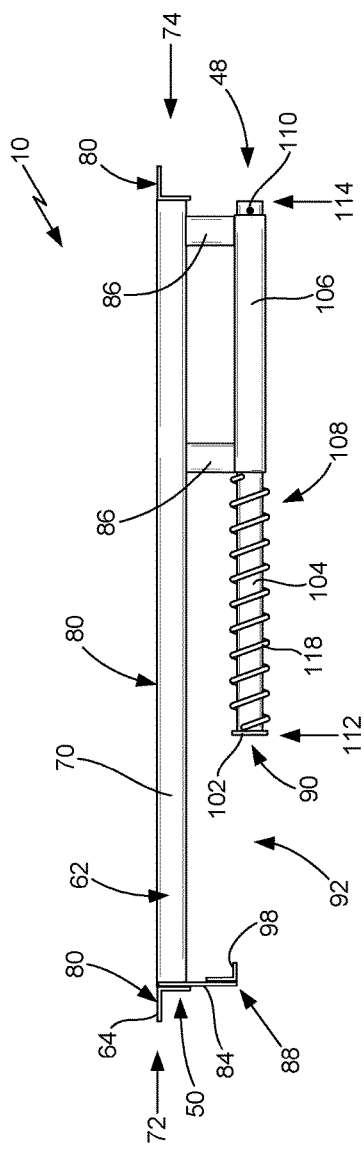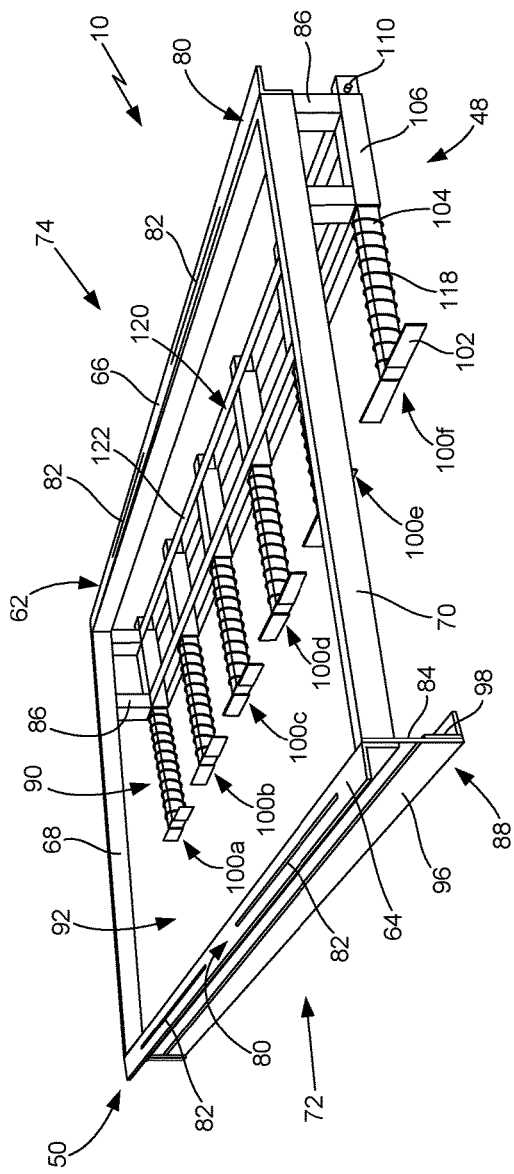

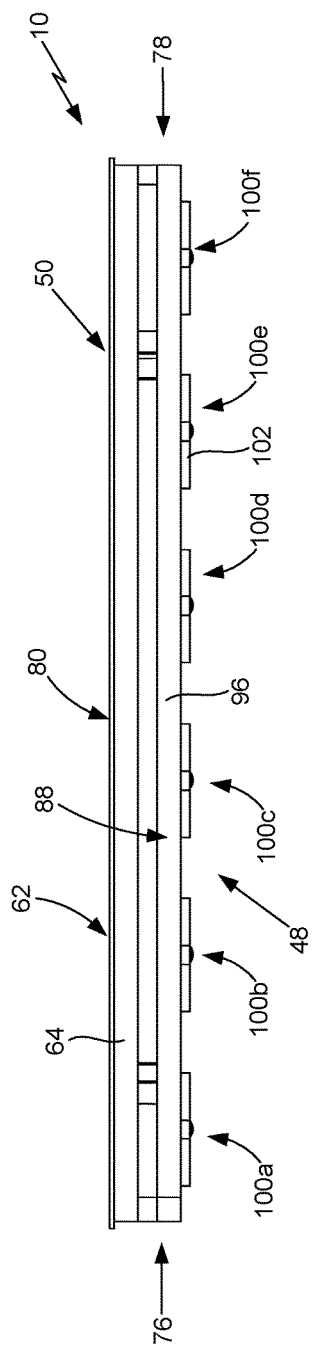
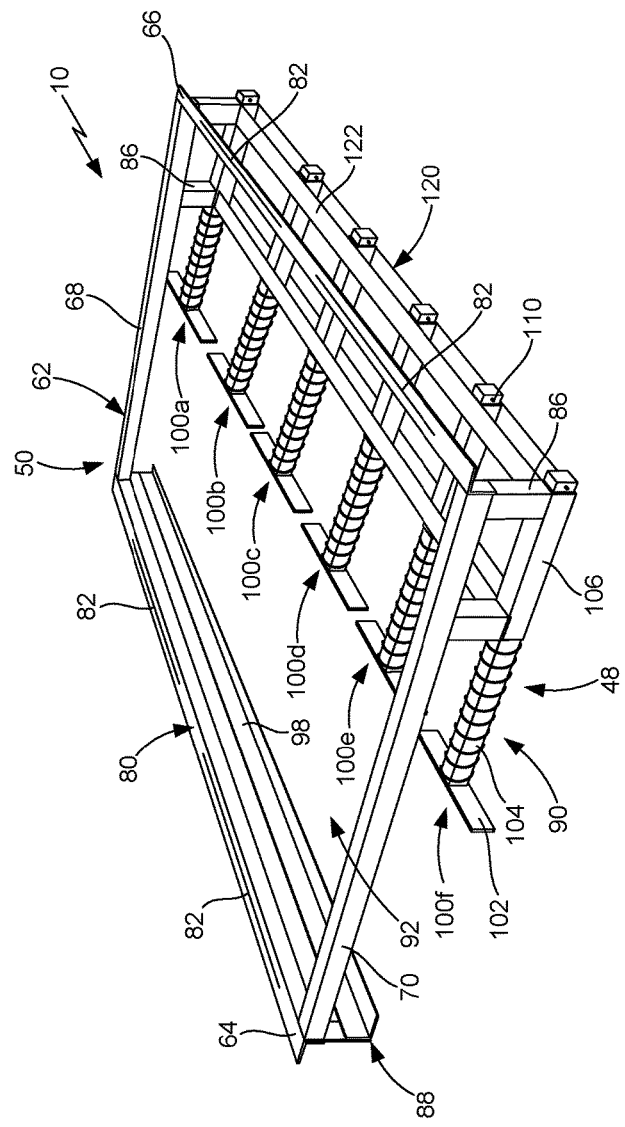

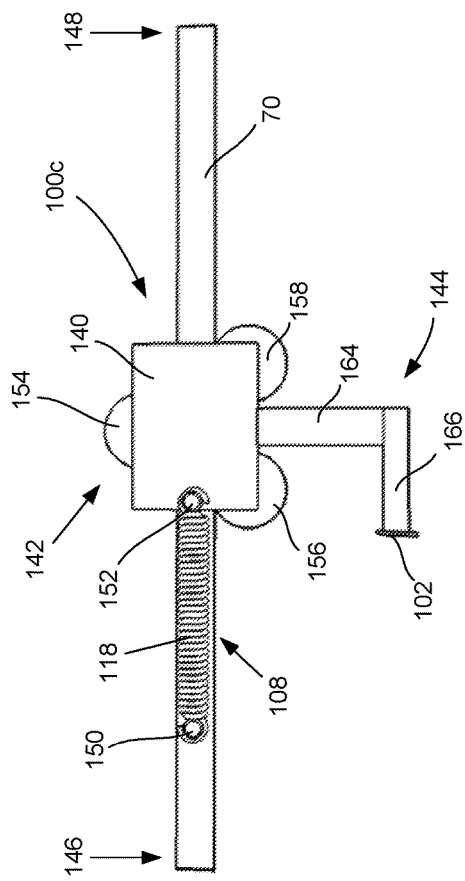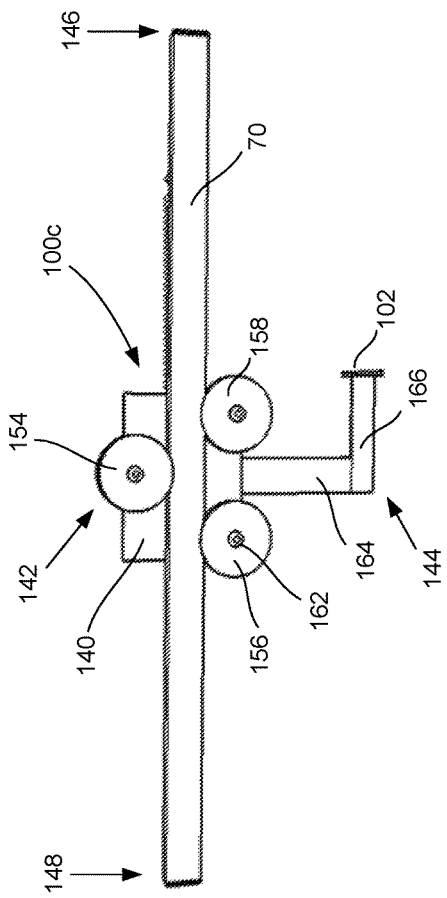

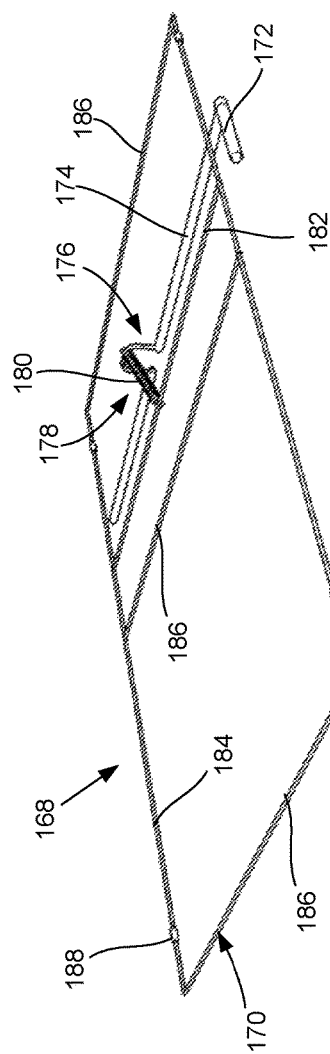
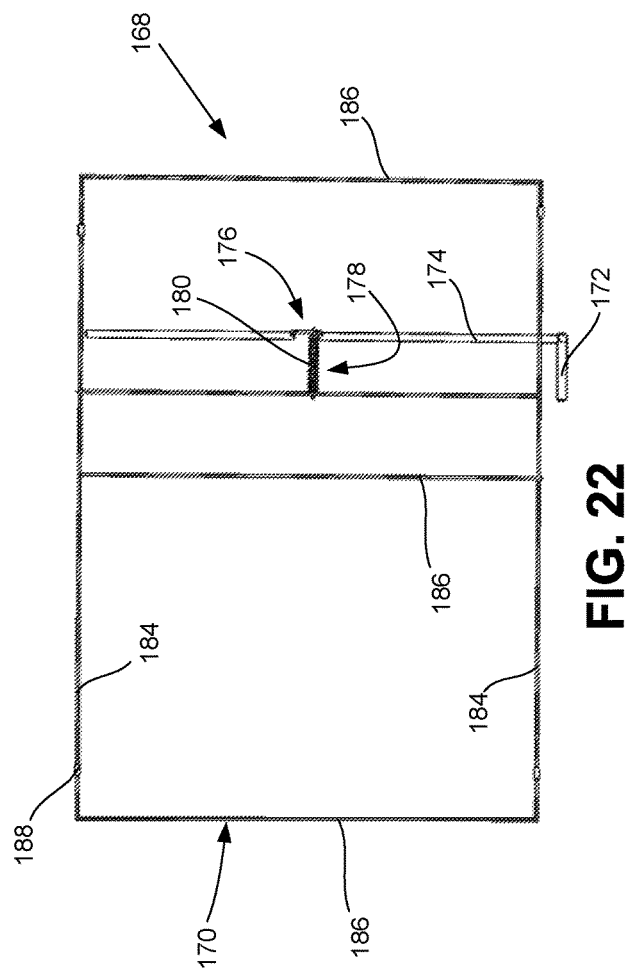
FIG. 21
FIG. 22

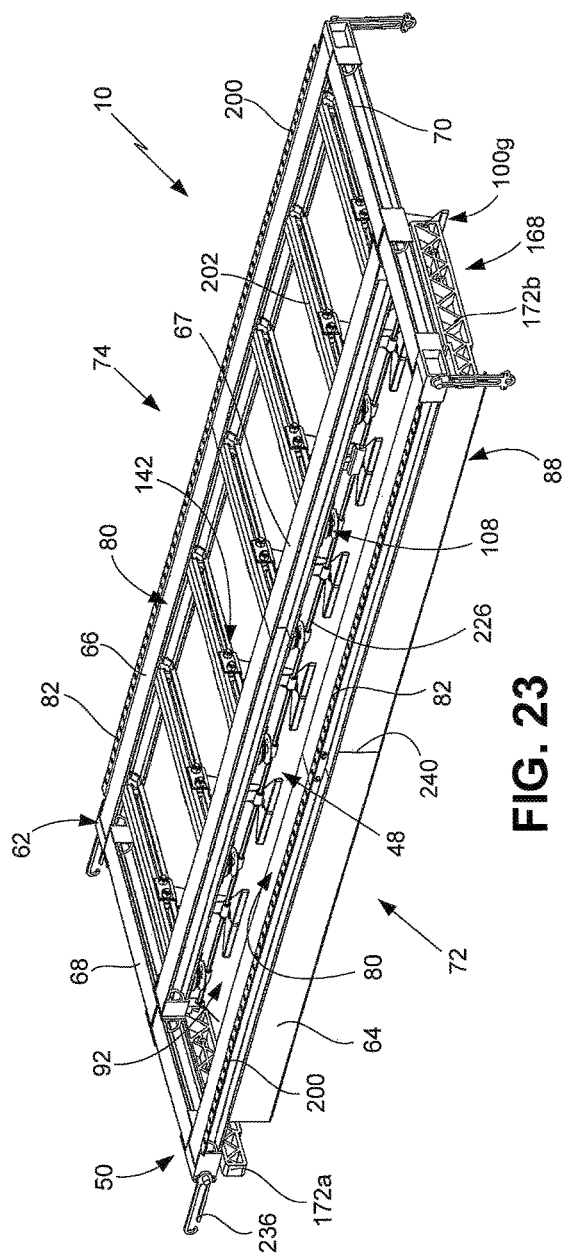
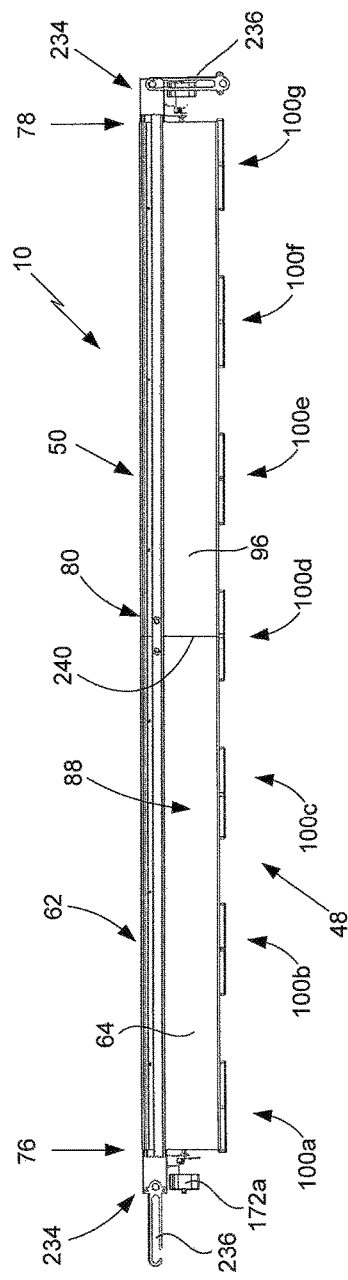
FIG. 23
FIG. 24

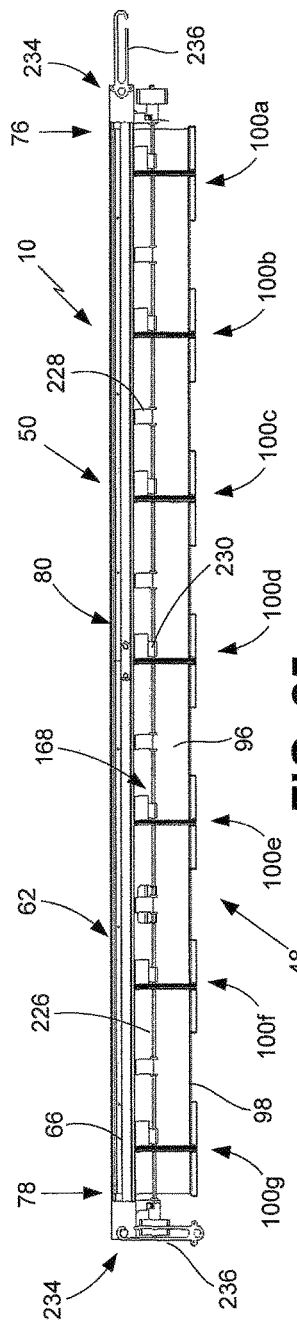
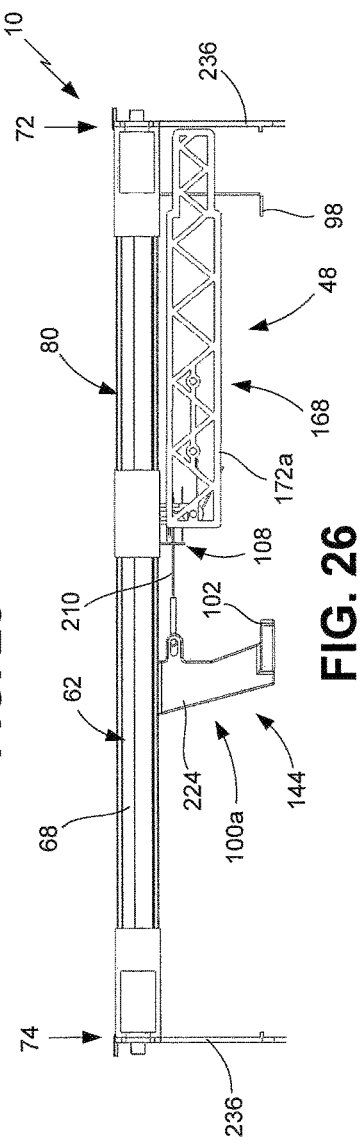
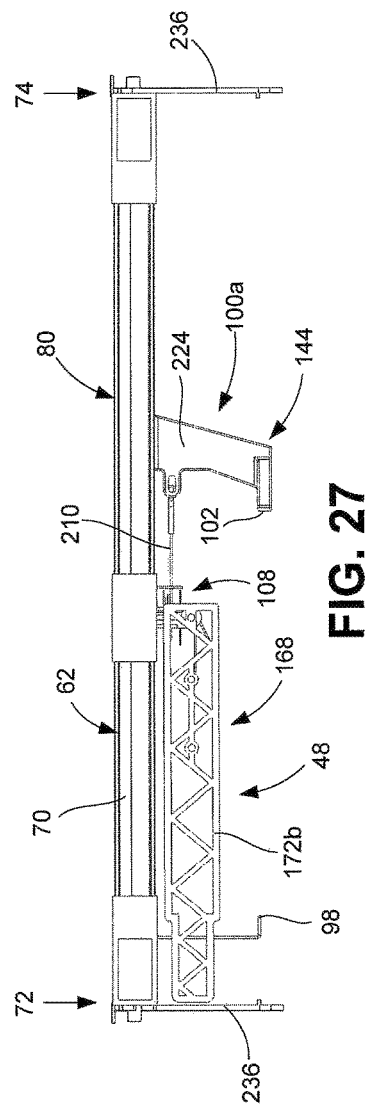
FIG. 25
FIG. 26
FIG. 27

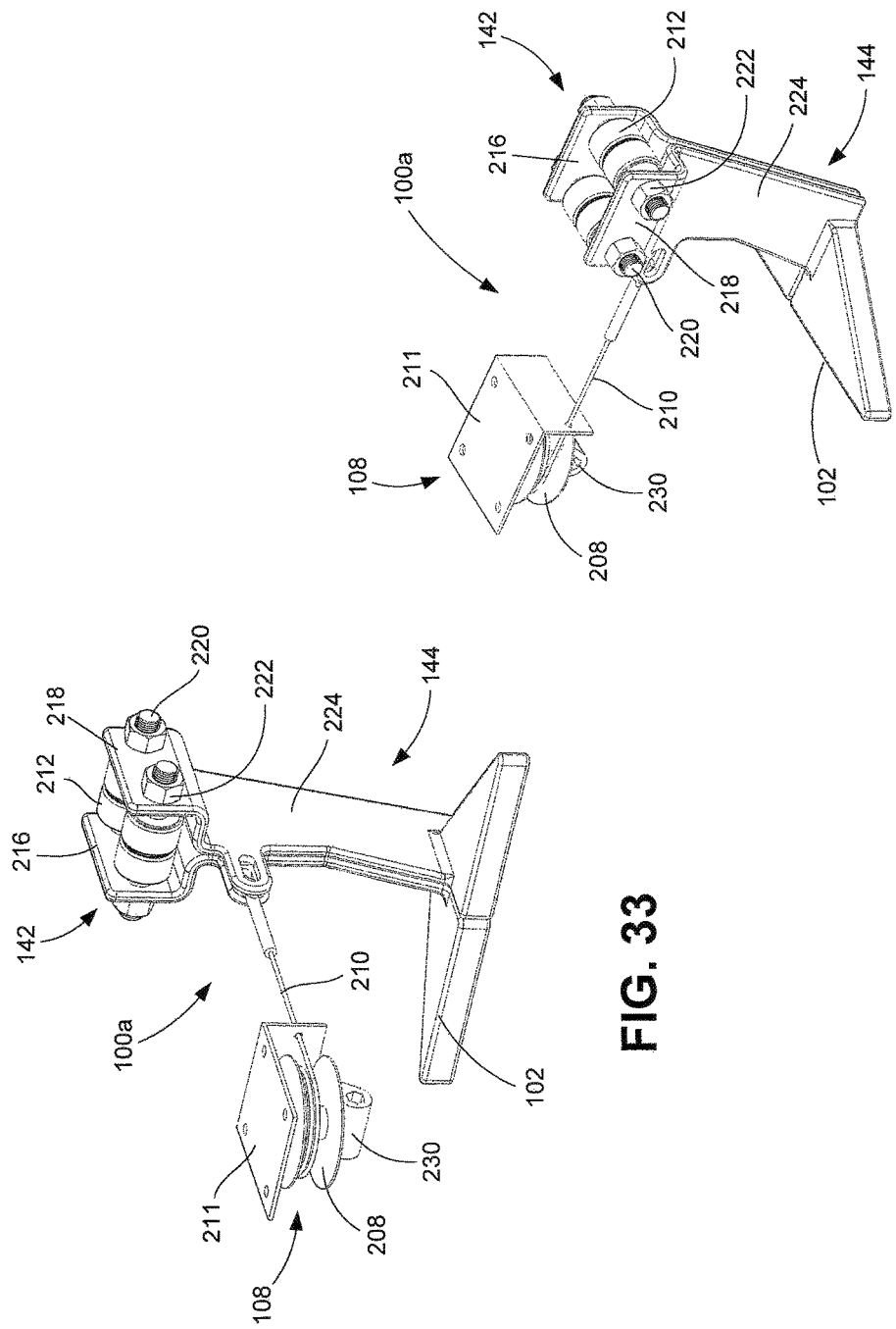

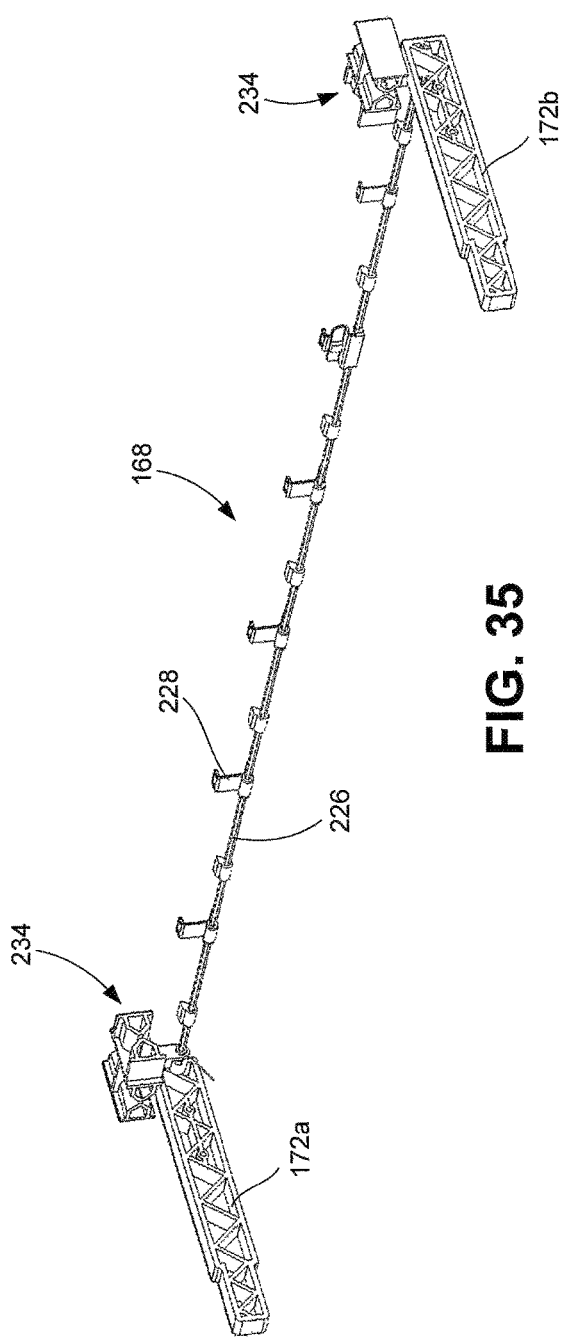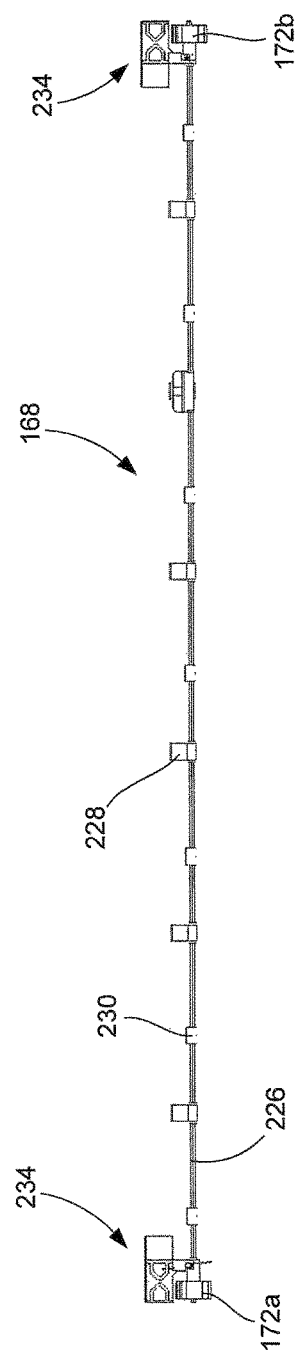

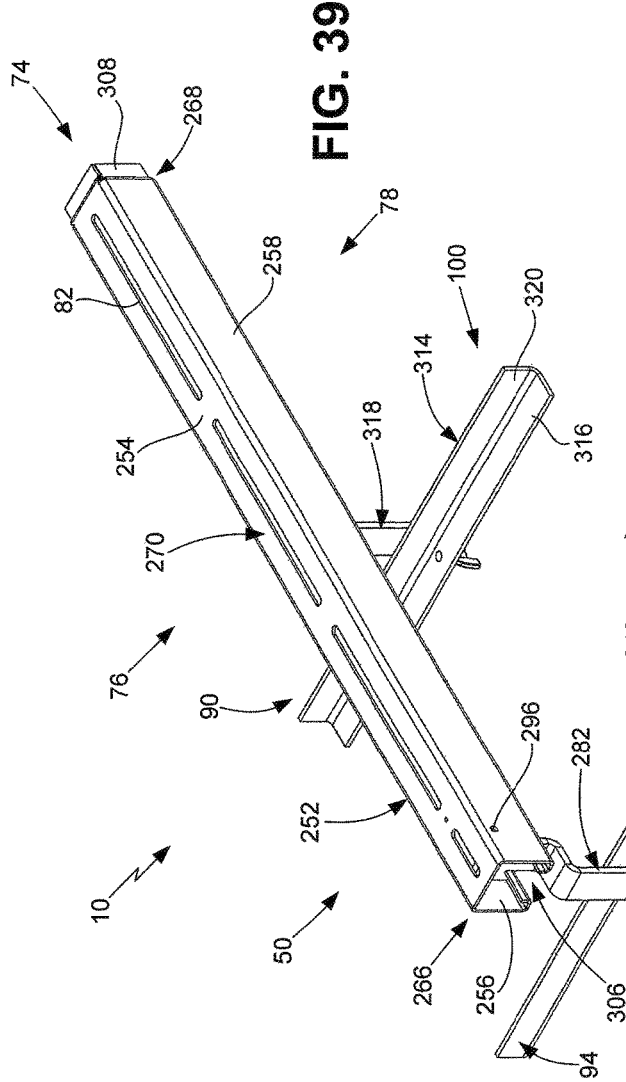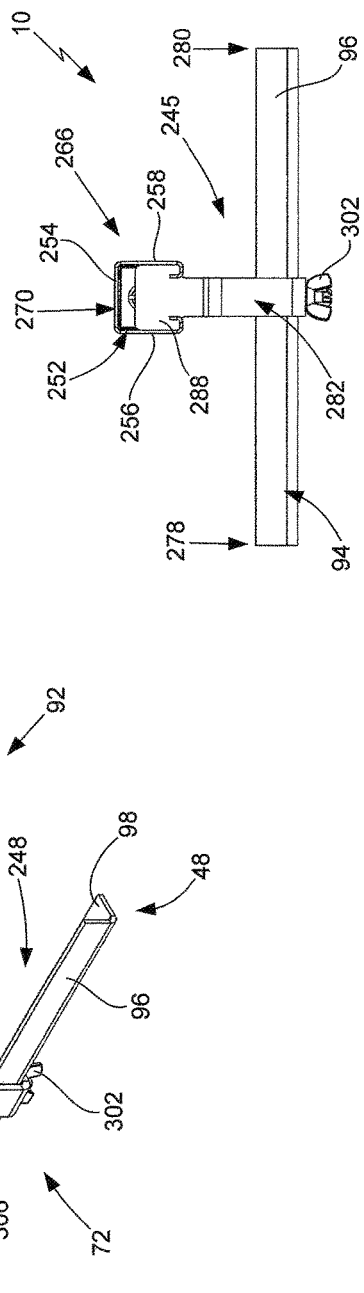

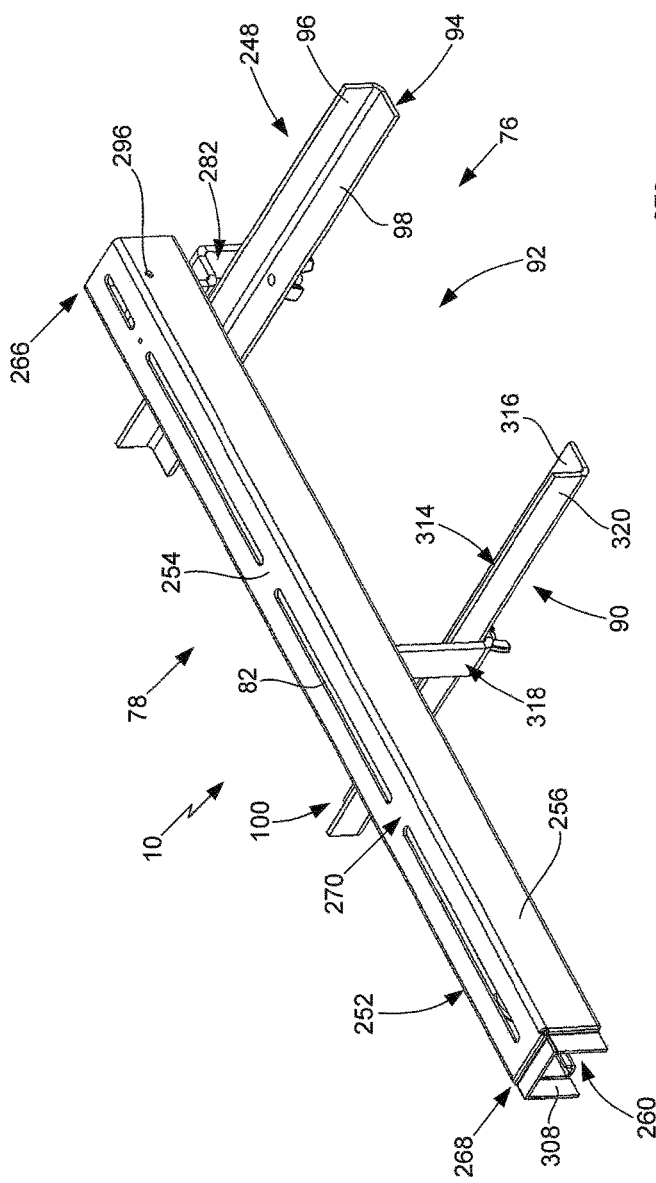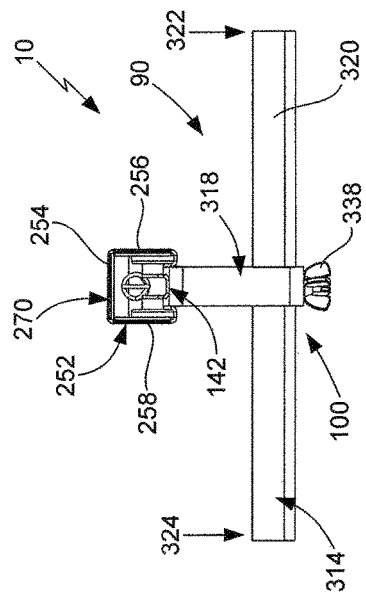

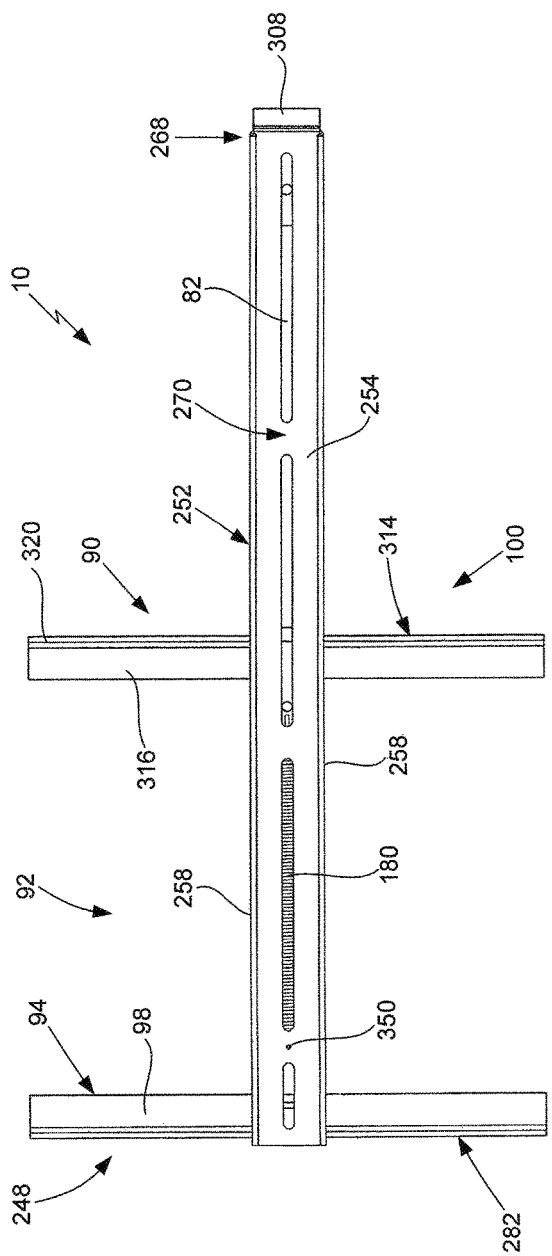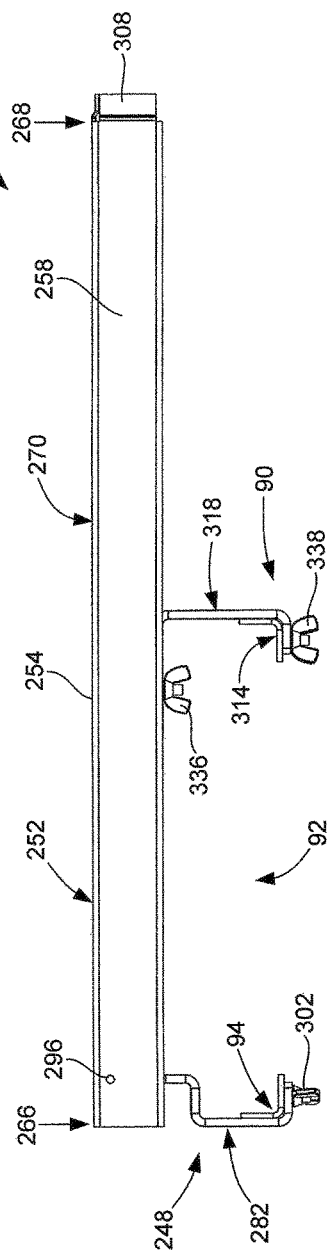
FIG. 43
FIG. 44

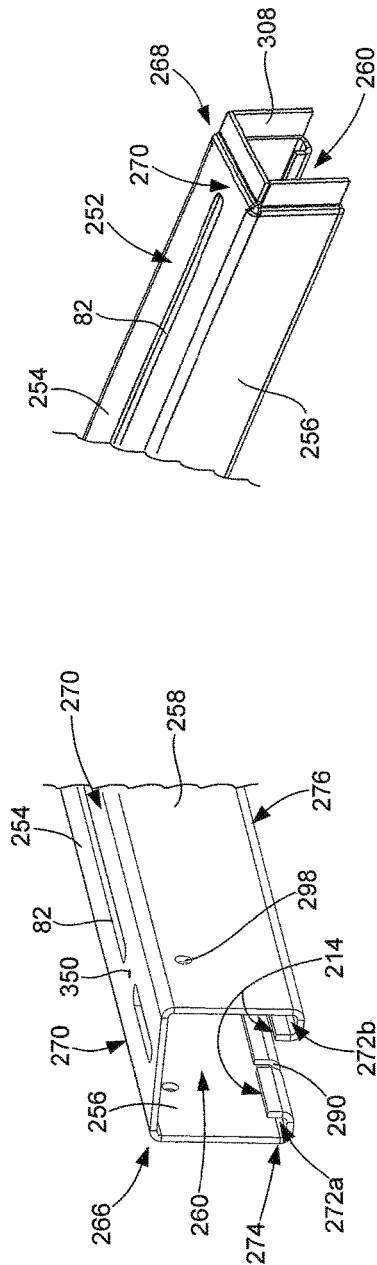
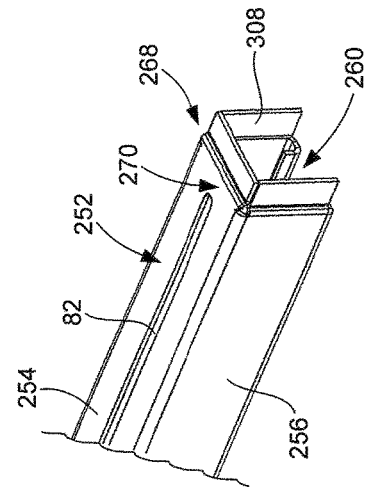
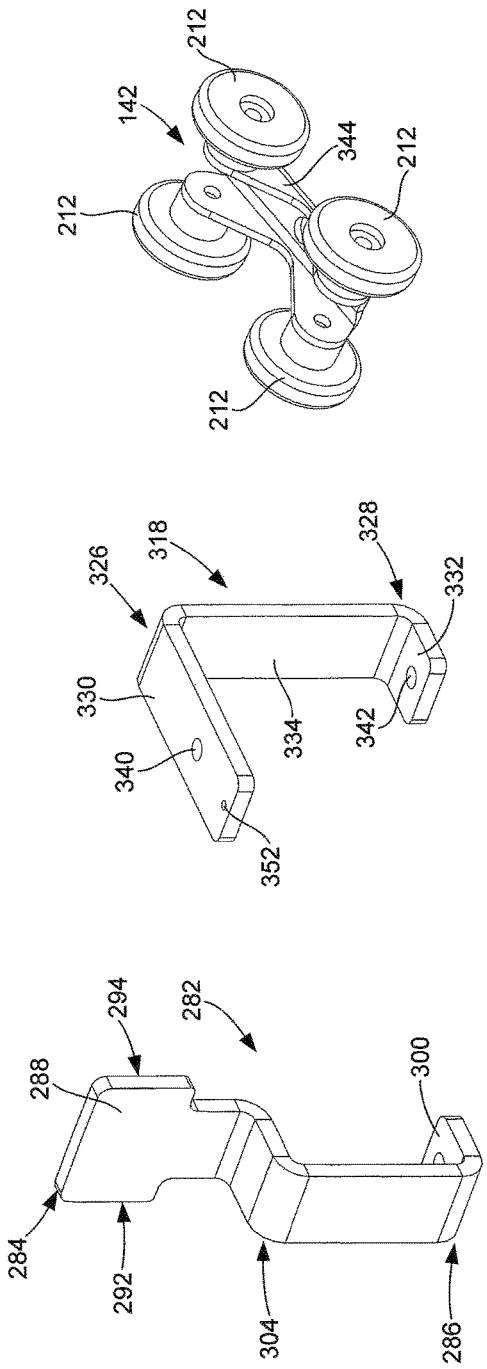
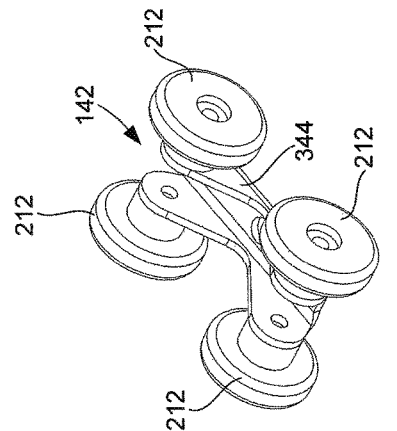
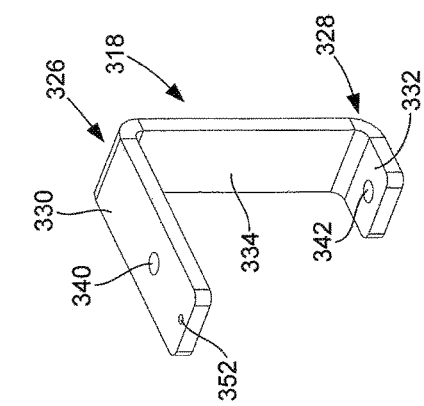

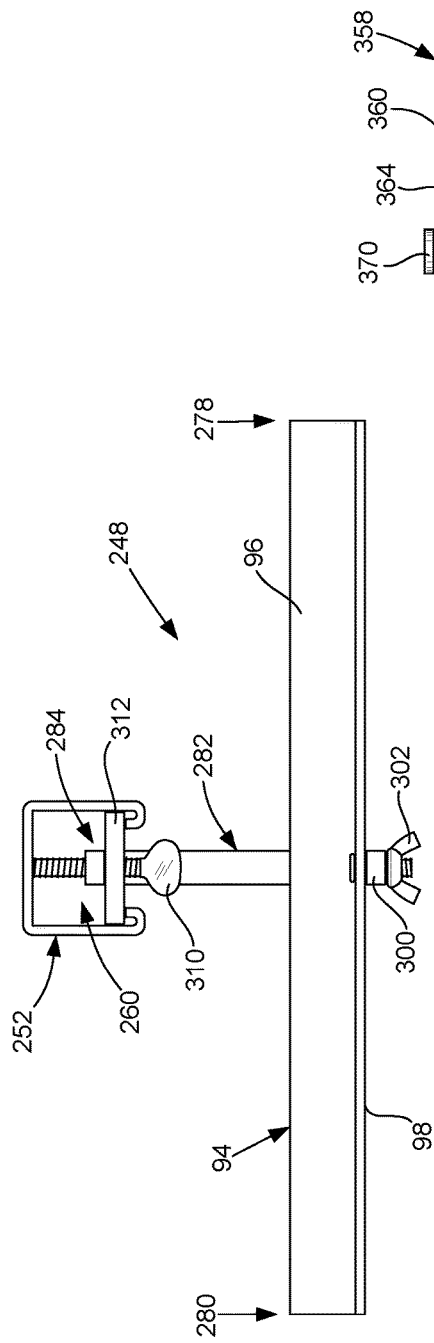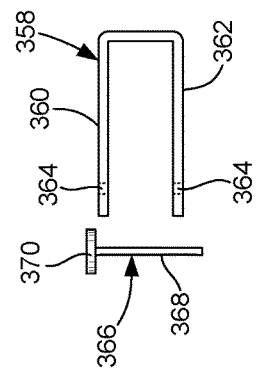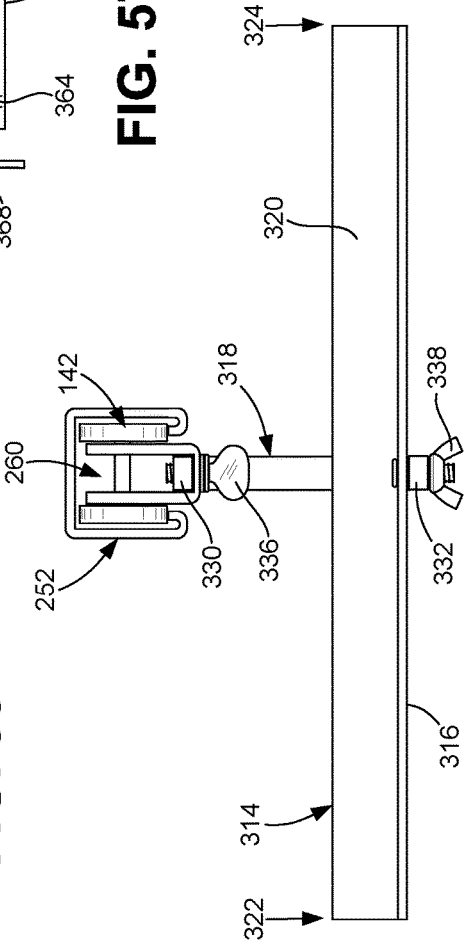

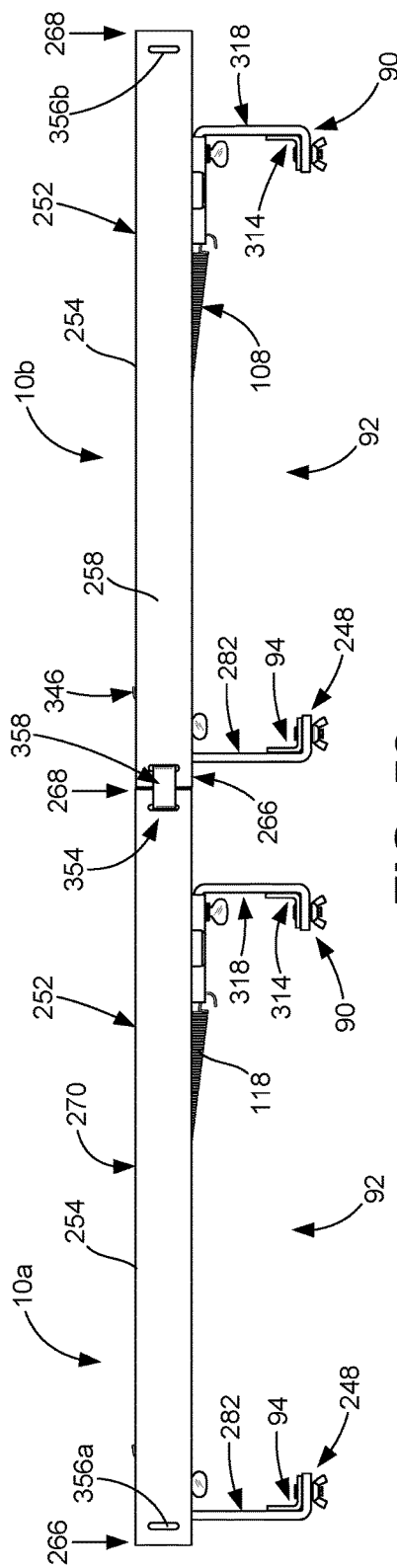
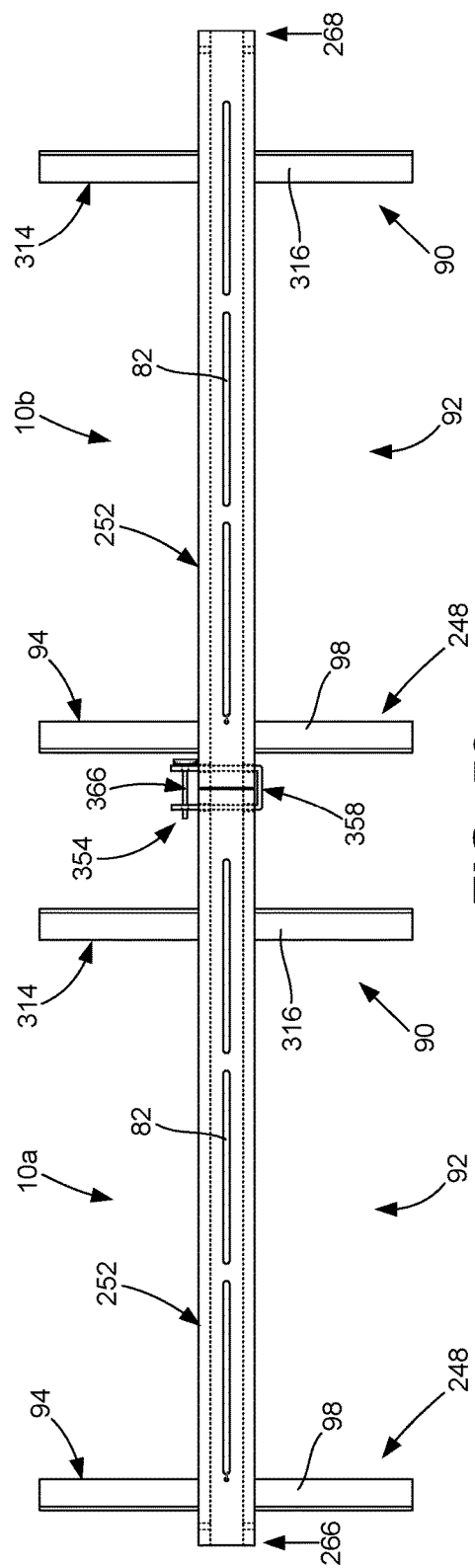
FIG. 58
FIG. 59

US 10,271,651 B1

CONTAINER STORAGE APPARATUS AND SYSTEM

CROSS-REFERENCE TO RELATED APPLICATIONS

This patent application is a continuation-in-part of U.S. patent application Ser. No. 15/655,579 filed Jul. 20, 2017, which is a continuation-in-part of U.S. patent application Ser. No. 15/134,354 filed Apr. 20, 2016, which issued Jul. 25, 2017 as U.S. Pat. No. 9,714,738, which is a continuation-in-part of U.S. patent application Ser. No. 15/060,166 filed Mar. 3, 2016.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to apparatuses and systems that are utilized to store containers. In particular, the present invention relates to such storage apparatuses and systems that are configured to removably store one or more containers in a manner which allows a person to easily place containers in the apparatus or remove one of the containers from the apparatus. Even more particularly, the present invention relates to such container storage apparatuses and systems that are configured to store different sizes of containers at the same time.

B. Background

Many people utilize storage containers to store items, particularly a plurality of items that would otherwise be loose in a closet, garage, room or other area. Typically, but not always, the items which are stored in a storage container are items that the person does not need to have access to on a daily or even regular basis. For instance, items commonly stored in a storage container may include Christmas or other holiday decorations, camping gear, tools, hobby or craft materials, family memory items, old or seasonal clothes, school papers and the like. These storage containers, and the items stored therein, are often stacked or otherwise placed in a garage or storage shed in a manner where they are intended to be at least generally out of the person's way of using the garage or storage shed for storing other, typically larger, items such as vehicles, lawnmowers, bicycles and the like. Unfortunately, as generally well known by persons who have and utilize storage containers, the containers are often in the way of what he or she needs to accomplish or to access in the location.

The typical storage container has a container body with one or more sidewalls and bottom wall and a lid that is secured to the container to define an interior chamber where the items are stored. A typical storage container has a plurality of sidewalls that are configured in a square or, perhaps more commonly, a rectangular shape. The lid may be of the type that is removably attached to the container body or of the type that is pivotally attached to one or more of the sidewalls. Storage containers may be made of a wide variety of materials, with hard plastic perhaps being the most commonly utilized material. One type of storage container is commonly referred to as a "storage tote" or simply a "tote". Storage totes are typically made out of hard plastic and are rectangularly shaped. Some storage totes have a removable lid that snaps onto the top of the sidewalls. Others have a pair of hinged lid members that pivot closed to form the lid or open to allow access to the interior chamber. One feature of storage totes is that they are generally structured and arranged with sloping sidewalls that result in a smaller cross-section near the bottom wall than the top of the sidewalls so they may be easily stacked on top of each other. Another feature of storage totes is that they have an overhanging lip on the top of at least two of the opposing sidewalls, often the long sidewalls.

As set forth above with storage containers in general, storage totes can be relatively easily stacked on the floor of a garage or a shed. However, many people prefer to place the storage totes above the floor so the floor can be utilized to park a car, stand a bicycle, have a workshop and the like and to be able to more easily move around inside the garage or shed. One manner of supporting the storage totes or other containers above the floor is to place the storage containers on one or more shelves which are either freestanding or securely attached to the walls of the garage or shed. As well known, the freestanding shelves also take up some of the same floor space, although generally less than the storage containers themselves, that would be lost to stacking the containers on the floor. Shelves that are attached to the wall are generally either not adequate for supporting the weight of the containers and the items stored therein or they require a relatively complex and well-built shelving system to support the containers. Another common storage system for storage totes and other storage containers is to place the storage totes on a "drop-down" platform that is, typically, supported from the ceiling or roof of the garage or shed. As with the wall-attached shelves, any platform that will be supporting a plurality of storage containers must be sufficiently well-built to be able to safely support the anticipated load from the containers and the items stored in the containers. Another limitation with platform storage systems, particularly those where one or more layers of containers may be placed more than one row deep, is that when a person wants or needs certain items in a container he or she may have to move multiple containers in order to get to the desired container. This difficultly can be somewhat compounded by the fact that most platform systems require the user to stand on a ladder or other apparatus when placing, moving or removing containers from the platform.

A more recent innovation with regard to storing storage containers, particularly storage totes, is the use of an "I-beam" storage system comprising a pair of spaced apart I-shaped support members (though L-shaped and Z-shaped) members can also be utilized). The I-shaped support members have an upper flange that is attached to the ceiling, roof or roof joists and a lower flange that is utilized to removably support the storage containers. The two support members are supported from above in a manner such that the inwardly facing lower flanges thereof are spaced apart a distance selected so a lip on each of the opposing sides of the tote container will be supported by one of the inwardly facing lower flanges of the I-beams. In effect, the facing lower flanges of the two I-beams function as rails on which the opposite facing lips of one or more storage totes are slid onto and supported. As will be readily appreciated by persons who are familiar with I-beam systems, the use of the system requires careful positioning of the two I-beam support members so that the inwardly facing lower flanges are properly spaced apart from each other to receive the outward extending lips of the storage totes, which typically only extend approximately an inch or so from the sidewalls. If the two support members are too close, the totes will not fit between the lower flanges of the support members. If the two support members are too far apart, the lower flanges will not be able to support the totes. As such, a person installing an I-beam system, or like support members, must carefully measure the distance between the two lips of the storage totes and carefully position the support members on the ceiling, roof or roof beams.

While the above support member systems have significant benefits with regard to positioning the storage totes and like containers off of the floor and generally out of the way, they do have limitations that have prevented their wide use. One major limitation of these systems, no matter whether the support members are I-shaped, L-shaped or Z-shaped, is that once the pair of support members are in place, the system can only be utilized for the particular width of storage tote for which the spacing was measured. This either requires the person to have totes with all of the same width, which is not typical due to different manufactures having different sizes, or to purchase a new set of totes that are all of the same size. Another limitation to such systems is that once a plurality of totes are placed on the inwardly facing lower flanges of the support members, the user will usually have to remove one or more of the totes to get to the tote in which the items he or she wants are stored. This requires the person to slide off each of the "wrong" totes to get to the "correct" tote and then place all of the removed totes back onto the support members. Depending on the number of totes being supported by the support member system, this could take considerable effort if the desired tote is positioned in a location where there are many other totes that must first be removed. Another limitation for such systems is that the I-beams must be positioned where there is sufficient space at one end of the system to place the containers on the I-beams. If the both ends of the I-beam system are too close to a wall or other structure, the system will not work because a person will not be able to place containers on the I-beams.

What is needed, therefore, is an improved apparatus and system for receiving and storing storage containers that overcomes the limitations and solves the issues with regard to presently available container storage apparatuses and systems. More specifically, what is needed is an improved storage apparatus and system that is structured and arranged to support a plurality of storage totes or like containers that allow different sized containers to be placed in the same apparatus, allow a person to more easily remove one particular container from a plurality of containers stored in the apparatus and allows the system to be placed close to a wall or other structure. The improved storage apparatus and system should be configured to removably support a plurality of tote or like containers that each have outwardly disposed lips on at least opposite facing sidewalls of the container. The apparatus should be structured and arranged to support the tote containers by the lips thereof. The improved apparatus and system should be structured and arranged to be supported by the ceiling, roof or roof joists such that the storage totes or like containers are positioned off of the floor of the garage, shed or other area, including closets or other rooms inside of a house or other structure. Preferably, the new storage apparatus and system should be relatively easy to install, easy to use and inexpensive to manufacture.

SUMMARY OF THE INVENTION

The container storage apparatus and system of the present invention provides the benefits and solves the problems identified above. That is to say, the container storage apparatus and system of the present invention is structured and arranged to support a plurality of storage totes or like containers that have outward extending lips on opposite sidewalls of the container by the engaging the opposite side lips of each container. The new apparatus and system is configured to allow use of different widths and lengths of tote containers to be placed in the apparatus and is configured so a person may easily remove one particular container from a plurality of containers that are stored in the apparatus. The new apparatus and system can be placed close to walls and other structures in the area without interfering with use of the structure and system. The apparatus comprises an upper mounting section and a lower container engaging section. The mounting section is structured and arranged to be easily mounted to the ceiling, roof or joists of a storage area, including garages, sheds, rooms, closets and like areas and to support the lower container engaging section and the storage containers, and the items stored therein, that are engaged by the lower section above the floor of the area where the totes are stored. The container engaging section is structured and arranged to adjustably support different widths and lengths of totes. As such, it will not be necessary for the user of the apparatus and system to purchase storage totes of the same size, particularly if that would require replacing the user's existing storage containers. The lower container engaging section is also structured and arranged to allow the user to easily remove one of the storage totes from a plurality of storage totes, even if the desired storage tote is in the center or at a closed end (i.e., near a wall or door) of the apparatus. In the preferred configurations, the new container storage apparatus and system are relatively easy to install, easy to use and inexpensive to manufacture.

In one embodiment of the apparatus of the present invention, the new container storage apparatus comprises a container engaging section and a mounting section that cooperate together to removably support a container below one or more area supports, such as a joist or ceiling. The container engaging section is structured and arranged to engage a first lip and a second lip of a container body of the storage container so as to position the storage container in a container space of the container engaging section, with the first lip and the second lip being on opposing walls of the container body. The container engaging section has a static container support member and a dynamic container support assembly in spaced apart relation to the static container support member so as to define the container space therebetween. The static container support member has a lip engaging member that is sized and configured to engagedly support the first lip of the container body. The dynamic container support assembly has a lower frame which supports one or more dynamic supports. Each of the dynamic supports has a lip engaging device, an insert member, a tubular receiver member and a biasing mechanism. The insert member is slidably received in an interior of the tubular receiver. The lip engaging device is attached to or integral with a first end of the insert member so as to dispose the lip engaging device in the container space, with the lip engaging device being sized and configured to engagedly support the second lip of the container body. The biasing mechanism is associated with the insert member to bias the lip engaging device toward the lip engaging member of the static container storage member in order to securely hold the storage container between the lip engaging member of the static container storage member and the lip engaging device of one of the dynamic supports so as to removably support the storage container in the apparatus. The biasing mechanism can be a spring that is disposed around the insert member between the first end of the insert member and the inwardly facing end of the tubular receiver member.

The mounting section has an upper frame that is structured and arranged to attach the apparatus to at least one of the one or more area supports. The upper frame is attached to or integral with the lower frame of the container engaging section so as to position the dynamic container support assembly in spaced apart relation to the static container support member and dispose the storage container below the area supports when the storage container is in the storage space. In a preferred embodiment, the upper frame is attached to the static container support member so as to fixedly support the lip engaging member of the static container support member in spaced apart relation to the lip engaging device of the dynamic container support assembly. The upper frame can comprise a first lateral frame member at a front side of the apparatus, a second lateral frame at a back side of the apparatus member and one or more transverse frame members interconnecting the first lateral frame member and the second lateral frame member so as to dispose the first lateral frame member in spaced apart relation to the second lateral frame member. Typically, two or more transverse frame members will be utilized. The static container support member is attached to or integral with at least one of the first lateral frame member and the transverse frame members. The lower frame is attached to or integral with at least one of the second lateral frame member and the transverse frame members. In a preferred configuration, the apparatus also has one or more front support posts and one or more back support posts, with the front support posts interconnecting the upper frame and the static container support member and the back support posts interconnecting the upper frame and the lower frame. The upper frame has a plurality of frame members, with at least one of the frame members having an upper surface that is configured to be attached to the area supports. The upper surface can have one or more slot apertures.

In a second embodiment of the apparatus of the present invention, the dynamic supports of the container storage apparatus are configured to move along the transverse frame members generally inside the area defined by the upper frame to provide a more compact apparatus. As with the embodiment set forth above, the apparatus comprises a container engaging section and a mounting section that cooperate together to removably support a container below one or more area supports, such as a joist or ceiling. The container engaging section is structured and arranged to engage a first lip and a second lip of a container body of the storage container so as to position the storage container in a container space of the container engaging section. The container engaging section has a static container support member and a dynamic container support assembly in spaced apart relation to the static container support member so as to define the container space therebetween. The static container support member has a lip engaging member that is sized and configured to engagedly support the first lip of the container body. The dynamic container support assembly has one or more dynamic supports, with each of the dynamic supports having a lip engaging device and a biasing mechanism. Each dynamic support is configured to dispose the lip engaging device in the container space. The lip engaging device is sized and configured to engagedly support the second lip of the container body. The biasing mechanism is configured to bias the lip engaging device toward the lip engaging member of the static container storage member to securely hold the storage container between the lip engaging member of the static container storage member and the lip engaging device of the dynamic supports to removably support the storage container in the apparatus.

The mounting section has an upper frame that is structured and arranged to attach the apparatus to at least one of the one or more area supports and to support the container engaging section below the area supports. The upper frame comprises a first lateral frame member at a front side of the apparatus, a second lateral frame member at a back side of the apparatus and one or more transverse frame members disposed between the first lateral frame member and the second lateral frame member. The second lateral frame member is disposed in spaced apart relation to the first lateral frame member. Each dynamic support moveably engages one of the transverse frame members so as to receive, hold and allow removal of the storage container in or from the container space. In one configuration, each dynamic support has a support plate, a moving mechanism associated with the support plate and a lip support assembly interconnecting the support plate and the lip engaging device. The moving assembly moveably mounts the support plate with a transverse frame member so as to move the lip engaging device toward or away from the lip engaging member. In a preferred configuration, the apparatus also has a locking system that is structured and arranged to engage the dynamic container support assembly and prevent movement of the dynamic supports along the transverse member so as to prevent removal of the storage container from the container space of the apparatus. In one configuration, the locking system has a locking frame that is associated with the upper frame, a shaft connected to the locking frame and a handle connected to the shaft. The locking system is configured to engage one or more of the dynamic supports to prevent movement of the dynamic support along the transverse member. In the preferred configuration of the apparatus, the dynamic container support assembly comprises a plurality of the dynamic supports so the new apparatus can be utilized to secure a plurality of containers.

In the third embodiment, the frame includes a central lateral frame member that extends across the width of the apparatus to interconnect the transverse frame members at the opposing sides of the apparatus. The dynamic container support assembly comprises a plurality of dynamic support rail assemblies, one for each dynamic support, along which the moving mechanism moves the dynamic support forward toward the static container support member and rearward away from the static container support member. In this embodiment, the moving mechanism comprises one or more track engaging devices, which may be wheels, rollers or the like, moveably disposed inside a track defined by the dynamic support rail assembly. Alternatively, the track may be disposed on the outside of the dynamic support rail assembly. The biasing mechanism of the third embodiment, which comprises a retractable cable wheel, is attached to the lip support assembly of the dynamic support (alternatively, it may connect directly to the moving mechanism). The retractable cable wheel connects to the dynamic support by a wire, cable or other elongated member that is retracted by the retractable cable wheel to bias the dynamic support towards the static container support member. The retractable cable wheel is configured to allow the user to push the dynamic support rearward when he or she desires to insert or remove a storage container. The locking mechanism of the third embodiment comprises a plurality of wheel engaging members, one for each retractable cable wheel, that are each configured to engage its associated retractable cable wheel to prevent rotation of the retractable cable wheel and, therefore, movement of the dynamic support forward or rearward, which locks the storage container in the container space. The wheel engaging members are rotated into engagement by handles at one or both sides of the apparatus that are pivoted to rotate a rod or other elongated locking member, to which the wheel engaging members are attached or integrally formed, to lock the retractable cable wheel (the biasing mechanism) and prevent movement of the dynamic support and, therefore, the lip engaging device that engages one of the lips of the storage container.

In the fourth embodiment of the apparatus of the present invention, the apparatus comprises a mounting section and a container engaging section. The mounting section comprises an elongated support rail that is structured and arranged to be securely attached to one or more area supports. In a preferred configuration, the support rail has a plurality of walls that define an interior channel in the support rail. The plurality of walls of the support rail includes an upper wall defining an upper mounting surface configured to be attached to at least one of the one or more area supports so as to position the support rail of the apparatus below the area supports. The container engaging section, which is attached to or integral with the mounting section, is structured and arranged to engage the container body so as to position the storage container in a container space of the container engaging section. The container engaging section has a static container support assembly and a dynamic container support assembly. The static container support assembly comprises a static support member that is attached to or integral with the support rail. The static support member has a lip engaging member which is sized and configured to engage either the first lip or second lip of the storage container when the storage container is positioned in the container space. The dynamic container storage assembly comprises a dynamic support that is moveably engaged with the support rail. The dynamic support is in spaced apart relation to the lip engaging member of the static container support assembly to define the container space therebetween. The dynamic support has a biasing mechanism, a moving mechanism and a dynamic support member. The biasing mechanism interconnects the dynamic support member and a stationary component, typically either the support rail or the static container support assembly in order to bias the dynamic support toward the static container support assembly. The moving mechanism, which is connected to the dynamic support member, is configured to moveably engage the support rail so as to move the dynamic support along the support rail when it is biased by the biasing mechanism toward the static container support assembly. Each of the static container support assembly and the dynamic container support assembly are structured and arranged to removably support the storage container in the container space below the support rail.

In a preferred configuration, the dynamic support member has a lip engaging member that is sized and configured to engagedly support one of the lips of the container body to securely hold the storage container between the lip engaging member of the static container storage assembly and the lip engaging member of the dynamic support member. The preferred configuration of the fourth embodiment also has a track that is disposed inside the interior channel of the support rail, with the moving mechanism having one or more track engaging devices that are structured and arranged to moveably engage the track to move in the interior channel of the support rail.

In one embodiment of the system of the present invention, the new container storage system comprises the above-described apparatuses, the area supports and a plurality of containers. In use, the apparatus is secured to the area supports and the containers are removably held by the apparatus with the bottom wall of the containers in spaced apart relation to a lower surface in the area.

Accordingly, the primary object of the present invention is to provide a new container storage apparatus and system that has the advantages discussed above and elsewhere in the present disclosure and, when utilized to store a plurality of storage containers, which overcomes the various disadvantages and limitations associated with presently available apparatuses and systems for storing containers.

It is an important objective of the present invention to provide a new storage container apparatus and system that is structured and arranged to support a plurality of storage totes or like containers which allows different sized containers to be placed in the same apparatus and allows a person to more easily remove one particular container from a plurality of containers from the apparatus.

An important aspect of the present invention is that it provides a new container storage apparatus and system that achieves the goals of the above-described objectives.

Another important aspect of the present invention is that it provides a new container storage apparatus and system that is structured and arranged to support a plurality of storage totes or like containers having outward extending lips on opposite sidewalls of the container by the engaging the opposite side lips of each container to support the containers above a floor.

Another important aspect of the present invention is that it provides a new container storage apparatus that is structured and arranged to allow use of storage containers that may have different widths and/or lengths and to allow a person to easily remove one particular storage container from a plurality of storage containers that are stored in the apparatus.

Another important aspect of the present invention is that it provides a new container storage apparatus that has an upper mounting section and a lower container engaging section, with the upper mounting section being structured and arranged to be mounted to the ceiling, roof or joists of a storage area and to safely support the lower container engaging section and storage containers above the floor and the lower container engaging section being structured and arranged to adjustably support different widths and lengths of storage containers in a manner which allows an individual container to be easily removed.

Yet another important aspect of the present invention is that it provides a new container storage apparatus and system that is relatively easy to install, easy to use and inexpensive to manufacture.

As will be explained in greater detail by reference to the attached figures and the description of the preferred embodiments which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. As will be readily understood and appreciated, the scope of the invention is only limited by the claims which follow after the discussion.

BRIEF DESCRIPTION OF THE DRAWINGS

In the drawings which illustrate the preferred embodiments and the best modes presently contemplated for carrying out the present invention:

FIG. 1 is a side view of a prior art storage tote container which may be utilized with the apparatus and system of the present invention;

FIG. 2 is an end view of the storage tote container of FIG. 1 with the lid removed to better show the lips on the opposing sidewalls of the container;

FIG. 3 is a right side view of a container storage system configured according to a first embodiment of the present invention shown in use storing a storage tote container configured as shown in FIG. 2;

FIG. 4 is a right side view of the container storage system of FIG. 3 shown in use with a wider storage container;

FIG. 5 is a side view of the apparatus of FIGS. 3 and 4;

FIG. 6 is a top front perspective view of the apparatus of FIG. 5 better showing the plurality of dynamic support members and the slots in the upper surface of the static support members;

FIG. 7 is a front view of the apparatus of FIG. 4;

FIG. 8 is a bottom side perspective of the apparatus of FIG. 4;

FIG. 18 is an isolated right side view of one of the dynamic support members shown movably mounted to a transverse frame member;

FIG. 19 is an isolated left side view of the dynamic support member of FIG. 18;

FIG. 21 is a top back perspective view of the locking assembly of FIG. 20;

FIG. 22 is a top view of the locking assembly of FIG. 21;

FIG. 23 is a top front perspective view of a container storage apparatus that is configured according to a third embodiment of the present invention;

FIG. 24 is a front view of the container storage apparatus of FIG. 23;

FIG. 25 is a back view of the container storage apparatus of FIG. 23;

FIG. 26 is a left side view of the container storage apparatus of FIG. 23;

FIG. 27 is a right side view of the container storage apparatus of FIG. 23;

FIG. 33 is a front perspective view of the first dynamic support of FIG. 30 shown without the dynamic support rail;

FIG. 34 is a rear perspective view of the first dynamic support of FIG. 33;

FIG. 35 is a front perspective view of the braking assembly of the container storage apparatus of FIG. 23;

FIG. 36 is a front view of the braking assembly of FIG. 35;

FIG. 39 is a top front perspective view of a first configuration of a container storage apparatus that is configured according to a fourth embodiment of the present invention, with the dynamic container support assembly biased by said biasing mechanism toward said static container support assembly;

FIG. 40 is a front view of the container storage apparatus of FIG. 39;

FIG. 41 is a top back perspective view of the container storage apparatus of FIG. 39;

FIG. 42 is a back view of the container storage apparatus of FIG. 39;

FIG. 43 is a top view of the container storage apparatus of FIG. 39;

FIG. 44 is a right side view of the container storage apparatus of FIG. 39;

FIG. 48 is a side perspective view of the first/front end of the support rail assembly;

FIG. 49 is a side perspective view of the second/back end of the support rail assembly;

FIG. 50 is a side perspective view of the static support bracket of the static container support assembly;

FIG. 51 is a side perspective view of the dynamic support bracket of the dynamic container support assembly;

FIG. 52 is a side perspective view of the moving mechanism of the dynamic container support assembly;

FIG. 55 is a back view of the static container support assembly of the container storage apparatus of FIG. 53;

FIG. 56 is a front view of the dynamic container support assembly of the container storage apparatus of FIG. 53;

FIG. 57 is a top view of a connector bracket and joining mechanism utilized to connect the container storage apparatus of FIG. 53 to a second container storage apparatus;

FIG. 58 is a side view of the container storage apparatus of FIG. 53 connected to a second container storage apparatus utilizing the connector bracket and joining mechanism of FIG. 57;

FIG. 59 is a top view of the connected container storage apparatuses of FIG. 58;

DETAILED DESCRIPTION OF THE PREFERRED EMBODIMENTS

Figure 9:
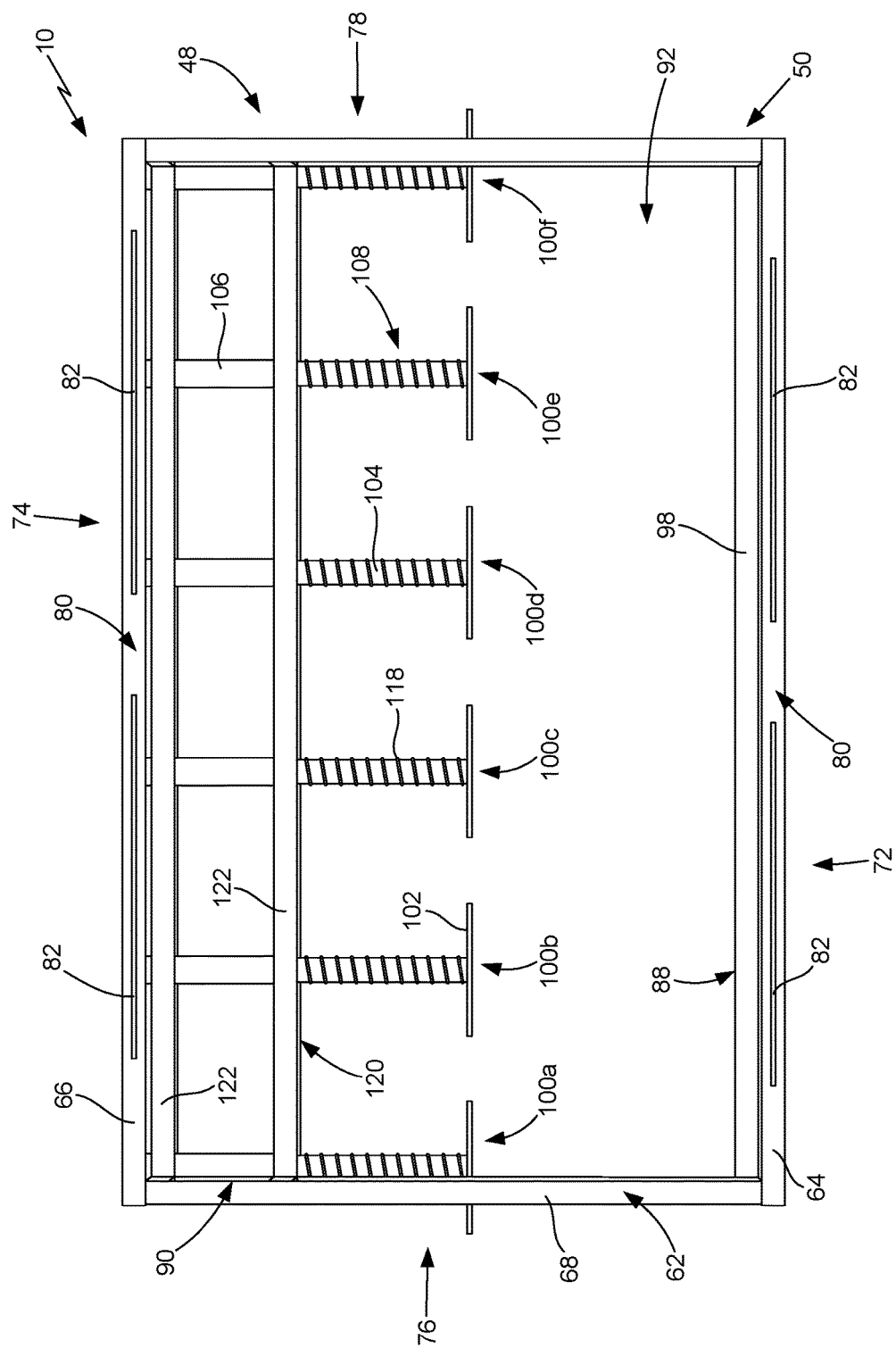
FIG. 9 is a top view of the apparatus of FIG. 4.
Figure 10:
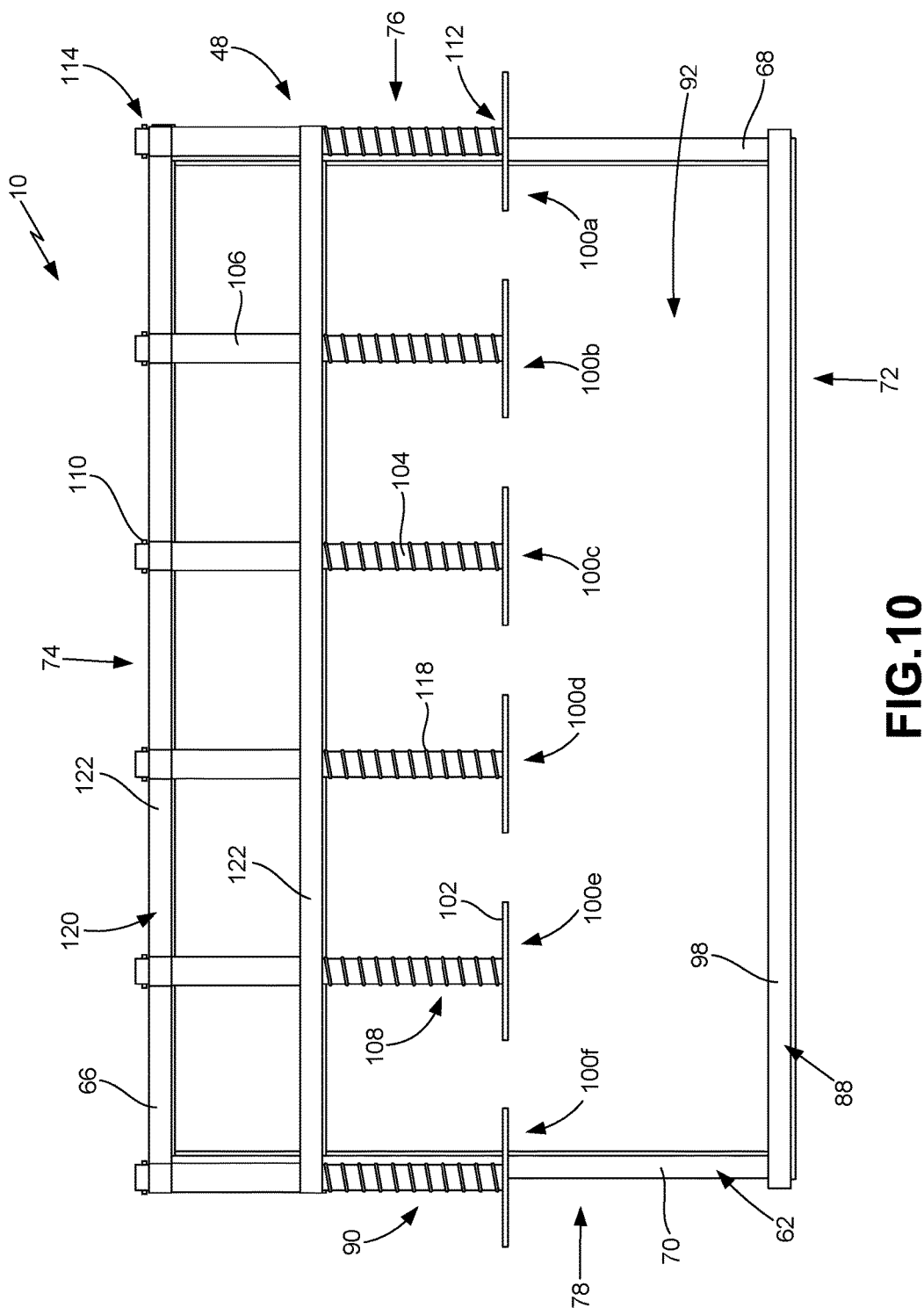
FIG. 10 is a bottom view of the apparatus of FIG. 4.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the apparatus and system of the present invention and the storage containers utilized therewith, those persons who are skilled in the art will readily appreciate that the present invention is not so limited. In addition, the exemplary embodiments of the present device are shown and described with only those components which are required to disclose the present invention. It may be that some of the necessary elements for attaching and using the present invention are not shown or are not necessarily described below, but which are well known to persons skilled in the relevant art. As will be readily appreciated by such persons, the various elements of the present invention that are described below may take on any form consistent with forms that are readily realized by persons of ordinary skill in the art having knowledge of mounting systems and container engaging systems.

A container storage apparatus that is configured pursuant to one of the preferred embodiments of the present invention is shown generally as 10 in FIGS. 5-10. A container storage system including the apparatus 10 is shown as 12 in FIGS. 3 and 4. A prior art storage container which may be utilized with the new apparatus 10 and system 12 of the present invention is shown as 14 in FIGS. 1 and 2. A typical storage container 14, commonly referred to as a storage tote, for use with the apparatus 10 and system 12 has a square or rectangular shaped container body 15 with a first side 16, an opposing second side 18, a first end 20 an opposing second end 22, a lower end 24 and an upper end 26, as shown in FIGS. 1 and 2. The storage container 14 has a plurality of walls, including a first sidewall 28 at the first side 16, an opposing second sidewall 30 at the second side, a first end wall 32 at the first end 20, an opposing second end wall 34 at the second end 22, a bottom wall 36 at the lower end 24 and a lid 38 a the upper end 26 that define an interior chamber 40, shown in FIG. 2 with the lid 38 removed. As well known in the art, the lid 38 may be hingedly attached to one or more of the sidewalls 28/30 or end walls 32/34 or the lid 38 may be removably attached to the upper end 26 of the container 14, often by using the handle/latch combinations 42 at the end walls 32/34, as shown in FIGS. 1 and 2. As shown in the figures, and understood by persons in the relevant art, the width W of container body 15 is from the first side 16 to the second side 18, the length L of container body 15 is from the first end 20 to the second end 22 and the depth D of container body 15 is from the lower end 24 to the upper end 26 thereof.

For purposes of using the container 14 with the apparatus 10 and system 12 of the present invention, the container body 15 must have at least two outwardly extending lips on opposing walls of the container body 15, such as at opposing sides 16/18 or ends 20/22 (walls 28/30 or 32/34) that, as set forth below, are engaged by components of the apparatus 10. With regard to the prior art container 14 shown in FIGS. 1 and 2, the first sidewall 28 has a first lip 44 and the opposing second sidewall 30 has a second lip 46, both of which extend outwardly (i.e., in the direction away from the sidewall and the interior chamber 40) from their respective sidewalls 28/30 at or near the upper end 26, as shown in FIG. 2.

As set forth in more detail below, the lips 44/46 of the container 14 are engaged by the lower container engaging section 48 of the apparatus 10, which is preferably sized and configured to support a plurality of the containers 14, and the container engaging section 48 is supported by an upper mounting section 50 of the apparatus 10 that mounts the apparatus 10 to one or more area supports 52 in the area, such as the garage, shed, room, closet or the like, where the user of the apparatus 10 and system 12 of the present invention desire to store the storage containers 14. In FIGS. 3 and 4, the area supports 52 are shown as a joist or other roof member 54, shown above a ceiling 56. As will be readily appreciated by persons skilled in the art, the area supports 52 may be a joist 54 (as shown), the ceiling 56 (if strong enough on its own), the roof over the area or a variety of other area supports 52 to which the mounting section 50 of the apparatus 10 can be mounted. Typically, but not exclusively, the mounting section 50 will be mounted to the area supports 52 using an appropriate connecting mechanism 58, such as one or more nails, screws, bolts or other connectors 60 (shown in FIGS. 3 and 4) or by welding or other appropriate mechanisms 58 depending on the materials utilized for the mounting section 50 of apparatus 10 and area supports 52. As shown in FIGS. 3 and 4, the system 12 of the present invention comprises the apparatus 10, one or more (typically a plurality of) containers 14 and area supports 52, whether joists 54, ceiling 56, roof or any other structurally adequate members.

The mounting section 50 of the apparatus 10 generally comprises an upper frame 62 having a plurality of frame members, including a first lateral frame member 64, second lateral frame member 66, first transverse frame member 68 and second transverse frame member 70, as best shown in FIGS. 6, 8, 9, 10 and 13. The lateral frame members 64/66 extend across the front side 72 and back side 74 of the apparatus 10, in spaced apart relation to each other, and the two transverse frame members 68/70 extend across the first side 76 and second side 78 of the apparatus 10 to interconnect the two lateral frame members 64/66, as best shown FIGS. 6, 8, 9 and 13, to support the container engaging mechanism 48 below the upper frame 62 of the mounting section 50, as best shown in FIGS. 2-4 and 5. As will be readily appreciated by persons skilled in the art, the upper frame 62 can have more than the two lateral frame members 64/66 and it can comprise only one of the transverse frame members 68/70 (i.e., at or near the center of the two lateral frame members 64/66) or more than two transverse frame members 68/70 as may be needed or necessary, or deemed desirable, to safely support the apparatus 10, containers 14 and the items in the containers 14 below the area supports 52 in the garage, shed, room, closet or other area where apparatus 10 and system 12 are being utilized. The various components of the upper frame 62 can be made out of metal, plastic, fiberglass, composites and other materials, the selection of which will generally affect the weight of the containers (and their items) that can be supported by the apparatus 10.

To mount the mounting section 50 to the area supports 52, at least one of the frame members 64/66/68/70 of the upper frame 62 is provided with an upper surface 80, best shown in FIGS. 6, 8, 9 and 13, that is positioned in engagement with, directly or indirectly, with the area supports 52, as shown in FIGS. 3 and 4. A connecting mechanism 58 is utilized to secure the frame members 64/66/68/70 with the upper surfaces 80 to the area supports 52. As will be readily appreciated by persons skilled in the art, most installations of apparatus 10 will secure the mounting section 50 of the apparatus 10 to wooden joists 54. As such, the upper surfaces 80 that are to be utilized for mounting apparatus 10 to the area supports 52 will include one or more mounting apertures 82 in the upper surface 80 so one or more connectors 60, such as a bolt or screw, can be inserted into or through the joists 54. In the embodiment shown in the figures, the apertures 82 are configured as slots that extend at least partially the length of the upper surfaces 80. The use of slots as apertures 82 will provide the user with increased flexibility with regard to the positioning of the frame members 64/66/68/70 relative to the area supports 52 (i.e., joists 54), as opposed to having a plurality of individual apertures 82 in the upper surface 80 or requiring the person installing apparatus 10 to drill a hole through the frame members 64/66/68/70. In the embodiment shown in the figures, the two lateral frame members 64/66 each have an upper surface 80 with a slot aperture 82 therethrough for attaching the apparatus 10 to the area supports 52. If desired, the transverse frame members 68/70 can also have the upper surfaces 80 and apertures 82 or can have them instead of lateral frame members 64/66. In the embodiment shown in the figures, the lateral frame members 64/66 are L-shaped frame members with one side of the "L" providing the upper surface 80 and the other side of the "L" being attached to the transverse frame members 66/68 by welding or other mechanisms appropriate for the materials utilized for the upper frame 62.

Figure 13:
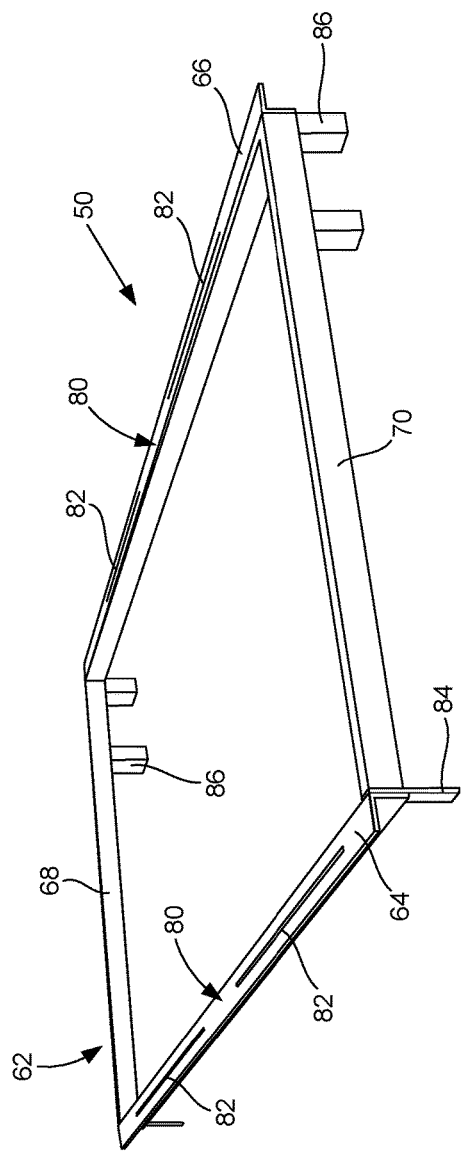
FIG. 13 is a right side perspective view of the upper mounting section of the apparatus of FIG. 4.

Interconnecting the upper mounting section 50 and the lower container engaging section 48 are a plurality of support posts, shown as front support posts 84 and back support posts 86, as best shown in FIGS. 3-6, 8 and 13. In the embodiment shown in the figures each side 76/78 of the apparatus 10 has a single front support post 84 and a pair of back support posts 86, as shown in FIGS. 6, 8 and 13. If desired or deemed necessary more support posts 84/86 than those shown can be utilized to connect the container engaging section 48 to the upper frame 62 of the mounting section 50. The support posts 84/86 can be separate components that are removably or fixedly attached to (so as to interconnect) both the container engaging section 48 and the mounting section 50. Alternatively, both of the support posts 84/86 can be made integral with one of the container engaging section 48 and the mounting section 50. In another alternative configuration, one of the front support posts 84 and back support posts 86 can be integral with one of the container engaging section 48 or the mounting section 50 and the other of the support posts 84/86 can be integral with the other section 48/50. In yet another embodiment, various other combinations can be put together with regard to one or more of the support posts 84/86 being integral with one or the other of the container engaging section 48 or the mounting section 50. The support posts 84/86 must be made out of materials that are sufficiently strong to support the weight of the container engaging section 48 and the containers 14, with items stored therein, that are to be supported by the apparatus 10.

The container engaging section 48 of the apparatus 10 generally comprises a static container support member 88 and a dynamic container support assembly 90 that define a container space 92, as best shown in FIGS. 3-6 and 8-11, therebetween and which cooperate together to engage and hold one or more containers 14 in the container space 92 so as to store the containers 14 in the apparatus 10, as shown in FIGS. 3 and 4. As set forth in more detail below, the static container support member 88 is stationary and provides a surface that will engage one of the lips 44/46 of a container 14 and the dynamic container support assembly 90 moves inward and outward, depending on the width W or length L of the container 14, to engage the other of the lips 44/46 of the container 14 to securely, but easily removably, hold the container 14 in the apparatus 10.

In the embodiment shown in the figures, the static container support member 88 is an L-shaped member 94 having a vertical member 96 that attaches to or is integral with the front support posts 84 and a lip engaging member 98 that is sized and configured to engage one of the lips 44/46 of the container 14, as shown in FIGS. 1 and 2. In one embodiment, the lip engaging member 98 is substantially horizontal that extends inwardly into the container space 92 and a lip, such as first lip 44 as shown in FIGS. 3 and 4, will sit on top of the horizontal lip engaging member 98 (with the container 14 being pressed against the lip engaging member 98 by the dynamic container support assembly 90). As will be readily appreciated by persons skilled in the relevant art, the lip engaging member 98 can be of a wide variety of different sizes and configurations, including an L-shaped member that has a portion of which extends upward, a curved or hook-like end, an upwardly angled member and the like that engages a lip 44/46 of the container 14 to hold one side 16/18 or one end 20/22 of the container 14. As with most of the other components of the apparatus 10, the static container support member 88 can be made out of a wide variety of materials, with the components thereof attached or integral to each other and attached to or integral with the front support posts 84 and/or the upper frame 62 of the mounting section 50.

Figure 11:
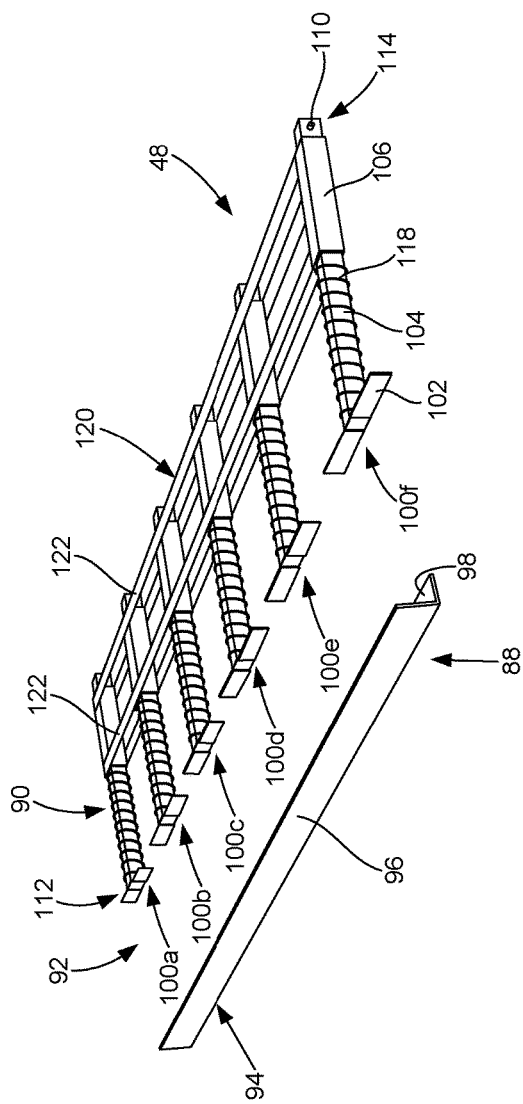
FIG. 11 is a partially exploded side perspective view of the lower container engaging section of the apparatus of FIG. 4.
Figure 12:
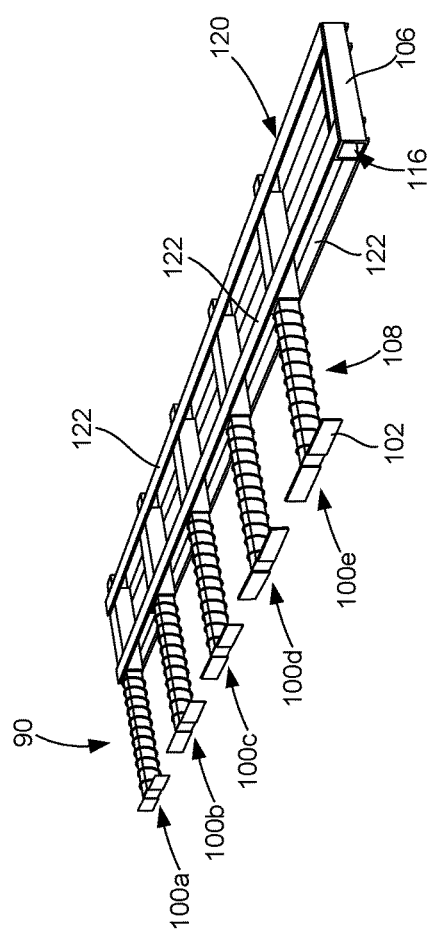
FIG. 12 is a right side perspective view of the dynamic support members of the lower container engaging section of FIG. 11 with one of the insert members removed to better show the tubular member in which the insert member is slidably received.

As set forth above, the dynamic container support assembly 90 is structured and arranged to move inward and outward relative to the container space 92 to either engage and hold the container 14, by one of the lips 44/46 thereof, in the container space 92 or for removal of the container 14 from the apparatus 10 and/or placement of a wider or longer container 14 in the container space 92. To accomplish the objectives of engaging a lip 44/46 of the container 14 and moving inward and outward relative to the container space 92, the dynamic container support assembly 90 has a plurality of dynamic supports 100, with six shown in the figures as first dynamic support 100a, second dynamic support 100b, third dynamic support 100c, fourth dynamic support 100d, fifth dynamic support 100e and sixth dynamic support 100f (collectively, they are referred to as dynamic supports 100), to removably engage and secure a container 14 in apparatus 10. Each of the dynamic supports 100 are structured and arranged to separately and individually move inward and outward relative to the container space 92 so that each dynamic support 100 can secure a container 14. The dynamic supports 100 generally comprise a lip engaging device 102 that is sized and configured to engage a lip 44/46 of the container 14, an insert member 104 attached to the lip engaging device 102 to move the lip engaging device 102 inward and outward, a tubular receiver member 106 that slidably receives and guides the insert member 104 as insert member 104 moves inward and outward relative to container space 92, a biasing mechanism 108 that bias the slidable insert member 104 and lip engaging device 102 into the container space 92 and a biasing stop member 110 that prevents the end of the insert member 104 from being biased into or beyond the tubular receiver member 106, as best shown in FIGS. 11 and 12. As with the other components of the apparatus 10, the dynamic supports 100 can be made out of metal, plastic, fiberglass, composites or other materials that will be appropriate for the weight of the containers 14 and the items stored therein.

In the embodiment shown in the figures, particularly FIGS. 6 and 8-12, the lip engaging device 102 are rectangular shaped plates that are sized and configured to be received under one of the lips 44/46 of the containers 14, such as the second lip 46 as shown in FIGS. 3 and 4. As will be readily appreciated by those persons who are skilled in the art, however, the lip engaging device 102 can be a variety of different types of devices (i.e., not plates) that are sized and configured to press against one of the sidewalls 28/30 or end walls 32/34 and engage the underside of the lip 44/46. For instance, the lip engaging devices 102 can be L-shaped or other shaped members, hook or hook-like devices or a wide variety of other members that can press against the container 14 with damaging the wall 28/30/32/34 having the lip 44/46 and supportedly engage the lip 44/46 to securely hold the container 14 in the container space 92.

As best shown in FIGS. 3-5, the lip engaging devices 102 are attached to or integral with the first end 112 of the insert member 104 and the biasing stop member 110 is at or near the second end 114 of the insert member 104. The biasing mechanism 108 is configured to push the first end 112 of the insert member 104 into the container space 92 when there is no container 14 being supported with the associated dynamic support 100 and against the container 14 when the container 14 is in the container space 92. The biasing stop member 110 at or near the second end 114 of insert member 104 prevents the insert member 104 from being pushed all the way into or through the tubular receiver member 106 when there is no container 14 in the container space 92. In one embodiment, the biasing stop member 110 is a pin/cotter key arrangement, with the pin being received through an aperture at or near the second end of the insert member 104, that stops the second end 114 of the insert member 104 from entering into the tubular receiver member 106 at the back side 74 of the apparatus 10. In another embodiment, the biasing stop member 110 is a plate, bar, rod or other device that prevents the second end 114 of the insert member 104 from entering into the tubular receiver member 106.

The insert member 104 and the tubular receiver member 106 must be cooperatively sized and configured so the insert member 104 will be slidably disposed in the tubular receiver member 106. Although a wide variety of different shapes and sizes can be utilized for the insert member 104 and the tubular receiver member 106, it is preferred that the shapes and sizes be selected to prevent the insert member 104 from rotating relative to the tubular receiver member 106. In the embodiment shown in the figures, both of the insert member 104 and the tubular receiver member 106 are square, with the tubular receiver member 106 defining a square-shaped interior (shown as 116 in FIG. 12) that is sized to be slightly larger than the insert member 104. In FIG. 12, the lip engaging device 102, insert member 104 and biasing mechanism 108 of the dynamic support 100f is not shown to better illustrate the interior 116 of the tubular receiver members 106 in which the insert member 104 is slidably disposed. As will be readily appreciated by persons skilled in the art, the insert member 104 and tubular receiver member 106 can have a variety of other cooperatively configured shapes, preferably non-rotating shapes, such as oval, triangular, trapezoidal and the like.

As set forth above, the biasing mechanism 108 is structured and arranged to bias the first end 112 of the insert member 104 and the lip engaging device 102 attached thereto or integral therewith into the container space 92 when there is no container 14 and against a wall 28/30/32/34 of the container 14 when a container 14 is in the container space 92 to be supported by apparatus 10. In a preferred embodiment, the biasing mechanism 108 comprises a spring 118 that is disposed around the insert member 104 and between the lip engaging device 102 and the inwardly disposed end of the tubular receiver member 106, as best shown in FIGS. 3-6 and 8-12. The spring 118, or other biasing mechanism 108, should be selected so as to have sufficient biasing force to press the lip engaging device 102 tightly against the wall 28/30/32/34 of the storage container 14 and maintain the pressure at the lip 44/46 of the container 14 with sufficient force to hold the storage container 14 in place in the container space 92 without crushing or otherwise damaging the container 14. In addition, the spring 118 or other biasing mechanism 108 should not have a biasing force that is so strong that it is difficult for the typical person who will be placing or removing the container 14 into or from the container space 92 to move the lip engaging device 102 toward the tubular receiver member 106 to expand the container space 92.

To support the dynamic container support assembly 90 in position relative to the mounting section 50, the apparatus 10 has a lower frame 120 with a plurality of lower frame members 122, as best shown in FIGS. 6 and 8-12. The lower frame members 122 are structured and arranged to support the components of the dynamic container support assembly 90 and to fixedly or removably secure the container engaging section 48 to the back support posts 86, which may be utilized to interconnect the container engaging section 48 and the upper frame 62 of the mounting section 50 so the entire apparatus 10 may be mounted to one or more area supports 52. As set forth above, one or more of the back support posts 86 may be attached to or integral with the lower frame 120. In addition, in an alternative configuration, the lower frame 120 may directly attach to or be integral with the upper frame 62.

Figure 14:
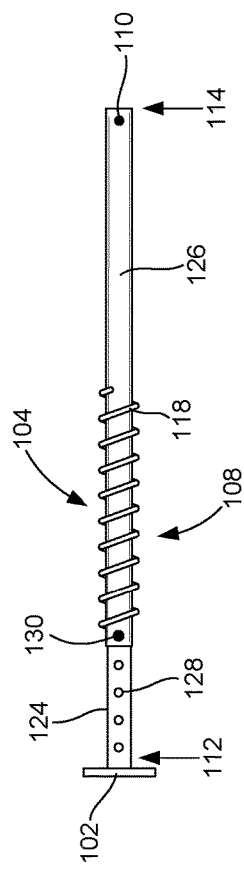
FIG. 14 is a side view of an alternative embodiment of the insert member that may be utilized with the apparatus of FIG. 4.

A variety of alternative configurations may be utilized for the various components of the apparatus 10 and system 12 of the present invention. For instance, as shown in FIG. 14, the insert member 104 may be configured to be adjustable in length to provide more or less width in the container space 92. In one such configuration, the insert member 104 comprises a first insert member 124 that is telescopically and slidably received in a second insert member 126, with each of the first insert member 124 and second insert member 126 having apertures 128 that may be placed in alignment so that a pin 130 or other device may be inserted through the aligned apertures 128 to fix the length of the insert member 104, as shown in FIG. 14. In another alternative embodiment, the lip engaging devices 102 may be wide enough so the edge of a lip engaging device 102 of a dynamic support 100 will be touching or nearly touching the edge of the lip engaging device 102 of the adjacent dynamic support 100 to provide a continuous or nearly continuous surface along the top of the lip engaging devices 102 so a container 14 may be slid along the plurality of lip engaging devices 102 into the desired position. In this embodiment, each of the lip engaging devices 102 may have a hinge or other device at or near the center thereof to allow the lip engaging device 102 to be flexible. In another configuration of this embodiment, adjacent lip engaging devices 102 may be connected end to end using a slick connecting member that is made out of plastic or other material that will provide a smooth and easy to slide on surface for the containers 14.

A second embodiment of the container storage apparatus 10 is shown in FIGS. 15-22. As set forth in more detail below, this embodiment of the apparatus 10 is structured and arranged to be mounted to an area support 52, such as joist 54, ceiling 56 or the like, and to removably support one or more storage containers 14 but in a substantially more compact sized configuration than the embodiment described above and shown in FIGS. 3-14. The apparatus 10, as well as a system 12 using the apparatus 10 of the second embodiment, also comprises a container engaging section 48 that is structured and arranged to removably support the storage containers 14 and a mounting section 50 that mounts the apparatus 10 to an area support 52.

Figure 15:
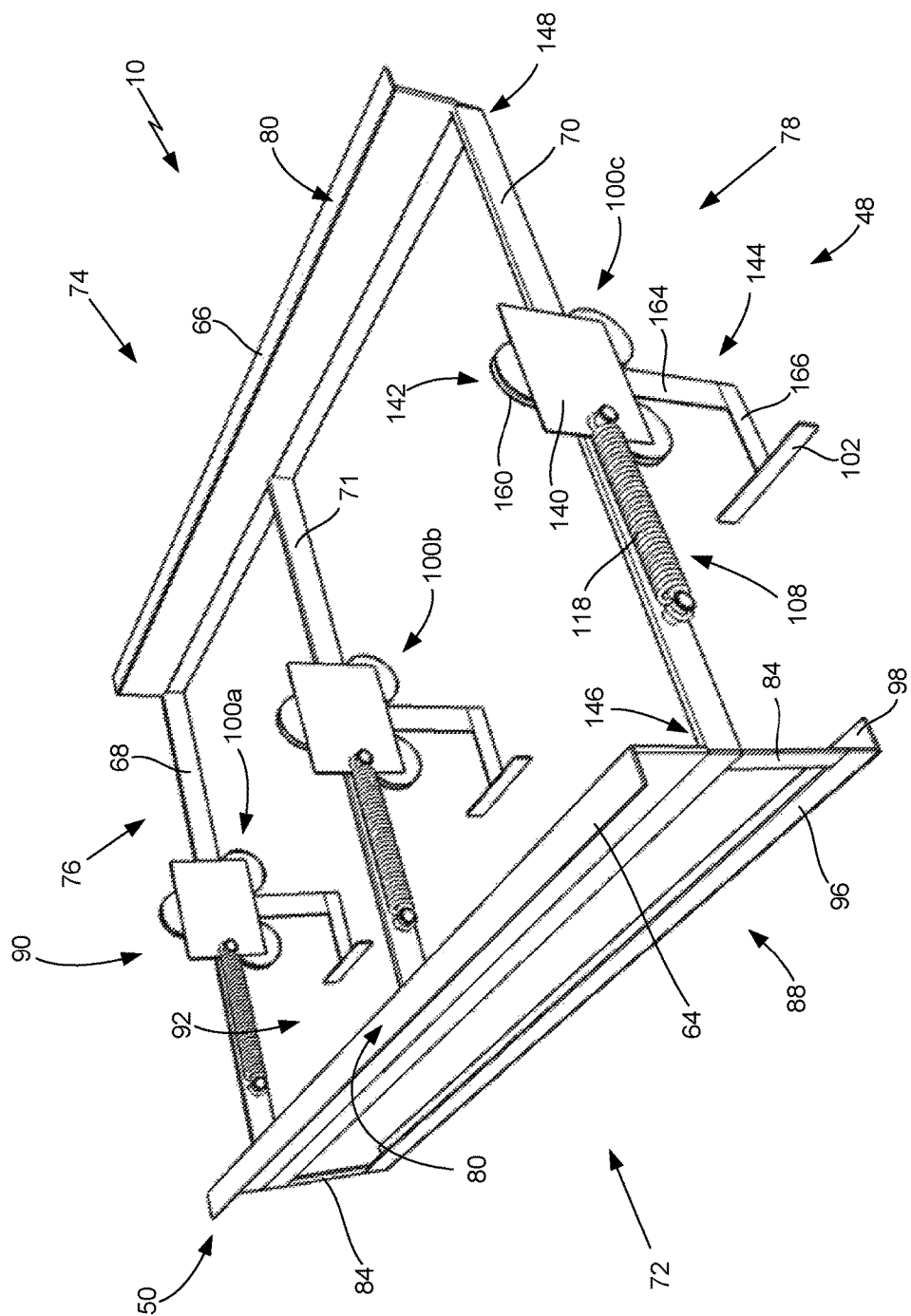
FIG. 15 is a top front perspective view of a container storage system configured according to a second embodiment of the present invention.
Figure 16:
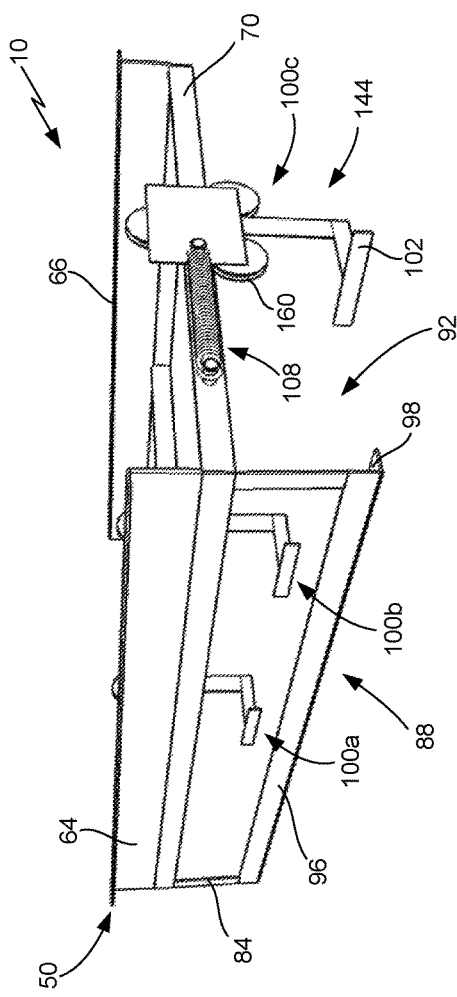
FIG. 16 is a right side perspective view of the container storage system of FIG. 15.
Figure 17:
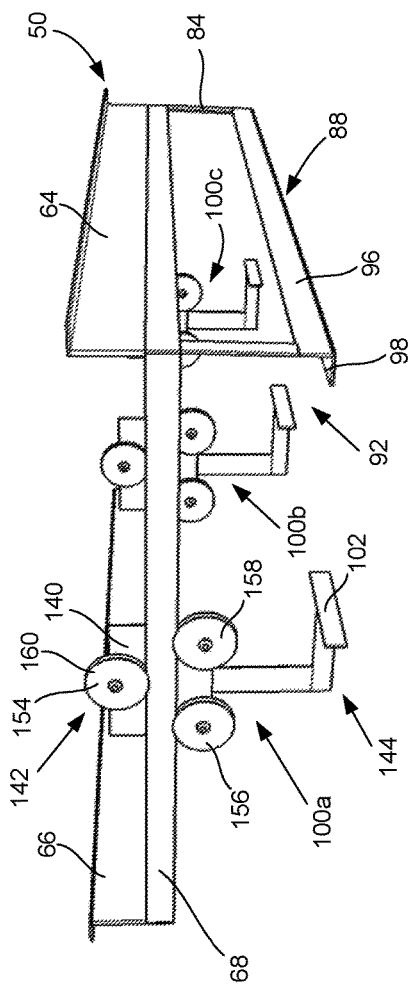
FIG. 17 is a left side perspective view of the container storage system of FIG. 15.
Figure 20:
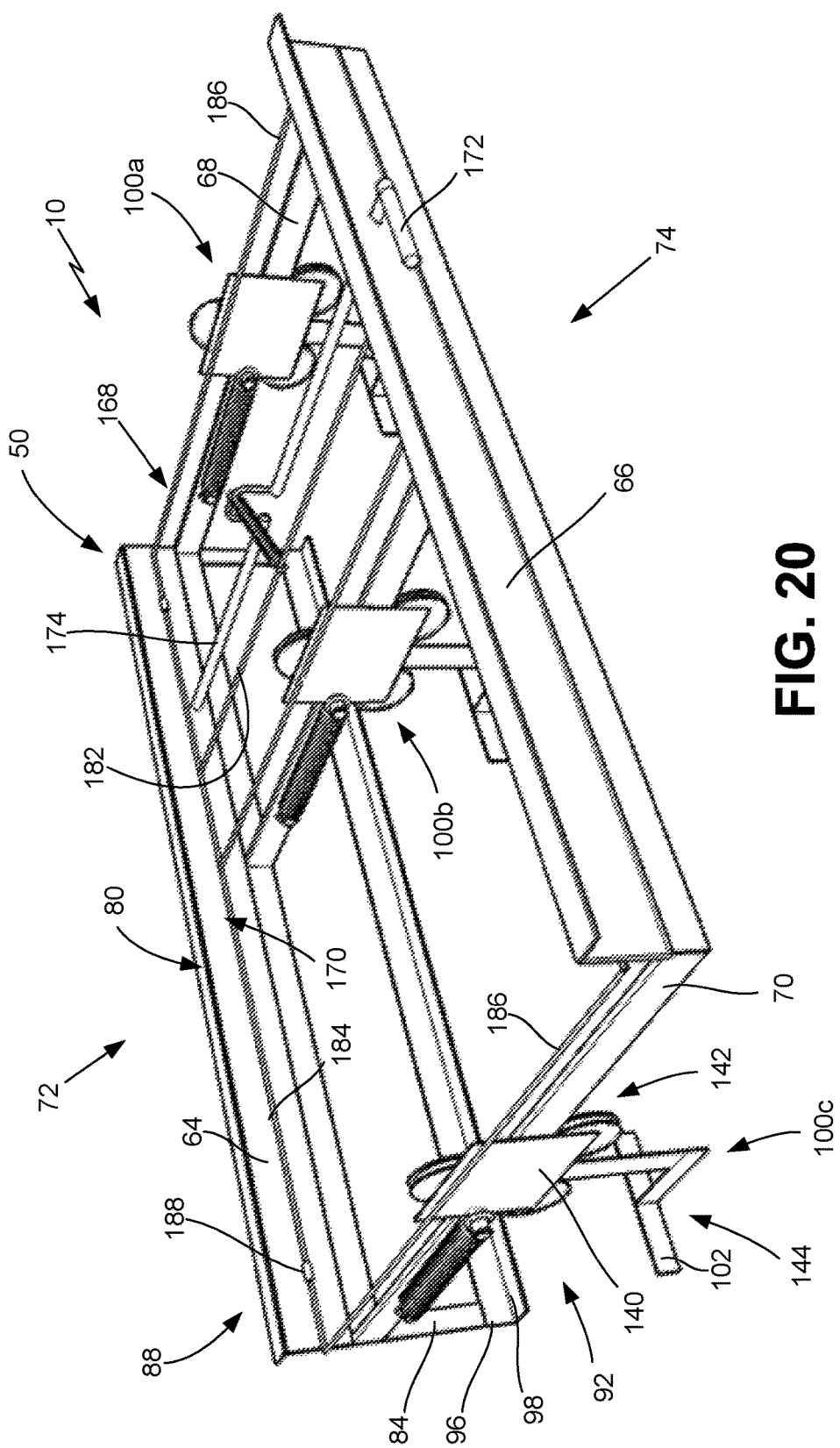
FIG. 20 is a top back perspective view of the container storage system of FIG. 15 shown with a locking assembly added thereto to fix the position of the dynamic support members.

As with the above embodiment, the mounting section 50 of this apparatus 10 generally comprises a frame 62 having a plurality of frame members, including a first lateral frame member 64, second lateral frame member 66, first transverse frame member 68 and second transverse frame member 70, as best shown in FIGS. 15-17 and 20. In this embodiment, there is no upper/lower frame (i.e., elements 62 and 120, respectively, of the above embodiment) and there are one or more central transverse frame members 71 that are positioned between the first 68 and second 70 transverse frame members (as best shown in FIGS. 15 and 20). The lateral frame members 64/66 extend across the front side 72 and back side 74 of the apparatus 10, in spaced apart relation to each other, and the two transverse frame members 68/70 extend across the first/left side 76 and second/right side 78 of the apparatus 10 to interconnect the two lateral frame members 64/66 to support the container engaging mechanism 48 (as well as any storage containers 14 that are engaged thereby) below the frame 62 of the mounting section 50, as best shown in FIGS. 15-17 and 20. With regard to describing the present embodiment, the description and drawings referenced above with regard to the embodiment of FIGS. 3-14, including the sizes, materials, components and mounting alternatives, are hereby incorporated herein as though fully set forth with regard to the present embodiment of the apparatus 10.

With regard to the container engaging section 48 of the apparatus 10 of FIGS. 15-22, the container engaging section 48 is structured and arranged to engage the container body 15 to position the storage container 14 in the container space 92, as shown in FIGS. 15-17 and 20, of the container engaging section 48. As described above, the container engaging section 48 of this embodiment also comprises a static container support member 88 and a dynamic container support assembly 90 that is in spaced apart relation to the static container support member 88 to define the container space 92 therebetween. As previously described, the static container support member 88 has a lip engaging member 98 that is sized and configured to engagedly support the first lip 44 of the container body 15. The dynamic container support assembly 90 has a plurality of dynamic supports 100 that each moveably support a lip engaging device 102, as shown in FIGS. 15-20, that is sized and configured to engagedly support the opposing second lip 46 of the container body 14. As with the above embodiment, and explained in more detail below, the dynamic supports 100 of the dynamic container support assembly 90 has a biasing mechanism 108 that bias the lip engaging device 102 toward the lip engaging member 98 of the static container support member 88 to securely hold the storage container 14 between the lip engaging member 98 of the static container support member 88 and the lip engaging device 102 of the dynamic container support assembly 90 to removably support the storage container 14 in the container space 92 of the apparatus 10. As explained in more detail below, the dynamic container support assembly 100 does not utilize the insert member 104 or tubular receiver member 106 described above, which reduces the "footprint" of the apparatus 10 and likely reduces manufacturing costs and installation difficulties, and each of the dynamic supports 100 (such as 100*a*, 100*b* and 100*c*) are moveably mounted to a transverse frame member 68/70/71, as best shown in FIGS. 15-20. For purposes of describing the present embodiment, the transverse frame members 68/70/71 to which a dynamic support 100 is moveably mounted are collectively referred to as dynamic support frame members 140.

The dynamic supports 100 of the present embodiment comprises a support plate 140, a biasing mechanism 108 interconnecting the support plate 140 and one of the transverse frame members 68/70/71, a moving mechanism 142 that is associated with support plate 140 to allow the dynamic support 100 to move along the transverse frame member 68/70/71 and a lip support assembly 144 that supports and positions the lip engaging device 102, as best shown in FIGS. 18 and 19. The dynamic support 100*c* is shown in FIGS. 18 and 19 moveably mounted on the second or right lateral frame member 70. In the present embodiment, the other dynamic supports, shown as 100*a* and 100*b* in the figures, are configured the same as shown in FIGS. 18 and 19 except mounted to different transverse frame members, namely the first/left lateral frame member 70 or the central lateral frame member 71 (of which there may be multiple such members positioned between the first 68 and second 70 lateral frame members). For purposes of describing the present embodiment, each of the lateral frame members 68/70/71 have a first or front end 146 that is attached to or integral with the first/front lateral frame member 64 and a second or back end 148 which is attached to or integral with the second/back lateral frame member 66.

With regard to the dynamic support 100 shown in FIGS. 18-19, the dynamic support 100*c* has a biasing mechanism 108, which may be a tension spring 108 or the like, that interconnects the second transverse frame member 70 at a position towards the first end 146 thereof and the support plate 140, as best shown in FIG. 18. In the embodiment shown, the spring 118 connects to a first pin 150 on the second transverse frame member 70 and to a second pin 152 on the support plate 140. The biasing mechanism 108 is positioned and configured to allow the user to push the dynamic support 100*c* toward the second end 148 of the transverse frame member 70, typically using a portion of the storage container 14 itself, to expand the container space 92 when he or she is placing the storage container 14 therein or removing the storage container 14 therefrom and then bias the dynamic support 100*c* back toward the first end 146 of the second transverse frame member 70. The biasing mechanism 108 should be configured to press the lip engaging device 102 sufficiently hard enough against the storage container 14, typically at the second sidewall 30 below the second lip 46, to hold the storage container 14 between the lip engaging device 102 of the dynamic support 100*c* and the lip engaging member 98 of the static container support member 88, as further described herein, to securely hold the support container 14 in the apparatus 10. The biasing mechanism 108 should be able to extend sufficiently easily that the user will be able to push the dynamic support 100 backwards, with moving mechanism 142, toward the second end 148 of the respective transverse frame member 68/70/71 so the user will be able to avail himself or herself of at least substantially the full container space 92 for larger sized storage containers 14.

The moving mechanism 142 is structured and arranged to allow a dynamic support 100 to move forward, namely toward the front lateral frame member 64 and static container support member 88 at the front side 72 of the apparatus 10, or rearward, namely toward the back lateral frame member 66 at the back side 74 of the apparatus 10, as biased by the biasing mechanism 108 or desired by the user (i.e., when placing a storage container 14 in the container space 92). In the embodiment shown in FIGS. 15-22, each moving mechanism 142 is configured to movably engage one of the transverse frame members and move the dynamic supports 100 towards and away from the first end 146 and second end 148 of the transverse frame members 68/70/71. The moving mechanism 142 in the embodiment shown in the figures comprises three "pulley" type wheels, shown as first wheel 154, second wheel 156 and third wheel 158 in FIGS. 18 and 19, that are shaped and configured to moveably engage the transverse frame members 68/70/71, as best shown in FIGS. 15-17 and 20. As shown in these figures, the edges 160 of the wheels 154/156/158 are slotted to engage the transverse frame members 68/70/71 and move along the length thereof. Ball bearings and an axle 162 facilitate easy movement of the wheels 154/156/158 along the transverse frame members 68/70/71. In a preferred configuration, the wheels 154/156/158 will fit snugly around the transverse frame members 68/70/71 associated with the dynamic support 100*a*/100*b*/100*c* so as to ride smoothly along the various transverse frame members 68/70/71.

As will be readily appreciated by persons skilled in the relevant art, the moving mechanism 142 can be configured in a wide variety of different manners and utilize a variety of different components such as wheels, rollers and the like that move along a flat surface. In addition, the moving mechanism 142 can have less or more wheels 154/156/158 than shown in the figures and use a combination of wheels, rollers and/or other devices that can move along a transverse frame member 68/70/71. As such, the moving mechanism 142 shown in the figures is intended to be representative of one type of a mechanism that can be utilized with the present invention.

The lip support assembly 144 comprises a downwardly directed first lip support member 164 and a forwardly directed second lip support member 166, as best shown in FIGS. 18 and 19. The term "downwardly" refers to a direction away from the area supports 52 to which the apparatus 10 is attached and generally toward the ground, floor or other surface. The term "forwardly" refers to a direction toward the front side 72 of the apparatus 10 (i.e., toward the first/front lateral frame member 64 and the static container support member 88). The upper end of the first lip support member 164 is attached to or integral with the support plate 140 and the lower end of the first lip support member 164 is attached to or integral with the rearward end of the second lip support member 166. The lip engaging device 102 is attached to or integral with the forward end of the second lip support member 166 so as to be disposed generally facing, but in spaced apart relation to, the lip engaging member 98 of the static container support member 88. When the biasing mechanism 108 biases the dynamic support 100 towards the static container support member 88, the lip engaging device 102 will move toward the lip engaging member 98. When the storage container 14 is in the container space 92, the lip engaging member 98 and the lip engaging device 102 will, respectively, engage the first lip 44 and second lip 46 of the storage container 14. As will be readily understood by persons skilled in the art, the lip support assembly 144 can be configured in a variety of different manners using one or more lip support members. In one embodiment, the lip support assembly 144 can comprise a single generally curved lip support member that curves forward to direct the lip engaging device 102 towards the lip engaging member 98. Many other configurations are also possible for the lip support assembly 144.

As set forth above, both form and functionality are improved with the embodiment set forth in FIGS. 15-20. The spring 118 provides adequate, but not overbearing resistance and bias and the ball bearing wheels 154/156/158 provide for much smoother operation. As can be seen when comparing FIGS. 5 and 6 to FIGS. 15-17, there is also no need for excess width utilizing the configuration of the second embodiment, as the dynamic support members 100 do not need to be nearly as long or extend rearward as far (i.e., in order for the insert member 104 to be slidably received in the tubular receiver member 106) in order to facilitate the movement of the dynamic support members 100 and the overall functionality of the apparatus 10 with regard to receiving and supporting a storage container 14.

In addition to the improved overall ease of use and smaller profile of the apparatus of the second embodiment, this configuration enables implementation of a braking or locking system, shown as 168 in FIGS. 20-22, that provides a myriad of benefits for the apparatus 10. The locking system 168 is comprised of a locking frame 170, a handle 172 attached to a shaft 174 with a generally U-shaped offset portion 176 at or near the center of the shaft 174 and a locking biasing mechanism 178, which can be an extension spring 180, that attaches the offset portion 176 of the shaft 174 to a fixed position cross-member 182 of the locking frame 170, as best shown in FIGS. 21 and 22. The locking frame 170 is made up of two lateral members 184 and a plurality of transverse members 186. As shown in FIG. 20, the locking frame 170 is substantially the same width and length as the frame 62 that supports the dynamic supports 100. The transverse members are positioned along the locking frame 170 at the same measured intervals as the transverse frame members 68/70/71 on which the wheels 154/156/158 ride to provide mobility for the dynamic supports 100. Attached to the support plate 140 of the dynamic supports 100 opposite the side thereof with wheels 154/156/158 is a strip with grooves that, in effect, form "teeth" in the manner of a flat gear. An opposing section of this flat gear is installed along the length of the transverse members 186 of the locking frame 170. This entire locking frame 170 rides within a plurality of tubular supports 188 attached to or integral with the upper frame 62, as shown in FIG. 20. These tubular supports 188 are essentially short pieces of tubing in which the locking frame 170 has sufficient space to slide laterally, but which hold the entire locking frame 170 in place on a vertical plane. When the handle 172 is rotated by the user, the offset portion 176 of the shaft 174 rotates and pulls the spring 180, or other locking biasing mechanism 178, which is attached to the cross member 182 of the locking frame 170. This causes the locking frame to slide laterally, only stopping when at rest against the non-wheeled side of the support plate 140 of the dynamic support members 100. With the locking spring 180 nearly fully extended and exerting maximum pressure on the locking frame 170, the "teeth" on the support plate 140 of the dynamic supports engage the "teeth" on the cross member 182 of the locking frame 170. This interlocking of "teeth" inhibits movement of the dynamic supports 100 and locks any storage containers 14 in the container space 92 in whatever configuration they are in when the locking system 168 is engaged. An alternative to the "teeth" configuration would be rubber that grips upon contact with the surface, or with material on the surface, of the support plate 140 of the dynamic support 100. Another alternative configuration is the use of sharp spike like teeth on the support plate 140 of the dynamic supports 100 which digs in and grips a strip of rubber that is attached to the cross member 182 of the locking frame 170. As will be readily appreciated by persons skilled in the art, a number of different configurations of the locking system 168 can be utilized with the apparatus 10. The locking system 168 is particularly useful when using the apparatus 10 to secure storage containers 14 in a moving vehicle, such as a moving van or the like. Another useful benefit of utilizing the locking system 168 is that the apparatus 10 can be configured with a locking device so the user can lock the storage containers 14 in the apparatus 10, making it difficult for unauthorized persons or thieves to gain access to the items in the storage containers 14.

A third embodiment of the container storage apparatus 10 is shown in FIGS. 23-38. As set forth in more detail below, as with the above embodiments, this embodiment of the apparatus 10 is structured and arranged to be mounted to an area support 52, such as joist 54, ceiling 56 or the like, and to removably support one or more storage containers 14. As with the second embodiment, the container storage apparatus of the third embodiment accomplishes the objectives of the present invention in a substantially more compact sized configuration than the first embodiment, as described above and shown in FIGS. 3-14. The apparatus 10, as well as a system 12 using the apparatus 10 of the second embodiment, comprises a container engaging section 48 that is structured and arranged to removably support the storage containers 14 and a mounting section 50 that mounts the apparatus 10 to one or more area support 52 (typically a plurality of joists or other roof members 54).

Figure 28:
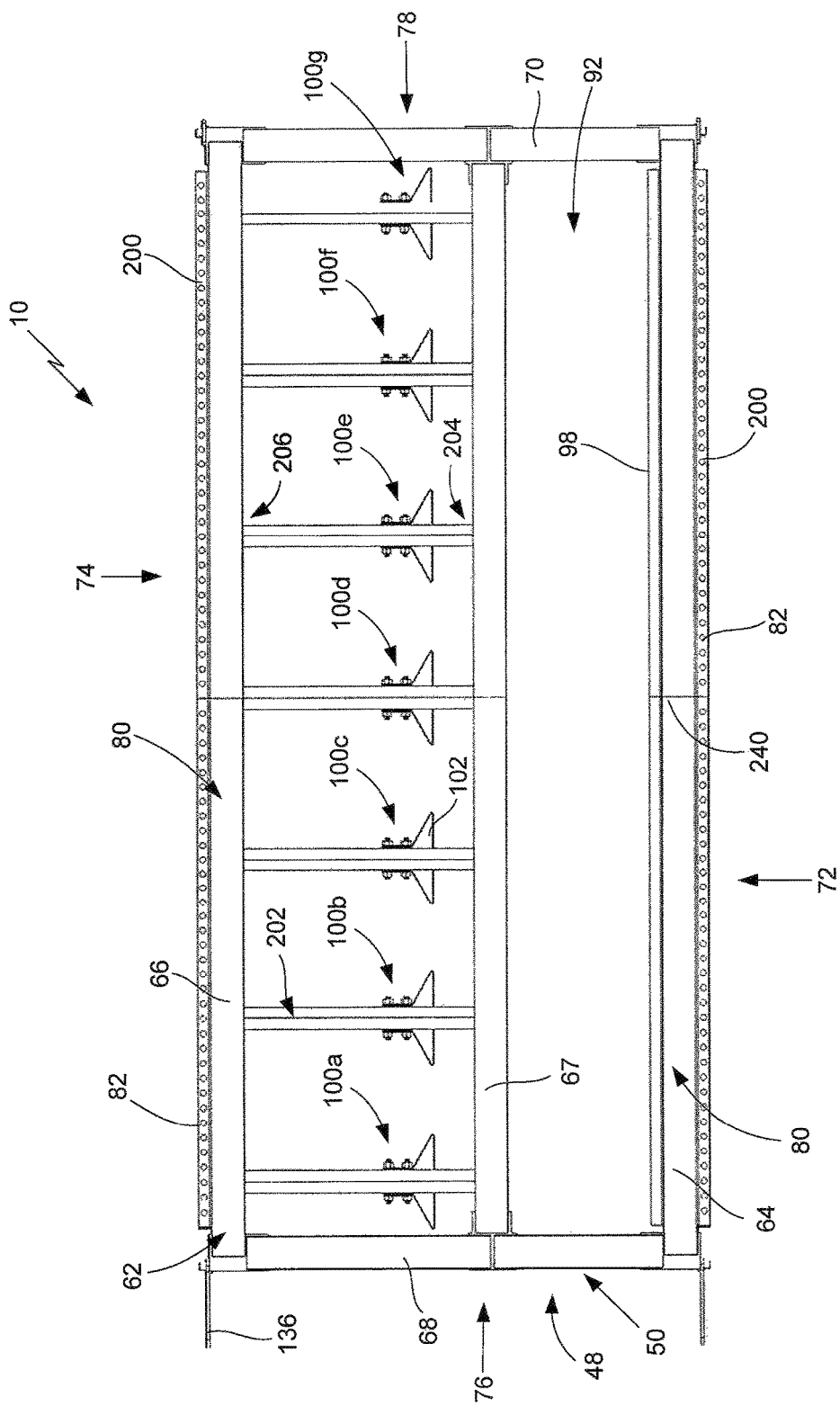
FIG. 28 is a top view of the container storage apparatus of FIG. 23.
Figure 29:
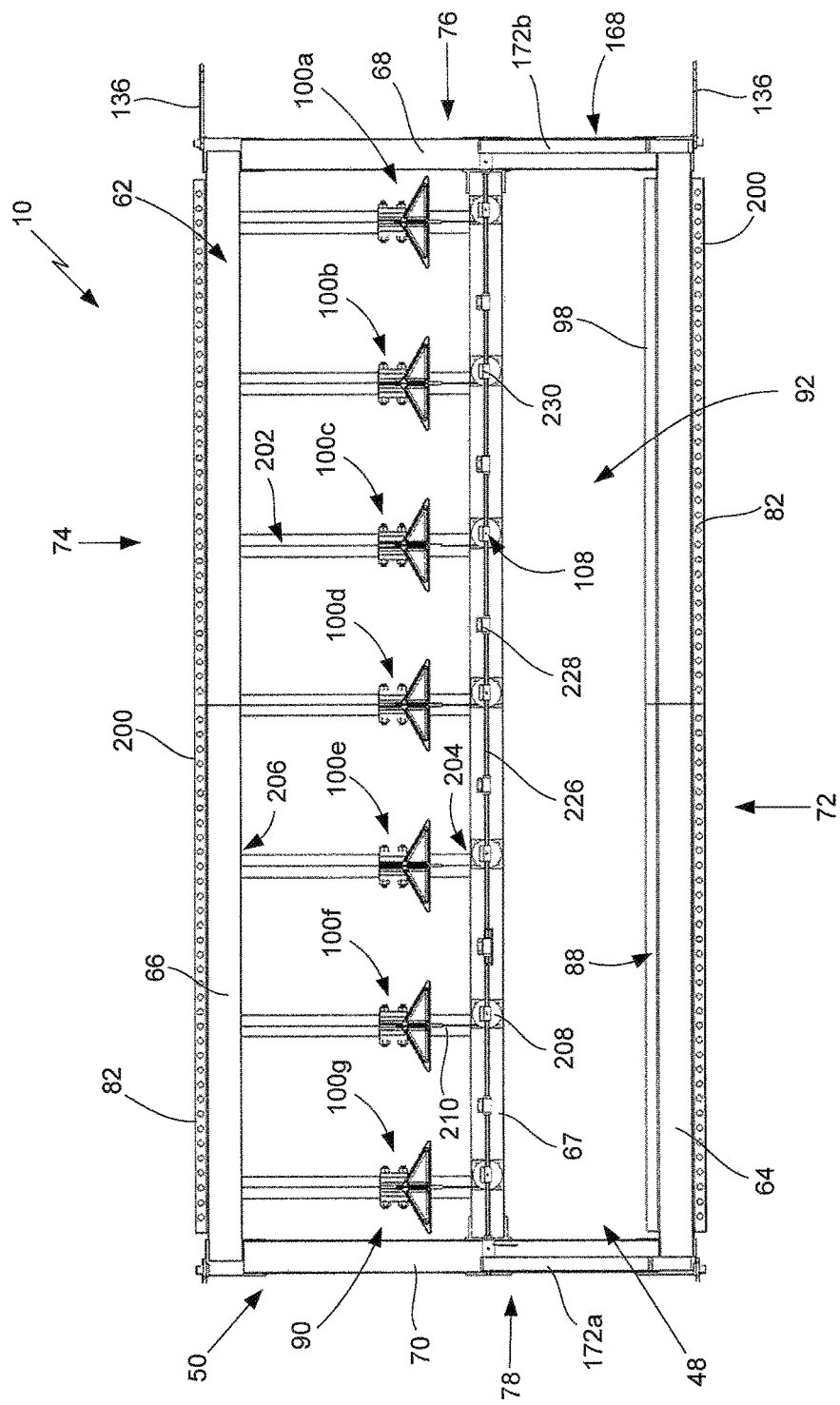
FIG. 29 is a bottom view of the container storage apparatus of FIG. 23.

As with the previous embodiments, the mounting section 50 of the third embodiment of the apparatus 10 generally comprises a frame 62 having a plurality of frame members, including a first lateral frame member 64, second lateral frame member 66, first transverse frame member 68 and second transverse frame member 70, as best shown in FIGS. 23-29. In the third embodiment, as with the second embodiment, there is no designated upper/lower frame, although there could be if desired. The frame 62 of this embodiment has one or more central lateral frame members 67 positioned between the first/front lateral frame member 66 and the second/back lateral frame member 68, as best shown in FIGS. 23 and 28-29, to support various components of the container engaging section 48, such as the biasing mechanism 108, as shown in FIGS. 23, 26-27 and 29. The lateral frame members 64/66 extend across the front side 72 and back side 74 of the apparatus 10, in spaced apart relation to each other, and the two transverse frame members 68/70 extend across the first/left side 76 and second/right side 78 of the apparatus 10 to interconnect the two lateral frame members 64/66 to support the container engaging mechanism 48 (as well as any storage containers 14 that are engaged thereby) below the frame 62 of the mounting section 50, as best shown in FIGS. 23-27. To assist with mounting the container storage apparatus 10, the present embodiment includes a mounting strip 200 attached to or integral with each of the lateral frame members 64/66, as best shown in FIGS. 23 and 28-29. Each of the two mounting strips 200 substantially extend the entire length of their respective lateral frame members 64/66 and contain a plurality of apertures 82 that can receive a screw, bolt or other connector to secure the frame 62 (and therefore the apparatus 10) to one or more of the area supports 52. With regard to describing the present embodiment, the description and drawings referenced above with regard to the first and second embodiments of the present invention, including the sizes, materials, components and mounting alternatives, are hereby incorporated herein as though fully set forth with regard to the present embodiment of the apparatus 10.

With regard to the container engaging section 48 of the apparatus 10 of FIGS. 23-38, the container engaging section 48 is structured and arranged to engage the container body 15 to position the storage container 14 in the container space 92, as best shown in FIGS. 23 and 28-29, of the container engaging section 48. The container engaging section 48 of this embodiment also comprises a static container support member 88 and a dynamic container support assembly 90 that, as described above, is positioned in spaced apart relation to the static container support member 88 to define a container space 92 therebetween. As previously described, the static container support member 88 has a lip engaging member 98 that is sized and configured to engagedly support the first lip 44 of the container body 15. The dynamic container support assembly 90 has a plurality of dynamic supports 100 and a plurality of biasing mechanisms 108, with each of the dynamic supports 100 having a biasing mechanism 108 operatively associated therewith to engage and support a storage container 14 in the container space. The dynamic supports 100 each moveably support a lip engaging device 102, as best shown in FIGS. 23 and 26-27, that is sized and configured to engagedly support the second lip 46 of the container body 14. As with the above embodiments, and explained in more detail below, the biasing mechanism 108 of the dynamic container support assembly 90 bias the lip engaging device 102 toward the stationary lip engaging member 98 of the static container support member 88 to engage and securely hold a storage container 14 between the lip engaging member 98 of the static container support member 88 and a lip engaging device 102 associated with a dynamic support 100 to removably support the storage container 14 in the container space 92 of the apparatus 10. As explained in more detail below, the dynamic container support assembly 90 of the third embodiment also does not utilize the insert member 104 or tubular receiver member 106 associated with the first embodiment. As set forth above, eliminating these components will generally reduce the "footprint" of the apparatus 10 and likely reduce manufacturing costs and installation difficulties for the new container support apparatus 10.

Figure 30:
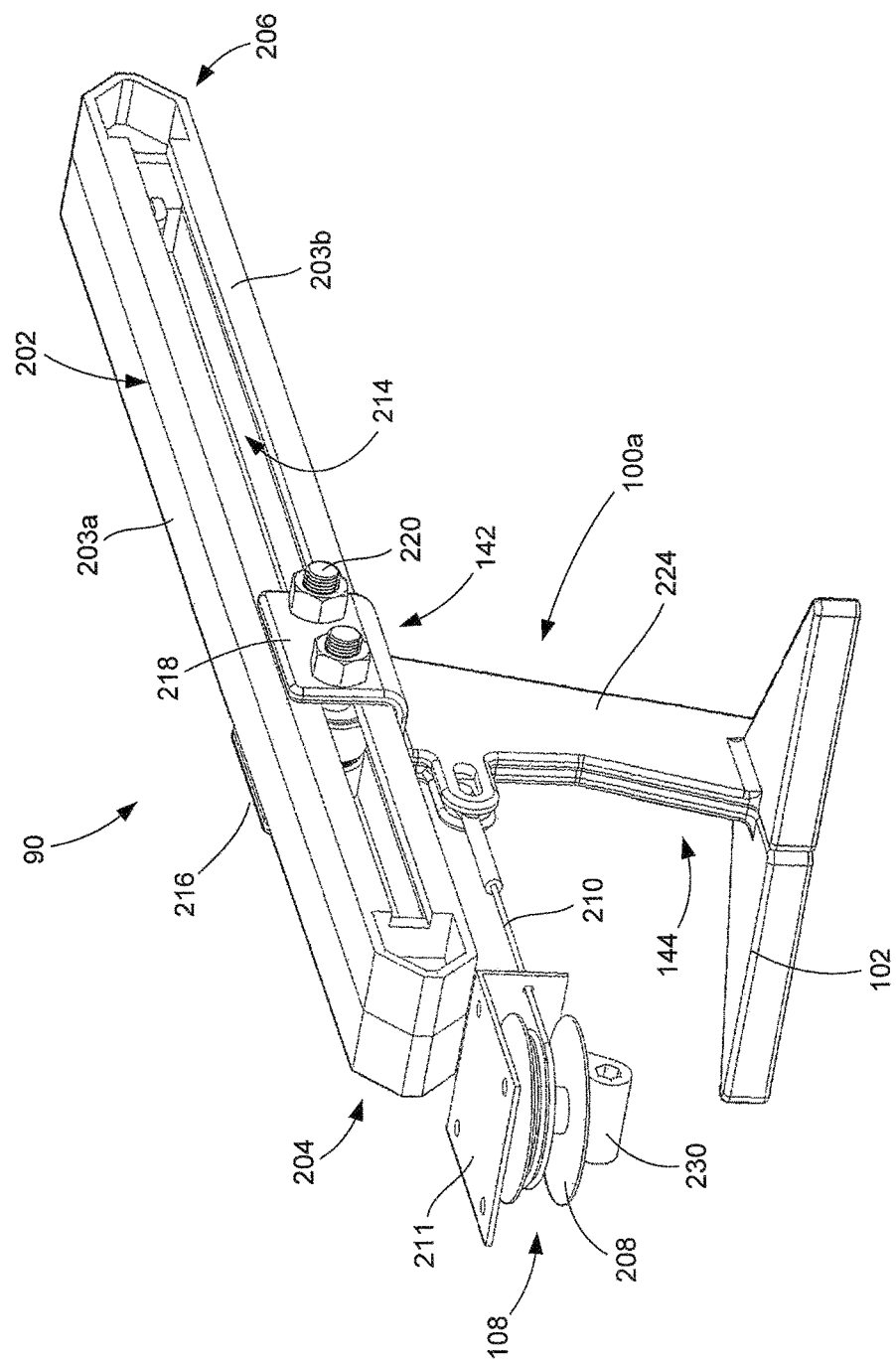
FIG. 30 is a front perspective view of the first dynamic support of the dynamic container support assembly of the container storage apparatus of FIG. 23.
Figure 31:
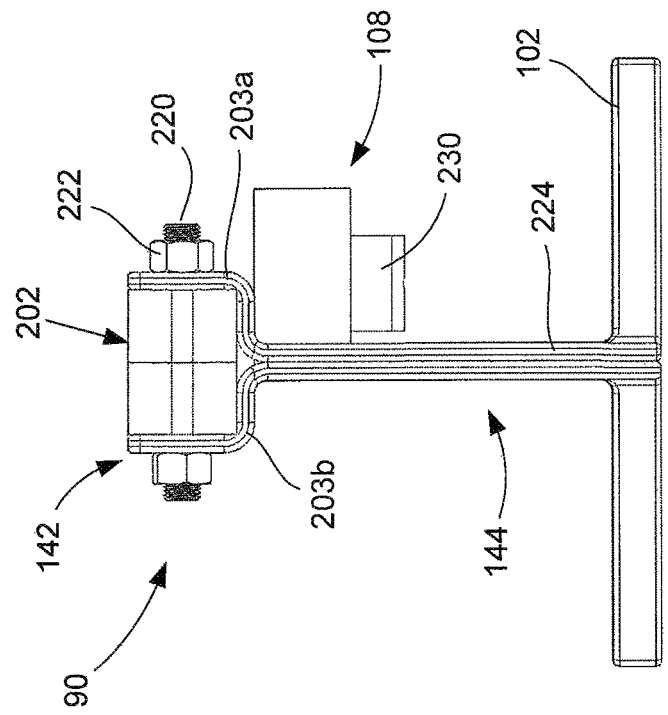
FIG. 31 is a front view of the first dynamic support of FIG. 30.
Figure 32:
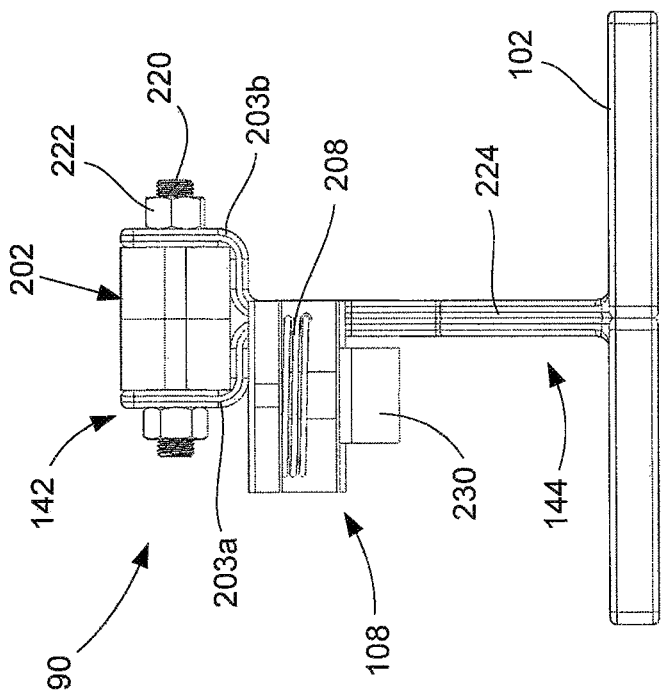
FIG. 32 is a back view of the first dynamic support of FIG. 30.

Each dynamic support 100 is moveably mounted to a dynamic support rail assembly 202, as best shown in FIGS. 23 and 28-32, in a manner which allows the dynamic support 100 to move forward and rearward along the dynamic support rail assembly 202. For purposes of describing the present embodiment, the dynamic support rail assembly 202 of the third embodiment, to which a dynamic support 100 is moveably mounted, comprises one or more of the dynamic support frame members 203. In the figures for the third embodiment, the dynamic support rail assembly 202 has a pair of dynamic support frame members 203a and 203b, as best shown in FIGS. 30-32.

As set forth in more detail below, each of the dynamic supports 100 of the present embodiment comprise a moving mechanism 142 and a lip support assembly 144. Each moving mechanism 142 is engaged with and moveably supported by a dynamic support rail assembly 202 in a manner that allows the dynamic support 100 to move along its associated dynamic support rail assembly 102, as best shown in FIGS. 30-32 toward and away from the static container support member 88. The lip support assembly 144 is attached to or integral with the moving mechanism 142 in a manner that supports and positions the lip engaging device 102 in the appropriate location so the lip engaging device 102 will support a storage container 14 by its outward extending lips 44/46. More specifically, the storage container 14 is supported in the container space 92 by the stationary lip engaging member 98 and the moveable lip engaging device 102. As set forth in more detail below, each of the dynamic supports 100 have a biasing mechanism 108 associated therewith that interconnects one of the moving mechanism 142 and/or the lip support assembly 144 (as shown in the figures) to move the moving mechanism 142 and, therefore, the lip engaging device 102 supported by the lip support assembly 144, forward (i.e., toward the front side 72) toward the stationary lip engaging member 98 that is associated with the static container support member 88 to supportedly trap a storage container 14 in the container space 92. The biasing mechanism 108 and moving mechanism 142 are also configured to allow the user to move the lip support assembly 144 and the lip engaging device 102 supported thereby rearward (i.e., toward the back side 74) to expand the container space 92 so he or she may put the storage container 14 in the container space 92 or remove the storage container 14 therefrom.

In FIGS. 30-32, the dynamic support 100a is shown moveably mounted on one of the dynamic support rail assemblies 202. In the present embodiment, the other dynamic supports, shown as 100b, 100c, 100d, 100e, 100f and 100g in FIGS. 23-25 and 28-29, are configured the same as shown in FIGS. 30-32 except mounted to different dynamic support rail assemblies 202. For purposes of describing the configuration and operation of the present embodiment, each of the dynamic support rail assemblies 202 has a first or front end 204 that is attached to or integral with the central lateral frame member 67 and a second or back end 206 which is attached to or integral with the second/back lateral frame member 66, as best shown in FIGS. 28-30.

With regard to the biasing mechanisms 108, each dynamic support 100 has a biasing mechanism 108 associated there with to bias the lip engaging device 102 attached to or integral with the dynamic support 100 toward the lip engaging member 98 of the static container support member 88. In the third embodiment of the present invention, the biasing mechanism 108 comprises a retractable cable wheel 208 having a length of a flexible elongated member 210, such as a cable, wire, rope or the like, that is selected to be able to wrap around the retractable cable wheel 208. One end of the elongated member 210 is integral with, attached to or otherwise connected to the retractable cable wheel 208. The opposite end of the elongated member 210 is connected to the dynamic support 100 that is associated with a particular biasing mechanism 108. The retractable cable wheel 208 is configured to bias the elongated member 210 inward such that the default is to bias the dynamic support 100 toward the retractable cable wheel 208 and, therefore, bias the lip engaging device 102 associated with the dynamic support 100 toward the static container support member 88. Typically, the retractable cable wheel 208 will be spring-loaded or otherwise configured to pull the elongated member 210 inward around the wheel portion of the retractable cable wheel 208. The configuration and use of retractable cable wheels 208 are generally well known in the relevant art. The retractable cable wheel 208 must be wound sufficiently tight to provide sufficient force to hold a storage container 14 between the lip engaging member 98 and the lip engaging device 102 in the container space 92. The force imparted by the retractable cable wheel 208 should not be so great so as to damage the storage container 14 and/or to make it difficult for the user to overcome the force when he or she is placing the storage container 14 in the storage space 92 or removing the storage container 14 from the storage space 92, which requires the user to push the dynamic support 100 rearward on the dynamic support rail assembly 202 to open or increase the width of the container space 92 (i.e., the distance between the lip engaging member 98 and the lip engaging device 102) to insert or remove the storage container 14 from the container storage apparatus 10. Typically, the retractable cable wheel 208 will be mounted to the central lateral frame member 67 utilizing a wheel frame member 211, best shown in FIGS. 30 and 33-34, using screws, bolts, rivets or like connectors or by welding or the use of adhesives. The retractable cable wheel 208 is rotatably mounted to the wheel frame member 211 (which may be integral with the central lateral frame member 67) so as to freely rotate and retract the flexible elongated member 210 or to allow the elongated member 210 to be extended from the retractable cable wheel 208.

The biasing mechanism 108 is positioned and configured to allow the user to push a dynamic support 100 toward the second end 206 of the dynamic support rail assembly 202, typically using a portion of the storage container 14 itself, to expand the container space 92 when he or she is placing the storage container 14 therein or removing the storage container 14 therefrom and then bias the dynamic support 100 back toward the first end 204 of the dynamic support rail assembly 202. As set forth above, the biasing mechanism 108 should be configured to press the lip engaging device 102 sufficiently hard enough against the storage container 14, typically at the second sidewall 30 below the second lip 46, to hold the storage container 14 between the lip engaging device 102 of the dynamic support 100c and the lip engaging member 98 of the static container support member 88, as further described herein, to securely hold the support container 14 in the apparatus 10. The biasing mechanism 108 should be able to un-retract or extend sufficiently easily that the user will be able to push the dynamic support 100 backwards, using the moving mechanism 142, toward the second end 206 of the respective dynamic support rail assembly 202 so the user will be able to avail himself or herself of substantially the full container space 92 (i.e., the entire amount of the distance between the lip engaging member 98 and the lip engaging device 102 when the dynamic support 100 is at or near the second end 206 of the dynamic support rail assembly 202) for larger sized storage containers 14. The central lateral frame member 67 should be positioned, relative to the lip engaging member 98, so that the smallest sized storage container 14 that the user may desire to utilize with the container storage apparatus 10 can be utilized (i.e., so it will not fail to be held in container space 92). Specifically, the central lateral frame member 67 having the retractable cable wheel 208 mounted thereto by wheel frame member 211 should not be so far rearward that when the retractable cable wheel 208 is fully retracted, with the dynamic support 100 substantially at or near the retractable cable wheel 208, the container space 92 is too wide for the width of the container body 15 of the storage container 14. Typically, a minimum width for the empty container space 92 is thirteen inches, which will be able to allow the user to use the new apparatus 10 for fourteen inch wide storage containers 14.

The moving mechanism 142 is structured and arranged to allow a dynamic support 100 to move forward, namely toward the front lateral frame member 64 and static container support member 88 at the front side 72 of the apparatus 10, and rearward, namely toward the back lateral frame member 66 at the back side 74 of the apparatus 10, as biased forward by the biasing mechanism 108 or pushed rearward by the user (such as when he or she places a storage container 14 in the container space 92). In the embodiment shown in FIGS. 23-38, each moving mechanism 142 is configured to movably engage one of the dynamic support rail assemblies 202 to allow the dynamic support 100 to move towards and away from the first end 204 and second end 206 of the dynamic support rail assemblies 202. The moving mechanism 142 in the third embodiment of the present invention, as best shown in FIGS. 30-34, one or more rollers, wheels or other track engaging devices 212 that are sized and configured to moveably engage a track 214 that is associated with a dynamic support rail assembly 202, as best shown in FIGS. 30-32. In the embodiment shown in the figures, the track 214 is formed between the pair of dynamic support frame members 203a and 203b and the track engaging devices 212 are sized and configured to fit in and move along the track 214 inside the dynamic support frame members 203a/203b, as best shown in FIG. 30. In the embodiment shown in the figures, the moving mechanism 142 utilizes four track engaging devices 212, as best shown in FIGS. 33-34. The track engaging devices 212 are moveably secured in place using a pair of support plates 216 and 218 that move on the outside of the dynamic support rail assemblies 202 as the moving mechanism 142 moves forward and rearward. The track engaging devices 212 rotate on an axle 220, which is threaded on the ends to be engaged by a nut or other attachment device 222 to rotatably secure the track engaging devices 212 between the two support plates 216/218 that move outside of the dynamic support rail assembly 202, as best shown in FIGS. 33-34.

As will be readily appreciated by persons skilled in the relevant art, the moving mechanism 142 of the third embodiment can be configured in a wide variety of different manners and utilize a variety of different components as the track engaging devices 212, such as wheels, rollers and the like that move along a track 214 (whether it is enclosed as shown in the figures or not). In addition, the moving mechanism 142 can have less or more track engaging devices than shown in the figures and use a combination of wheels, rollers and/or other devices that can move along the track 214, including along frame member 68/70/71 as shown with regard to the second embodiment. As such, the moving mechanism 142 shown in the figures is intended to be representative of one type of a mechanism that can be utilized with the present invention to allow the dynamic supports 100 to move forward and rearward along the length (or most thereof) of the dynamic support rail assembly 202.

For the third embodiment, the lip support assembly 144 comprises a downwardly directed lip support member 224, as best shown in FIGS. 26-27 and 30-34. The term "downwardly" refers to a direction away from the area supports 52 to which the apparatus 10 is attached and generally toward the ground, floor or other surface. The upper end of the lip support member 224 is attached to or integral with the dynamic support frame members 203 and the lower end of the lip support member 224 is attached to or integral with the lip engaging device 102. The lip engaging device 102 is attached to or integral with the lip support member 224 so as to be disposed generally facing, but in spaced apart relation to, the lip engaging member 98 of the static container support member 88. When the biasing mechanism 108 biases the dynamic support 100 towards the static container support member 88, the lip engaging device 102 will move toward the lip engaging member 98. When the storage container 14 is in the container space 92, the lip engaging member 98 and the lip engaging device 102 will, respectively, engage the storage container 14 below the first lip 44 and second lip 46 thereof. As will be readily understood by persons skilled in the art, the lip support assembly 144 can be configured in a variety of different manners using one or more lip support members 224. In one embodiment, the lip support assembly 144 can comprise a single generally curved lip support member that curves forward to direct the lip engaging device 102 towards the lip engaging member 98. Many other configurations are also possible for the lip support assembly 144.

As set forth above, both form and functionality are improved with the embodiment set forth in FIGS. 23-38. The retractable cable wheel 208 and the elongated member 210 provides adequate, but not overbearing, resistance and bias and the use of the track engaging devices 212 that move in (or along) the track 214 provides for much smoother operation compared to the first embodiment. As can be seen when comparing FIGS. 5-6 to FIGS. 23-29, there is also no need for excess width utilizing the configuration of the third embodiment, as the dynamic support members 100 do not need to be nearly as long or extend rearward as far (i.e., for the insert member 104 to be slidably received in the tubular receiver member 106) in order to facilitate the movement of the dynamic support members 100 and the overall functionality of the apparatus 10 with regard to receiving and supporting a storage container 14.

In addition to the improved overall ease of use and smaller profile of the apparatus of the third embodiment, this configuration enables implementation of a braking or locking system, shown as 168 in FIGS. 23-29 and 35-38, that provides a myriad of benefits for the apparatus 10. The locking system 168 of the third embodiment of the new container storage apparatus 10 comprises a locking rod or other rigid elongated locking member 226, a pair of handles 172 at each side 76/78 of the apparatus 10 that are connected to the locking member 226, a plurality of locking member supports 228 that support the locking member 226 below the central lateral frame member 67 and a plurality of wheel engaging members 230 (one for each of the retractable cable wheels 208) that are attached to the locking member 226 and configured to tightly engage the retractable cable wheel 208 of the biasing mechanism 108 in a manner that prevents rotation of the retractable cable wheel 208. As best shown in FIGS. 23 and 29, the length of the locking member 226 is substantially the same as the width of the frame 62, from the first/left side 76 to the second/right side 78, that supports the dynamic supports 100 so the locking member 226 will be able to lockingly engage each of the biasing mechanisms 108 and be connected to both handles 172. If only one handle 172 is utilized, it may not be necessary for the locking member 226 to extend all the way from side 76 to side 78, as long as the locking member 226 is long enough to operate (as set forth below) each of the wheel engaging members 230 to engage each biasing mechanism 108. The use of two handles 172 allows the user to engage and operate the locking system 168 from either side 76/78 of the apparatus 10. In a preferred embodiment, the elongated locking member 226 is a single long, rigid rod.

The locking member supports 228 are sized and configured to be mounted to the underside surface of the central lateral frame member 67 and engage the locking member 226 to hold the locking member 226 in place. As will be readily appreciated by persons who are skilled in the art, it is necessary for the locking member supports 228 to engage the locking member 226 in a manner that does not interfere with the operation of the locking system 168, namely by allowing rotation of the locking member 226, as set forth in more detail below. Each of the wheel engaging members 230 are fixedly attached to the locking member 226 and sized and configured to engage a surface (typically the lower surface) of the retractable cable wheel 208, as shown in FIGS. 30-32. In one embodiment, each of the wheel engaging members 230 has an upper planar surface 232, best shown in FIGS. 31-32, that is configured to engage the lower surface of a retractable cable wheel 208 in a manner that prevents further rotation of the retractable cable wheel 208 and, therefore, any movement of the dynamic supports 100 away from the biasing mechanism 108. As such, when the locking system 108 is engaged, it will prevent any unintentional or accidental expansion of the container space 92 (i.e., the moveable lip engaging device 102 pulling away from the stationary lip engaging member 98) that could result in one or more storage container 14 falling out of the container storage apparatus 10, which could damage the storage container 14 and/or the contents of the storage container 14. The user engages the locking mechanism 168 of the third embodiment of the new container storage apparatus 10 by pivoting one of the handles 172 slightly downward. When a handle 172 pivots downward, the locking member 226 will rotate, free of any interference by the locking member support 228, with the rotation of the handle 172. In contrast, because the wheel engaging members 230 are fixedly attached to the locking member 226, each of the wheel engaging members 230 will also rotate with the rotating movement of the locking member 226 to engage the retractable cable wheel 208 to prevent any rotation of the retractable cable wheel 208 and, as such, any movement of the dynamic support 100 that could drop a storage container 14.

Although the locking mechanism 168 of the second embodiment can also be utilized with the third embodiment of the new container storage apparatus 10, it is believed the locking mechanism 168 described above and shown in FIGS. 35-38 is less expensive to manufacture, easier to use and more effective. As will be readily appreciated by persons who are skilled in the relevant art, a number of different configurations of the locking system 168 can be utilized with the apparatus 10. The locking system 168 is particularly useful when using the apparatus 10 to secure storage containers 14 in a moving vehicle, such as a moving van or the like. Another useful benefit of utilizing the locking system 168 is that the apparatus 10 can be configured with a locking device, such as a padlock or the like, so the user can lock the storage containers 14 in the apparatus 10 to prevent movement of the handles 172 that would disengage the wheel engaging members 230 from the retractable cable wheels 208, thereby making it difficult for unauthorized persons or thieves to gain access to the items in the storage containers 14.

The apparatus 10 is attached to the area supports 52 in the garage, shed, room, closet or other area where the user would find it beneficial to store containers 14 above the floor and below the area supports 52. The apparatus 10 is attached using connecting mechanisms 58 that sized and configured to fit through the apertures 82 (slots) in the first lateral frame member 66 and back lateral frame member 68, of sufficient strength to secure the container storage apparatus 10 in place and which are appropriate for the materials of the apparatus 10 and area supports 52. In one embodiment, bolts, screws, nails or like connectors 60 are utilized to connect the upper frame 62 of the mounting section 50 to the area supports 52, such as a joist 54, ceiling 56 or the like. In the embodiment shown in FIGS. 3-4, 6, 8-9 and 13, the connectors 60 are received through the slot apertures 82 in the upper surface 80 of each of the first/front lateral frame member 64 and second/back lateral frame member 66. The second embodiment can also include the slot apertures 82, or other mechanisms to attach the mounting section 50 to the joists, 54, ceiling 56 or other area supports 52. In the third embodiment, the apparatus 10 is attached using connecting mechanisms 58 that sized and configured to fit through the apertures 82 in the mounting strips 200 that are attached to or integral with the first lateral frame member 66 and back lateral frame member 68. In other embodiments, the lateral frame members 64/66 may be welded or otherwise fixedly attached, directly or indirectly, to the area supports 52, depending on the material of the area supports 52 and the materials used for the apparatus 10, to secure the apparatus 10 in the desired location in the area where storing the storage containers 14 is desired.

Figure 37:
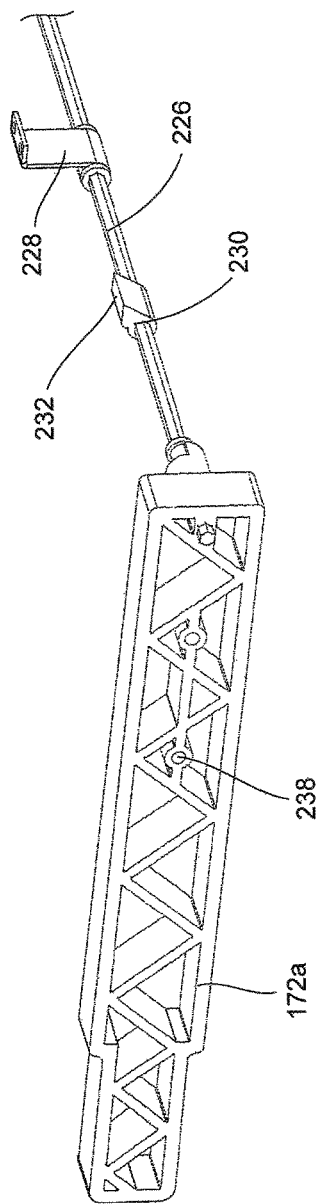
FIG. 37 is a side perspective view of the left end of the braking assembly of FIG. 35 shown with out the brake mount.
Figure 38:
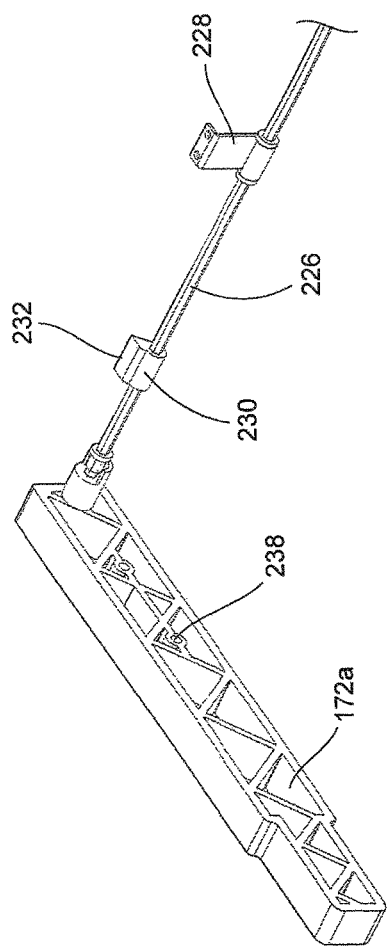
FIG. 38 is a top perspective view of the left end of the braking assembly of FIG. 37.
Figure 45:
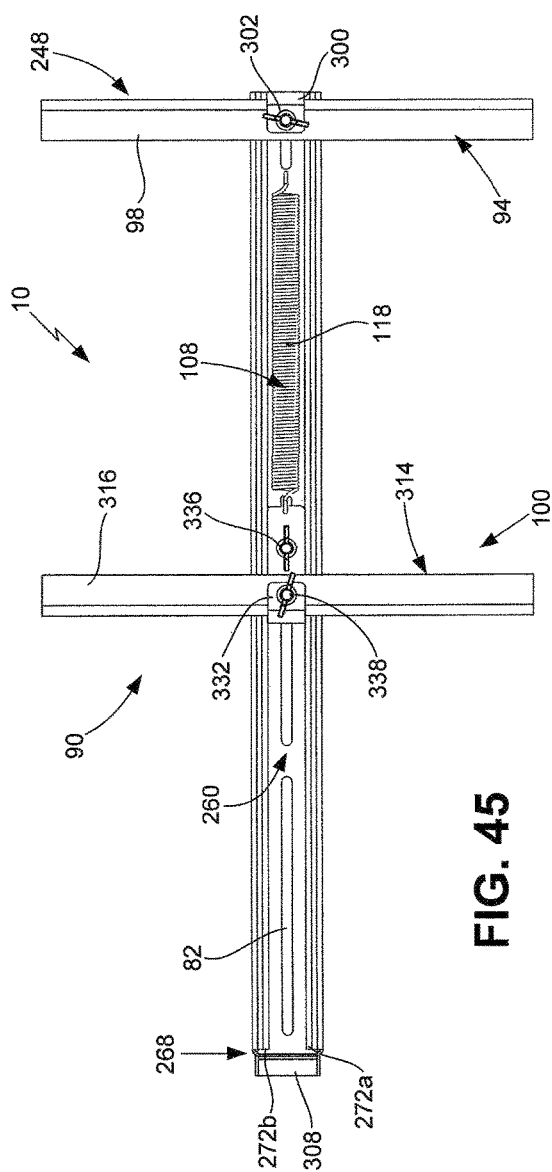
FIG. 45 is a bottom view of the container storage apparatus of FIG. 39.

The third embodiment of the new container storage apparatus 10 of the present invention shown in FIGS. 23-38 includes a number of features for ease of manufacturing, transportation and installation. One such feature is that many of the components are modular or modular-like in that they can be easily pieced together to form the complete apparatus 10. For instance, the locking system 168 can utilize a modular mounting assembly 234 at each side of the locking system 168, as best shown in FIGS. 35-36, to mount the locking system 168 to the frame 62, as shown in FIGS. 23-25. The modular mounting assembly 234 is structured and arranged engage the first/left transverse frame member 68 and second/right transverse frame member 68 and secure the locking system 168 to the frame 62. The apparatus 10 can also include hook members 236 at each of the four corners of the frame 62 that are utilized to make it easier for the user to secure the frame 62 of the apparatus 10 to the area supports 52. In use, the user would install eye or J-shaped bolts or other suitable devices near the location where he or she wants to mount the apparatus 10 and then hang the apparatus 10 from the devices. With the apparatus 10 hanging from the devices by the hook members 236, the user can easily lift the apparatus 10 in place against the area supports 52 and secure the apparatus 10 to the area supports 52 using the connecting mechanisms 58, such as connectors 60. Another feature of the apparatus 10 shown with regard to the third embodiment, is that one apparatus 10 can be connected to one or more adjacent apparatuses 10 so that the movement of one handle 172 will move the handles 172 of each of the adjacent apparatuses 10. In one configuration, this feature is achieved by providing connecting apertures 238 in each of the handles 172, as best shown in FIGS. 37 and 38, that are sized and configured to receive a bolt or other connector to connect one handle 172 to an adjacent handle 172 (i.e., connecting handle 172a of one apparatus 10 to handle 172b of the adjacent apparatus 10) to, essentially, "string" multiple apparatuses 10 together to make a long row of apparatuses 10 that can hold many storage containers 10. Yet another feature shown in the third embodiment, is the apparatus 10 having multiple sections that are joined at one or more fold lines 240, such as best shown in FIGS. 23-24 and 28-29, which allow the one half of the apparatus 10 to be folded over onto the other half of the apparatus 10 to reduce the length of the apparatus 10 for shipping purposes. If desired, the apparatus 10 can have more than one fold line 240 so it may be folded over more than once to further reduce the length of the apparatus 10 for shipping. Although the features described above are shown with regard to the third embodiment of the present invention, persons skilled in the art will readily appreciate that some or all of these features may also be incorporated into the first and second embodiments.

A fourth embodiment of the container storage apparatus 10 is shown in FIGS. 39-63. To the extent as may be applicable, the various components of the apparatus 10 and system 12 of the present invention and the disclosure of those components, whether with pertaining to the configuration, operation or use of those components, set forth with regard to the disclosure of the first, second and third embodiments of the present invention are hereby incorporated herein with regard to the disclosure of the various configurations of the fourth embodiment as though fully set forth herein. As set forth in more detail below, the fourth embodiment of the apparatus 10 is structured and arranged to be mounted to one or more area supports 52, such as joist 54, ceiling 56 or the like, in order to removably support one or more storage containers 14 immediately below the area supports 52 in a manner that positions the bottom wall 36 of the storage containers 14 in spaced apart relation to the floor, ground or any other lower surface 250. For the purposes of describing the present invention, the lower surface 250 may be any type of surface above which it is beneficial to place the storage container 14 (i.e., whether in a garage, house, office, vehicle or etc.). The apparatus 10 and system 12 of the fourth embodiment accomplishes the objectives of the present invention in a substantially more compact sized configuration than the first, second and third embodiments of the present invention, as set forth above and shown in FIGS. 3-38. The benefits of the fourth embodiment include: (a) the new apparatus 10 generally requires significantly less materials and is much less expensive to manufacture than the above embodiments; (b) the new apparatus 10 has a much lower weight and, when in its disassembled condition (as described below) the apparatus 10 is very compact, resulting in the apparatus 10 being much easier and more efficient to ship and store; and (c) the apparatus 10 of the fourth embodiment is likely to be much easier for the typical user to install than the first three embodiments. As a result, configuration of the apparatus 10 and system 12 of the fourth embodiment is likely to be the preferred embodiment of the present invention.

The fourth embodiment of the apparatus 10 and system 12 of the present invention comprises a unified or combined container engaging section 48 and mounting section 50, with the container engaging section 48 being structured and arranged to removably support a storage container 14 and a mounting section 50 that is structured and arranged to mount the apparatus 10 to one or more area support 52 (typically a plurality of joists or other roof members 54). Therefore, in this embodiment there is no designated upper/lower frame, although there could be if desired. The preferred configurations of the mounting section 50 of the fourth embodiment comprise a single elongated support rail 252 that is utilized as the dynamic support rail (generally similar in use to the transverse frame members 68/70/71 of the second embodiment or the dynamic support rail assembly 202 of the third embodiment) and the lateral frame members 64/66, with apertures 82, of the upper frame 62 that is used to mount the apparatus 10 to the area supports 52. As will be readily appreciated by persons who are skilled in the art, the apparatus 10 of the fourth embodiment provides either a single location for hanging a storage container 14 or, when multiple apparatuses 10 are connected together, a single linear row of apparatuses 10 for hanging multiple storage containers 14 below the area supports 52. If desired, however, the support rail 252 may be mounted, either fixedly or removably, to an upper frame 62 that supports a series of parallel spaced apart apparatuses 10, whether each row comprises a single apparatus 10 or a plurality of apparatuses 10, for hanging a plurality of storage containers 13 below the area supports 52, particularly a ceiling 56 in a building, garage, vehicle interior and the like. In such uses, the upper frame 62 can be generally configured as set forth in one of the three previously described embodiments or modified as desired, necessary or beneficial for the apparatus 10 described in the fourth embodiment of the present invention.

As set forth in more detail below, the support rail 252 supports various components of the container engaging section 48, namely a static container support assembly 248 (as opposed to static container support member 88 in the first, second and third embodiments), the dynamic container support assembly 90, and a storage container 14 in the container space 92, as shown in FIGS. 39-46, 53-54 and 58-61. The elongated support rail 252 has a plurality of walls, namely an upper wall 254, first/left sidewall 256 and second/right sidewall 258, that define an interior channel 260 through which portions of the dynamic support assembly 90 moves (namely, as set forth below, the moving mechanism 142) as the apparatus 10 moves between a first or biased position 262 (which is the empty or default position) and a second or container support position 264, as shown with regard, respectively, to FIGS. 53 and 54. The support rail 252 has a first or front end 266 at the front side 72 of the apparatus 10 and a second or back end 268 at the back side 74 of the apparatus 10, as shown in FIGS. 39, 40, 44 and 46-54. The support rail 252 is sized and configured, as may be necessary or deemed desirable, to safely support the apparatus 10, containers 14 and the items stored in the containers 14 below the area supports 52 in the garage, shed, room, closet or other area and above the lower surface 250 where the apparatus 10 and system 12 will be utilized. The support rail 252 can be made out of metal, plastic, fiberglass, composites and other materials, the selection of which will generally affect the weight of the containers 14 (and their items) that can be supported by the apparatus 10.

Figure 54:
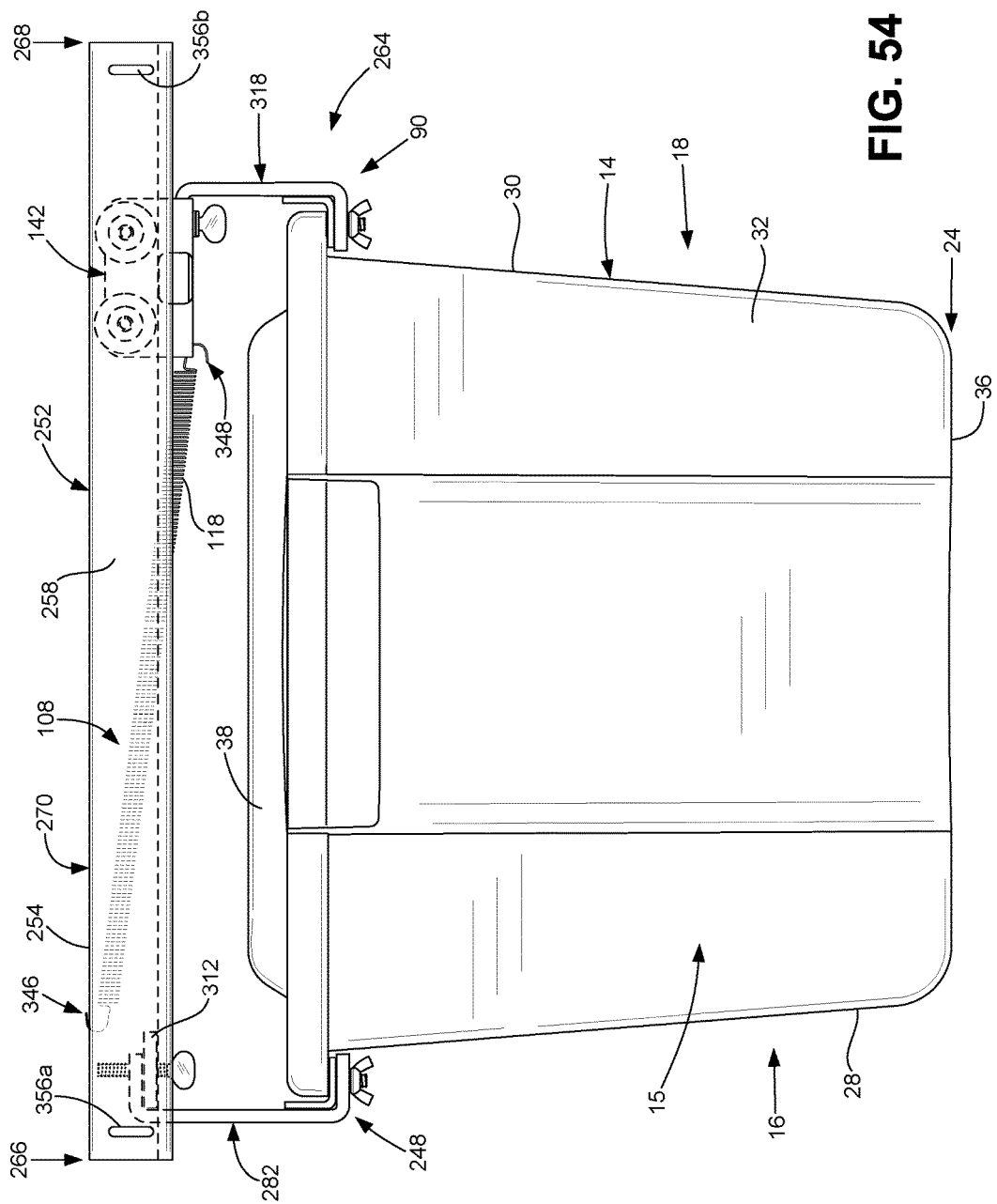
FIG. 54 is a right side view of the container storage apparatus of FIG. 53 with the storage container of FIG. 1 held in the container space between the static container support assembly and dynamic container support assembly, with the apparatus in its second or container storage position.

To mount the support rail 252 to the area supports 52, the upper wall 256 of the support rail 252 has one or more apertures 82 therethrough that are utilized to securely position the upper surface 270 of the upper wall 256 in abutting engagement with, directly or indirectly, the area supports 52, as shown in FIG. 54. A connecting mechanism 58 is utilized through one or more of the apertures 82 to secure the support rail 252 to the area supports. As will be readily appreciated by persons who are skilled in the art, many installations of apparatus 10 will secure the support rail of the apparatus 10 to one or more wooden joists 54. As such, the connecting mechanism 58 that is utilized for mounting the apparatus 10 to the area supports 52 will include one or more connectors, such as a bolt or screw, that are fit through the apertures 82 and are inserted into or through the joists 54. For the fourth embodiment, the apertures 82 are configured as slots that extend at least substantially the length of the upper surface 270. The use of slots as apertures 82 will provide the user with increased flexibility with regard to the positioning of the support rail relative to the area supports 52 (i.e., joists 54), as opposed to having a plurality of individual apertures 82 through the upper wall 256 or requiring the user or other person installing apparatus 10 to drill a hole through the support rail 252. If desired, the apertures 82 can comprise one or more circular holes through the upper wall 256 instead of slots. Typically, however, for such use there will be a plurality of such holes along the length of the upper wall 256 to allow the user to select which one or more of the holes are aligned with the area supports 52. As will be readily appreciated by persons skilled in the art, the support rail 252 will typically, but not exclusively, be mounted to the one or more area supports 52 using an appropriate connecting mechanism 58, such as one or more nails, screws, bolts or other connectors 60 (shown in FIGS. 3-4 and 60) or by welding or other appropriate connecting mechanisms 58 depending on the materials utilized for support rail 252 of apparatus 10 and the area supports 52. As shown in FIGS. 3-4 and 54, the system 12 of the present invention comprises the apparatus 10, one or more containers 14, area supports 52 (whether joists 54, ceiling 56, roof or any other structurally adequate members), and the lower surface 250.

As set forth above, the support rail 252 is structured and arranged to moveably support the dynamic container support assembly 90 as it moves toward and away from the stationary container support member 248. As with the second embodiment, the fourth embodiment of apparatus 10 utilizes a biasing mechanism 108 to pull the dynamic container support assembly 90 toward the static container support mechanism 248 in a manner that engages the storage container 14 so as to securely support the storage container 14 in the container space 92 of apparatus 10. To place the storage container 14 in the container space 92 of the apparatus 10 or to remove the storage container 14 from the apparatus 10, the user will press against the dynamic container support assembly 90 in the rearward direction (i.e., toward the back side 74 of the apparatus 10) to overcome the biasing mechanism 108 and push the dynamic container support assembly 90 away from the static container support assembly 248. As such, the support rail 252 is structured and arranged to moveably support the moving mechanism 142 as the dynamic support 100 moves toward and away from the stationary container support member 248 in response, respectively, to the biasing mechanism 108 placing the apparatus 10 in its biased position 262 or the user placing the apparatus 10 in its container storage position 264, as shown with regard to FIGS. 53 and 54. In the fourth embodiment, the moving mechanism 142 is moveably disposed inside the interior channel 260 of the support rail 252, as best shown in FIGS. 53 and 54, which is in contrast to the second embodiment where the moving mechanism 108 is positioned on the upper and lower outer edges of the transverse frame members 68/70/71, as best shown in FIGS. 15-19.

Figure 53:
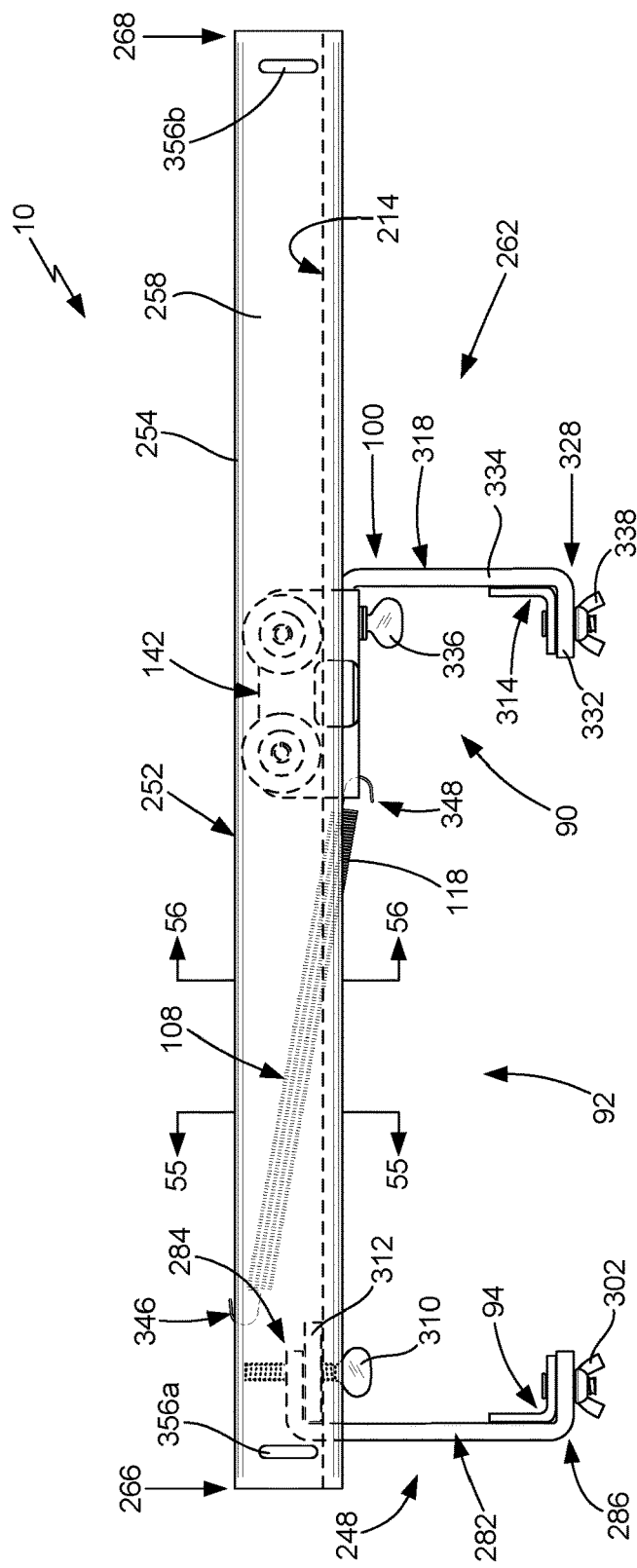
FIG. 53 is a right side view of a second configuration of the container storage apparatus of the fourth embodiment of the present invention, with the dynamic container support assembly biased by said biasing mechanism toward said static container support assembly placing the apparatus in its first or biased position.
Figure 61:
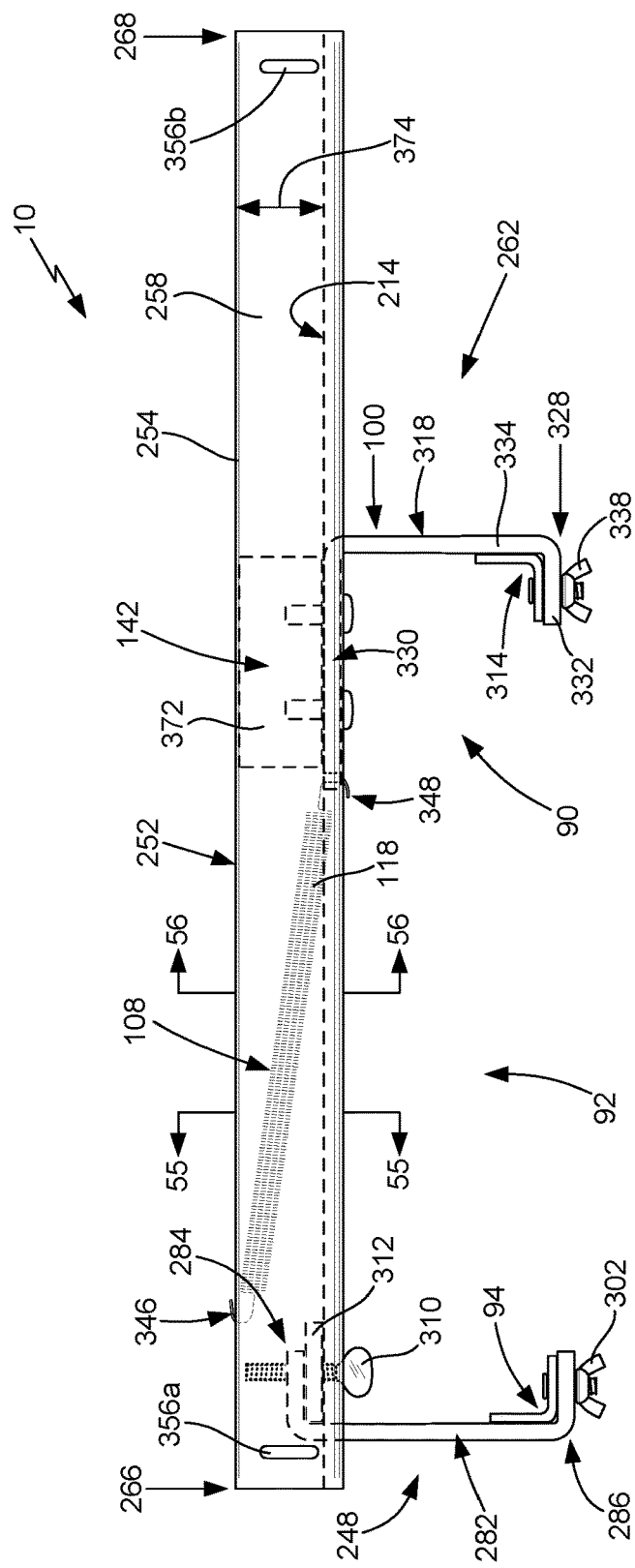
FIG. 61 is a right side view of a third configuration of the container storage apparatus of the fourth embodiment of the present invention, with the dynamic container support assembly biased by said biasing mechanism toward said static container support assembly placing the apparatus in its first or biased position.
Figure 63:
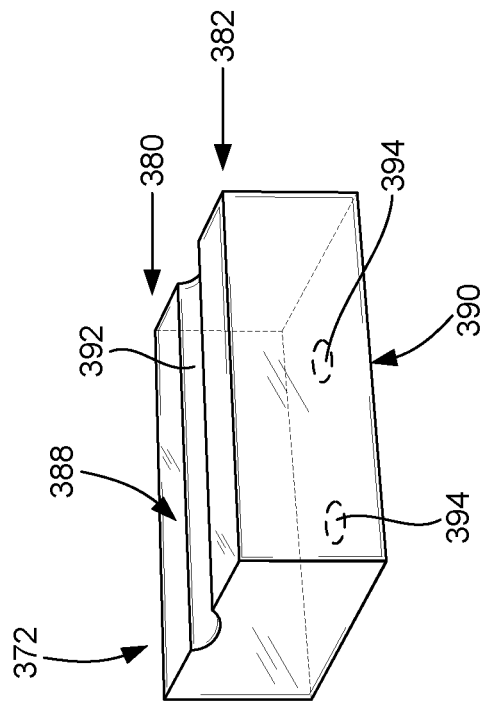
FIG. 63 is a side perspective view of the moving mechanism of the container storage apparatus of FIG. 62 shown separate from the dynamic support bracket.
Figure 62:
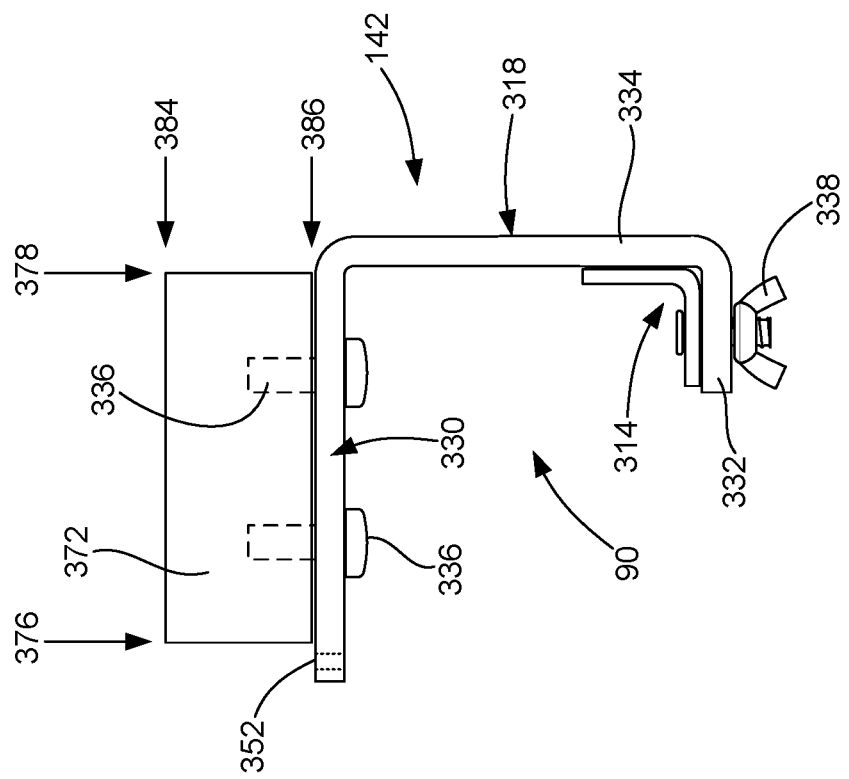
FIG. 62 is a side view of the moving mechanism of the embodiment of the container storage apparatus of FIG. 61 attached to the dynamic support bracket of the dynamic container support assembly.

As set forth in more detail below, the moving mechanism 142 of the fourth embodiment of the present invention, best shown in FIGS. 52-54,56 and 61-63 can comprise one or more rollers, wheels or other track engaging devices 212 that are sized and configured to moveably engage a track 214 associated with support rail 252, as best shown in FIGS. 53-54, or it may comprise one or more blocks, beams, rails or other track engaging members 372 that are sized and configured to slidably engage or otherwise move along the track 214, as shown in FIGS. 61-63. In a preferred configuration of the fourth embodiment, the track 214 is disposed inside the interior channel 260 defined by the walls 254/256/258 of the support rail 252. As will be readily appreciated by persons who are skilled in the art, in certain configurations of the apparatus 10 of the fourth embodiment, the moving mechanism 142 is sized and configured to fit inside the interior channel 260 and move (whether roll, slide or the like) along the track 214 defined by the support rail 252. In the embodiment shown in the various figures for the fourth embodiment, the track 214 is formed by a pair of upturned sections 272a and 272b of the support rail 252, as best shown in FIGS. 48, 53 and 61. More specifically, the track 214 of the preferred configurations of the fourth embodiment of the apparatus 10 of the present invention is defined by the upturned sections 272a and 272b that are integrally formed with each of the first sidewall 256 and second sidewall 258, at (respectively) the lower ends 274 and 276 of the sidewalls 256/258, such that the upturned sections 272a/272b that form the track 214 are disposed inside interior channel 260, as best shown in FIGS. 48, 53 and 61. In another embodiment, support rail 252 can comprise a pair of inwardly disposed, generally planar sections, instead of the upturned sections 252a/252b, associated with each of the sidewalls 256/258 which the moving mechanism 142 will moveably engage as dynamic support 100 moves toward and away from the static container support assembly 248, as described in more detail below. There are also various other configurations possible for the track 214 being positioned inside an interior channel 260 of the support rail 252, such as shown with regard to the third embodiment of the present invention (i.e., as shown in FIG. 30). In addition, the track 214 may be positioned on an outer surface, or on a pair of outer surfaces, associated with the support rail 252, such as shown with regard to the second embodiment of the present invention (i.e., as shown in FIG. 19). As will be readily appreciated by persons who are skilled in the art, the track 214 associated with the support rail 252 can be configured in a wide variety of different manners as long as the track 214 and moving mechanism 142 are both cooperatively configured with each other to allow the moving mechanism 142 to move the dynamic support 100 toward and away from the static container support assembly 248 (in response to the user or being biased by biasing mechanism 108).

In one configuration of the fourth embodiment of the apparatus 10 of the present invention, the support rail 252 is or comprises a Unistrut® slotted channel, available from Atkore International, Inc., which is or can be provided with the walls 254/256/258, apertures 82 (whether slots or holes) and upturned sections 272a/272b. The configuration of Unistrut® channels is generally well known in the construction and related industries. In another embodiment, the support rail 252 is made from metal, plastic, fiberglass, composites or other materials into the general shape shown in the figures or as may otherwise be appropriate for the support rail 252 to function as required for the apparatus 10 and system 12.

Figure 60:
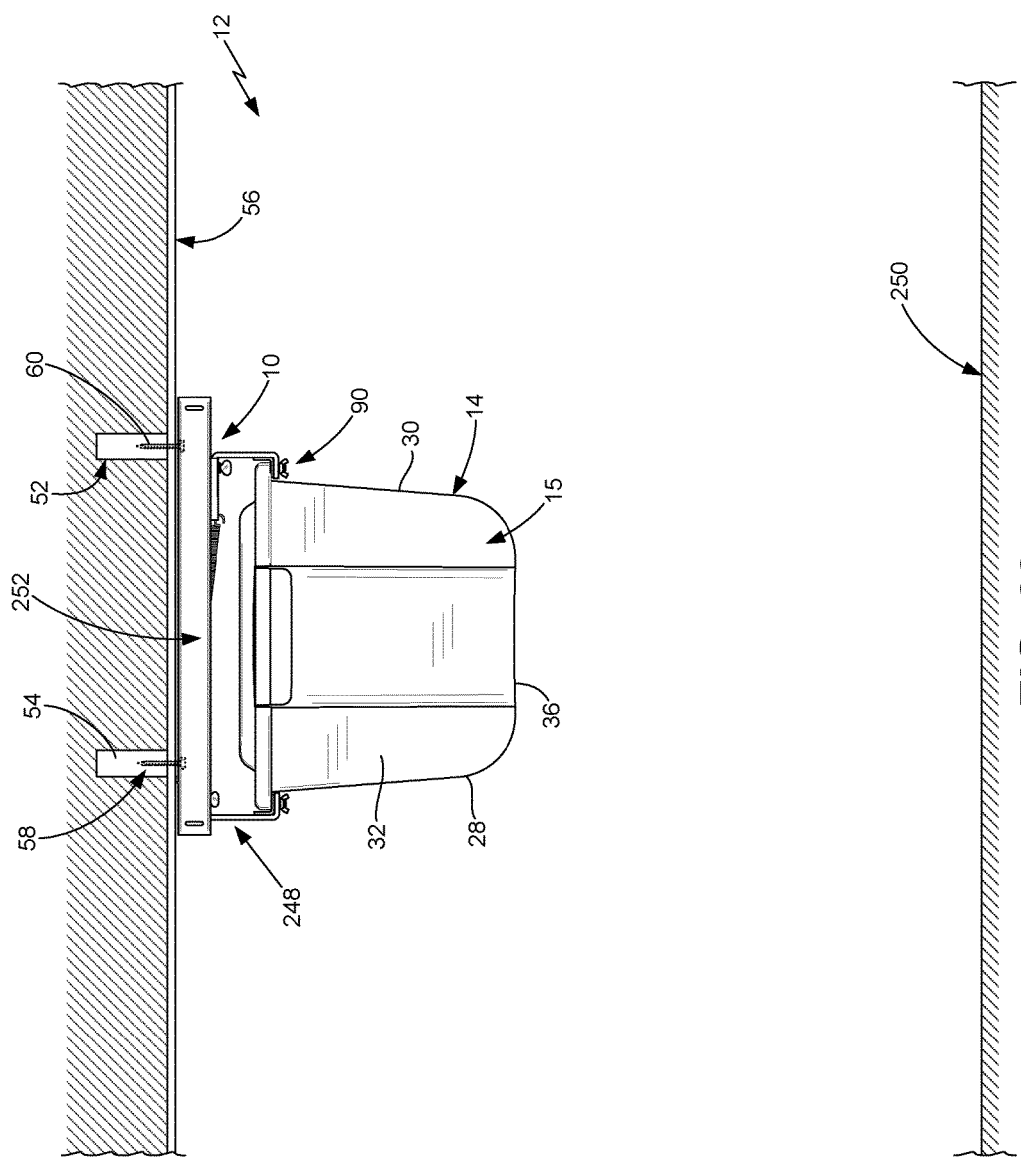
FIG. 60 is a second or right side view of the apparatus of FIG. 53 shown attached to area supports and in use to support a storage container with the bottom wall of the container above a floor, ground or other surface.

As set forth above, the apparatus 10 generally comprises a static container support assembly 248 and a dynamic container support assembly 90 that define the container space 92 therebetween, as best shown in FIGS. 39, 41, 43-46, 53 and 58-59, and which cooperate together to engage and hold the container 14 in the container space 92 so as to store the container 14 in the apparatus 10, as shown in FIGS. 54 and 60. As set forth in more detail below, relative to the support rail 252, the static container support assembly 248 is stationary so as to provide a support surface that will engage one of the lips 44/46 of a container 14 and the dynamic container support assembly 90 moves inward and outward, the amount of which depends on the width W or length L of the container 14, to engage the opposite facing lip 44/46 of the container 14 in order to securely, but easily removably, hold the container 14 in the apparatus 10.

In the embodiment shown in the figures, the static container support assembly 248 comprises an elongated L-shaped static support member 94 having a first and left end 278 and a second or right end 280 that defines a vertical member 96 and a horizontally disposed lip engaging member 98. The lip engaging member 98 attaches to, directly or indirectly, the support rail 252, typically at or near one end 266/268 of the support rail 252 (such as the first end 266 shown in FIGS. 39-41, 43-46, 53-54 and 58-60). The lip engaging member 98 is sized and configured to engage one of the lips 44/46 of the container 14, as shown in FIGS. 54 and 60. In one embodiment, the lip engaging member 98 is substantially horizontal so as to extend inwardly into the container space 92 so a lip, such as first lip 44 as shown in FIGS. 54 and 60, of the container 14 will be positioned on top of or otherwise supported by the lip engaging member 98 when the container 14 is being pressed against the static container support assembly 248 by the dynamic container support assembly 90. As will be readily appreciated by persons skilled in the relevant art, the lip engaging member 98 can be of a wide variety of different sizes and configurations, including the L-shaped member shown in the figures, a V-shaped member that has an upwardly angled member, a curved or hook-like end and the like that engages a lip 44/46 of the container 14 to hold one side 16/18 or one end 20/22 of container 14. The static support member 94 should have a length (i.e., from first end 278 to its second end 280) that will be sufficient to safely support the desired containers 14. As with most of the other components of the apparatus 10, the static support member 94 can be made out of a wide variety of materials, with the various components thereof being attached or integral to each other and attached to or integral with support rail 252 of mounting section 50.

Figure 46:
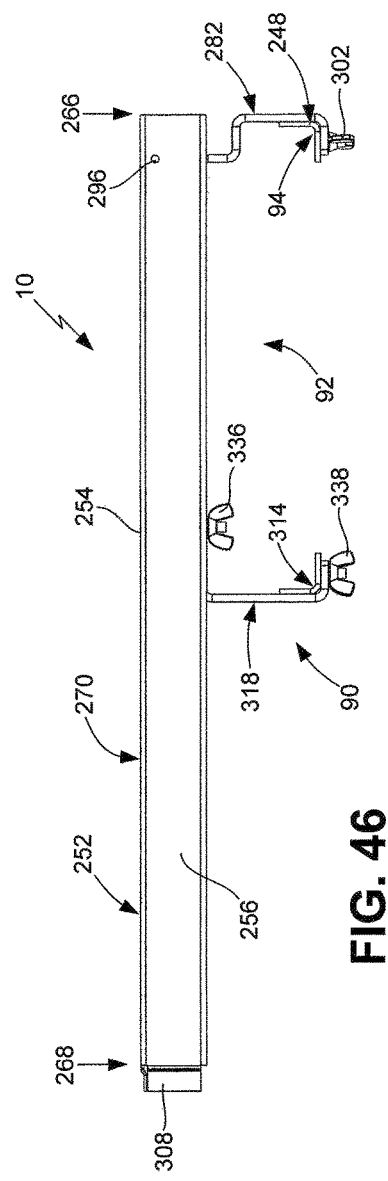
FIG. 46 is a left view of the container storage apparatus of FIG. 39.
Figure 47:
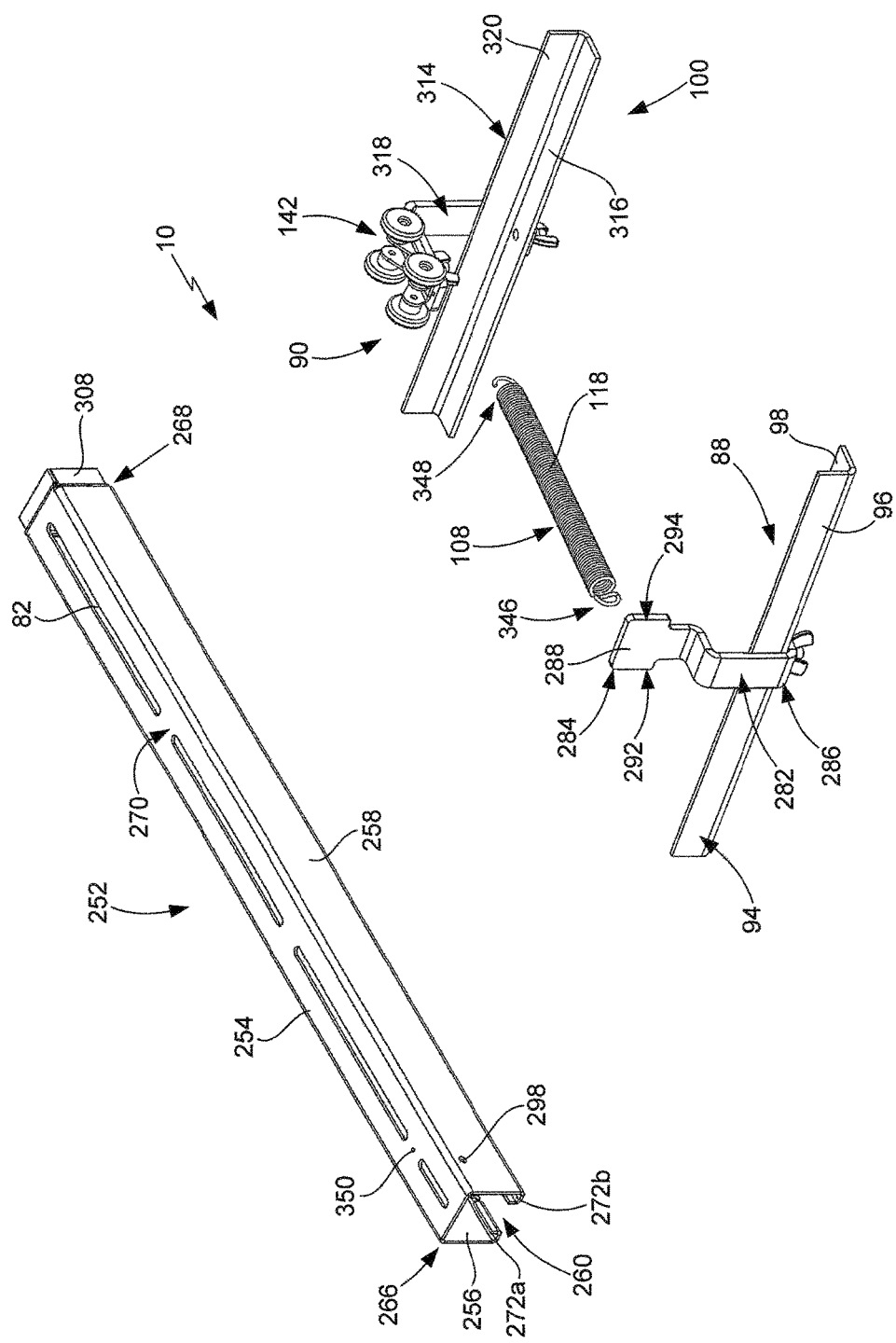
FIG. 47 is a partially exploded top front perspective view of the container storage apparatus of FIG. 39 showing the static container support assembly and the dynamic container support assembly separate from the support rail assembly.

In the embodiment shown in the figures with regard to the fourth embodiment of the apparatus 10 of the present invention, the static container support assembly 248 also comprises a static bracket 282 that connects the static support member 94 to the support rail 252, as best shown in FIGS. 39-40, 47, 53-55 and 58-60. The static bracket 282 has an upper end 284 that is disposed in the interior channel 260 to connect the static bracket 282 to the support rail 252 and a lower end 286 that connects to or is integral with the static support member 94, as best shown in FIG. 47. The upper end 284 can be attached to or integral with the support rail 252. In the embodiments shown in the figures, the static bracket 282 has an enlarged section 288 towards the upper end 284 thereof that is sized and configured to removably fit within the interior channel 260 by engaging a cut-out section 290 in the upturned sections 272a/272b, as best shown in FIGS. 39, 47-48 and 50. The sides 292 and 294 of the enlarged section 288 generally abut the interior surfaces of the sidewalls 256/258, respectively, when the static bracket 282 is positioned inside the interior channel 260 of the support member 252, as best shown in FIG. 40. A set screw or like connector 296 (shown in FIGS. 39, 41, 44 and 46) can be inserted through an aperture 298 (shown in FIGS. 47-48) on each of the sidewalls 256/258 to engage the sides 292/294 of the enlarged section 288 to secure the static bracket 282 and, therefore, static container support assembly 248, to the support rail 252 so the static bracket 282 will not move relative to the support rail 252, thereby providing the stationary component of the new apparatus 10 of the present invention. As best shown in FIG. 50, the lower end 286 of the static bracket 282 has an inwardly disposed static member support 300 that connects to or is integral with the static support member 94, as best shown in FIGS. 44 and 46, so as to position the static support member 94 where it will engage the storage container 14 when apparatus 10 is in use. In the configuration shown in the relevant figures, a connecting element 302 removably interconnects the static support member 94 to the static member support 300 of the static bracket 282, as shown in FIGS. 40 and 44-46.

In the embodiment of FIGS. 39-52, the static bracket 282 also comprises an offset area 304 (best shown in FIG. 50) that positions the enlarged section 288 inward so as to provide an insert area 306 (best shown in FIG. 39) that is sized and configured to removably receive an extension section 308 that is at the second end 268 of each support rail 252 so the user can easily connect two adjacent apparatuses 10 together, with the support rails 252 thereof being adjacent in an end-to-end manner to store multiple storage containers 14. The configuration and use of such connections is described in more detail below.

In the configurations of the fourth embodiment shown in FIGS. 53-63, which are likely to be the preferred configuration, the static bracket 282 is generally U-shaped with the lower end 286 of the static bracket 282 secured to the static support member 94 with a connecting element 302, as best shown in FIGS. 53-55. As also shown in these figures, the upper end 284 of the static bracket 282 has a threaded aperture (not shown) through which a cooperatively configured threaded connecting element 310 is threadably received. A clamping member 312, which also has an aperture (not shown) through which the connecting element 310 passes, is placed below the upper end 284 of the static bracket 282. In use, when the connecting element 310 is tightened by the user, the upper end thereof will abuttingly engage the interior surface of the upper wall 254 of the support rail 252 to cause the upper end 284 of the U-shaped static bracket 282 to press downward against the clamping member 312, which is in abutting relation with the upturned sections 272a/272b, to clamp the static bracket 282 to the support rail 252, as best shown in FIGS. 53-54, to hold the static container support assembly 248 securely in place to provide the stationary component for the new apparatus 10. As set forth above, during use of apparatus 10 the dynamic container support assembly 90 moves toward and away from the static container support assembly 248.

As set forth above, the dynamic container support assembly 90 is structured and arranged to move inward and outward relative to the container space 92 to, respectively, either engage and hold the container 14, by one of the lips 44/46 thereof (as shown in FIGS. 54 and 60), in the container space 92 or for removal of the container 14 from the apparatus 10 and/or placement of a wider or longer container 14 in the container space 92. To accomplish the objectives of engaging a lip 44/46 of the container 14 and moving inward and outward relative to the container space 92, the dynamic container support assembly 90 comprises a dynamic support 100 that is structured and arranged to removably engage and secure the container 14 in apparatus 10. The dynamic support 100 has an elongated dynamic support member 314 with a lip engaging member 316 attached thereto or integral therewith that is sized and configured to engage one of the lips 44/46 of storage container 14, a moving mechanism 142 that allows the dynamic support member 314 to move relative to the support rail 252 and a biasing mechanism 108 that bias the dynamic support member 314, with its lip engaging member 316, into the container space 92 and against the storage container 14 (when the apparatus 10 is being utilized to hold the storage container 14). As with the other components of the apparatus 10, the dynamic support 100 of the present embodiment can be made out of metal, plastic, fiberglass, composites or other materials that, among other factors, are selected to be appropriate for the weight of the containers 14 and the items that are stored therein.

In addition to the elongated dynamic support member 314 and lip engaging member 316, the dynamic support 100 comprises a dynamic bracket 318 that interconnects the dynamic support member 314 and the moving mechanism 142. As a result of the dynamic bracket 318, the lip engaging member 316 will move inward and outward with the movement of the moving mechanism 142, which as set forth in more detail below, moves inward in response to the biasing mechanism 108 or outward in response to the user overcoming the biasing force of the biasing mechanism 108. The dynamic bracket 318 is connected to or integral with both the lip engaging member 316 and the moving mechanism 142. In one configuration of the fourth embodiment, the dynamic support member 314 is an L-shaped member having the lip engaging member 316 as the horizontal portion and a vertical member 320 as the vertical portion, as best shown in FIGS. 39, 41, 44, 46-47, 53-54, 58 and 60. The dynamic support member 314 has a first or left end 322 and a second or right end 324, as shown in FIG. 42. The lip engaging member 316 is sized and configured to engage one of the lips 44/46 of the container 14, as shown in FIGS. 54 and 60. In one configuration, lip engaging member 316 is substantially horizontal so as to extend inwardly into the container space 92 to engage a lip, such as second lip 46 as shown in FIGS. 54 and 60, will be positioned on top of the lip engaging member 316 when the container 14 is being pressed against the static container support assembly 248 by the dynamic container support assembly 90. As will be readily appreciated by persons skilled in the relevant art, the lip engaging member 316 can be of a wide variety of different sizes and configurations, such as the L-shaped member shown, a V-shaped member having an upwardly angled portion, a curved or hook-like end and the like that will engage a lip 44/46 of the container 14 to hold one side 16/18 or one end 20/22 thereof. The dynamic support member 314 should have a length (i.e., from its first end 322 to its second end 324) that will be sufficient to safely support the desired containers 14. As with most of the other components of the apparatus 10, the dynamic support member 314 can be made out of a wide variety of materials, with the various components thereof being attached to or integral with each other and attached to or integral with the support rail 252 of mounting section 50.

The dynamic bracket 318 has an upper end 326, which in some configurations is disposed in the interior channel 260, that connects the dynamic bracket 318 to the moving mechanism 142 inside the support rail 252 and a lower end 328 that connects to or is integral with the dynamic support member 314, as best shown in FIGS. 47, 51, 53, 56 and 61. The dynamic bracket 314 shown in the figures comprises an upper support member 330 at the upper end 326, a lower support member 332 at the lower end 328 and a vertically disposed connecting member 334 that interconnects the upper 330 and lower 332 support members, as best shown in FIGS. 51 and 62, that together form a generally U-shaped dynamic bracket 318. In the configurations shown in the figures, the upper support member 330 of the dynamic bracket 318 is connected to the moving mechanism 142 with a bolt, screw or other connecting element 336, as best shown in FIGS. 55 and 62, and the lower support member 332 is connected to the dynamic support member 314 with a bolt, screw or other connecting element 338, as best shown in FIGS. 42, 45-47, 53-54, 56 and 61-62. In these configurations, the connecting element 336 passes through aperture 340 in the upper support member 330 to connect to the moving mechanism 142. The connecting element 338 passes through the aperture 342 in the lower support member 332 to connect to the dynamic support member 314. In alternative configurations of the fourth embodiment of the apparatus 10 of the present invention, one or more of the various components described above are integrally formed or fixedly attached to each other by welding, adhesives or other means appropriate for the materials that are selected for such components. As set forth below, however, in a preferred configuration, the components are easily disassembled so the apparatus 10 can be easily stored and shipped.

In the first and second configurations of the new apparatus 10 of the present invention, the moving mechanism 142 of the fourth embodiment has four track engaging devices 212, as best shown in FIG. 52. In these configurations, the track engaging devices 212, which are rotatably attached to a mechanism frame 344 utilizing appropriately configured axles, bearings or the like, are sized and configured to moveably engage the track 214 associated with the support rail 252. In the embodiment shown in the figures for the fourth embodiment, the track engaging devices 212 are sized and configured to rotatably engage the upper end of the upturned sections 272a/272b that form the track 214 inside the interior channel 260 of the support rail 252, as best shown in FIGS. 42, 53-54 and 56. The moving mechanism 142 should be cooperatively sized and configured with the channel height 374 (which is the distance between the top of the track 214 and the interior surface of the upper wall 254 of the support rail 252) to prevent the moving mechanism 142 from tilting forward or rearward while moving along the track 214. In the first and second configurations of the fourth embodiment, the track engaging devices 212 are sized and configured to be slightly less or even substantially the same as the channel height 374. As set forth above, moving mechanism 142 connects to the dynamic bracket 318. In the figures, the mechanism frame 344 is connected to the upper support member 330 with the connecting element 336. Alternatively, the mechanism frame 344 may be integrally formed with or fixedly attached to the upper support member 330 of the dynamic bracket 318.

In the third configuration of the fourth embodiment, shown in FIGS. 61-63, the moving mechanism 142 comprises one or more track engaging members 374. In the figures, the track engaging member 372 is a single block material which is selected for its ability to slidably engage the track 214. More specifically, the track engaging member 372 is a block of material that is selected for its ability to slide along the track 214 formed from the pair of upturned sections 272a/272b. In the configuration shown in FIGS. 61-62, the track engaging member 372 is sized and configured to slide along the track 214 inside the interior channel 260 formed by the support rail 252. In one configuration, the block of material that forms the track engaging member 72 has a front end 376, back end 378, left or first side 380, second or right side 382, top side 384 and bottom side 386, as best shown in FIGS. 62-63. In the configuration shown, the track engaging member 372 has a block length that is sized to fit on the upper support member 330 of the dynamic bracket 318, a block width that is sized to closely fit between the inner surfaces of the two sidewalls 256/258 of the support member 252 and a block height that is sized to closely fit between the top of the rail 214 and the inner surface of the upper wall 254 (i.e., channel height 274), as shown in FIG. 61. In the preferred configuration, the size of the block that defines the track engaging member 372 is selected to snugly (but not overly tight) fit in the interior channel 260 of the support member 252 so that it will be able to easily move forward and rearward therein without rocking, tilting or other undesirable movement. The material selected for the track engaging member 372 should be made from a material that can relatively easily slide along the track 214 and do so without incurring significant wear (over time) taking into account the likely uses for the new apparatus 10 and system 12 of the present invention. In one configuration, the track engaging member 372 is made from or comprises a thermoplastic such as Delrin® (acetal homopolymer resin available from DuPont®), which is known for its use in high load mechanical applications due to the material's combination of low friction and high wear resistance with stiffness and strength (which often results in it being used to replace metal components).

The track engaging member 372 has an upper surface 388 at the top side 384 and a lower surface 390 at the bottom side 286, as best shown in FIGS. 62 and 63. The upper surface 388 of the block that forms the track engaging member 372 is provided with a groove 392 along the block length (from front end 376 to back end 378), as shown in FIG. 63, that is sized and configured to allow the track engaging member 372 to easily slide under and past the connectors 60 or other connecting mechanisms 58 that are utilized to secure the apparatus 10 to the area supports 52 without damaging the upper surface 388 of the track engaging member 372. If desired, the groove 392 may be lined with a material selected to reduce the likelihood of damage to the track engaging member 372 from any incidental contact with the connecting mechanism 58 or the upper portion of the block that forms the track engaging member 372 may be made out of different materials. Other configurations for the track engaging member 372 can be used to prevent damage from any contact with the connecting mechanism 58. In one of the preferred configurations, the lower surface 390 of the track engaging member 372 has one or more apertures 394 that are each sized and configured to receive one of the one or more connecting elements 336 that are utilized to hold the track engaging member 372 to the upper support member 330 of the dynamic bracket 318, as shown in FIG. 62.

In the configuration shown in FIGS. 61-63, the second end 348 of the spring 118 attaches to the spring aperture 352 in the upper member 330 of the dynamic bracket 318, as shown in FIGS. 61 and 62. Alternatively, the spring 118 can be attached directly to the track engaging member 372. As set forth above, the upper support member 330 of the dynamic bracket 318 is connected to the track engaging member 372 (of moving mechanism 142) with a bolt, screw or other connecting element 336, as shown in FIG. 62, and the lower support member 332 is connected to the dynamic support member 314 with a bolt, screw or other connecting element 338, as also shown in FIG. 62. Alternatively, the track engaging member 372 may be integrally formed with or fixedly attached (i.e., with an adhesive) to the dynamic bracket 318. In any configuration, the track engaging member 372 is configured to move forwardly and rearwardly along the track 214 so as to move the dynamic bracket 318 forward or rearward to expand or contract the container area 92.

As will be readily appreciated by persons skilled in the relevant art, the moving mechanism 142 of the fourth embodiment can be configured in a wide variety of different manners and utilize a variety of different components as the track engaging devices 212, such as wheels, rollers and the like that move along a track 214 (whether it is disposed inside the support rail 252 as shown in the figures or not) or the track engaging member 372. In addition, the moving mechanism 142 can have less or more track engaging devices 212 than shown in the figures of the fourth embodiment, use a combination of wheels, rollers and/or other devices that can move along the track 214 or be a combination of track engaging devices 212 and track engaging members 372, including along the upturned sections 272 or along outer edges (not shown) of the support rail 252, as shown with regard to the second embodiment. As such, the moving mechanisms 142 shown in the figures are intended to be representative of types of a mechanism that can be utilized with the present invention to allow the dynamic support 100 to move forward and rearward along the length (or most thereof) of the support rail 252 in response to the user or the biasing force of the biasing mechanism 108.

As set forth above, the biasing mechanism 108 of the fourth embodiment of apparatus 10 is utilized to bias the dynamic container support assembly 90 toward the static container support assembly 248 such that when a storage container 14 is in the container space 92, the container 14 will be engaged by the dynamic support member 314 of the dynamic container support assembly 90 and the static support member 94 of the static container support assembly 248 to securely hold the container 14 in the apparatus 10. As shown in FIG. 60, the apparatus 10 will suspend the container 14 below the area supports 52 such that the bottom wall 36 of the container 14 is disposed in spaced apart relation to a lower surface 250, such as a floor, ground or the like. In a preferred configuration of the fourth embodiment, the biasing mechanism 108 comprises a spring 118, as best shown in FIGS. 45, 47, 53-54, 58 and 60. The biasing mechanism 108 is sized and configured to be disposed generally inside interior channel 260 and to interconnect a stationary component, such as static container support assembly 248 or support rail 252, and a moveable component of the dynamic container support assembly 90. The biasing mechanism 108 has a first end 346 that connects to the stationary component and a second end 348 that connects to the moveable component, as shown in the partially exploded view of FIG. 47. In the configuration shown in the figures, the first end 346 of the spring 118 connects to a spring aperture 350 in the upper wall 254 of the support rail 252 and the second end 348 of the spring 118 connects to a spring aperture 352 in the upper support member 330 of the dynamic bracket 318, as best shown in FIGS. 43, 47-48, 51 and 54. The spring 118, or other biasing mechanism 108, should be selected so as to have sufficient biasing force to press the lip engaging member 316 of the dynamic support 100 tightly against the wall 28/30/32/34 of the storage container 14 and maintain the pressure at the lip 44/46 of the container 14 with sufficient force to hold the storage container 14 in place in the container space 92 without crushing or otherwise damaging the container 14. In addition, the spring 118 or other biasing mechanism 108 should not have a biasing force that is so strong that it is difficult for the typical person who will be placing or removing the container 14 into or from the container space 92 to move the dynamic support 100 in a direction away from the static container support assembly 248 so as to expand the container space 92 for a container 14.

In the first, second and third embodiments of the apparatus 10 of the present invention, the mounting section 50 comprises a separate upper frame 62 that interconnects the container engaging section 48 and the area support 52. In the configurations of these embodiments shown in the figures, mounting section 50 is structured and arranged to hold multiple containers 14 in a parallel disposed arrangement. In the fourth embodiment, the apparatus 10 can comprise a plurality of support rails 252 mounted to an upper frame 62, with each support rail 252 having the static container support assembly 248 and dynamic container support assembly 90 associated therewith for a parallel arrangement of storing a plurality of storage containers 14. In a preferred configuration, however, the apparatus 10 of the fourth embodiment is configured for a linear or an end-to-end arrangement of apparatuses 10, as shown in FIGS. 58 and 59, to receive and store a plurality of storage containers 14.

In the configuration of the fourth embodiment shown in FIGS. 39-52, each support rail 252 has an insert area 306 at the first end 266 of the support rail 252 and an extension section 308 at the second end 268 of the support rail 252, as best shown in FIGS. 39, 41 and 43-49. The insert area 306 and extension section 308 are cooperatively sized configured such that the extension section 308 of a first apparatus 10*b* securely fits inside the insert area 306 of a second apparatus 10*b* (with the first 10*a* and second 10*b* apparatuses shown in FIGS. 58 and 59 with regard to the configuration of the fourth embodiment of FIGS. 53-60) and so on until the user has a sufficient number of apparatuses 10 connected in a row for the desired amount of storage containers 14. During installation, the user will install the first apparatus 10*a*, by securely attaching the support rail 252 thereof to the area supports 52 using one or more connecting mechanisms 58, such as bolts, screws or other connectors 60. After the first apparatus 10*a* is installed, the user merely has to slide the extension section 308 of second apparatus 10*b* into the insert area 306 of first apparatus 10*a* (or slide the insert area 306 of the second apparatus 10*b* over the extension section 308 of the first apparatus 10*a*) and then securely attach the second apparatus 10 to the area supports 52.

For the configuration of the fourth embodiment shown in FIGS. 53-63, a first apparatus 10*a* is connected to a second apparatus 10*b* utilizing a differently configured joining mechanism 354 (with the insert area 306 and extension section 308 comprising the above-described joining mechanism 354). In this configuration, the joining mechanism 354 for substantially end-to-end joining of a first apparatus 10*a* and a second apparatus 10*b* comprises one or more joining apertures 356 at each end 266/268 of the support rail 252 of the apparatuses 10*a*/10*b* and a joining member 358 that is cooperatively sized and configured with the joining apertures 356 to fit through the support rail 252 and join two apparatuses 10*a*/10*b* together. More specifically, each apparatus 10*a*/10*b* has one or more first joining apertures 356*a* at or generally near the first end 266 of the support rail 252 and one or more second joining apertures 356*b* at or generally near the second end 268 of the support rail 252, as best shown in FIGS. 53-54, 58 and 61. In the configurations shown in the figures, each of the first/left sidewall 256 and the second/right sidewall 258 have a first joining aperture 356*a* near the first end 266 thereof and a second joining aperture 356*b* near the second end 268 thereof. In one of the preferred configurations of the joining mechanism 354, best shown in FIG. 57, the joining member 358 is generally U-shaped with a pair of outwardly extending arms 360 and 362 that are sized and configured to fit through the joining apertures 356, with each arm 360/362 having an arm aperture 364 through which a securing member 366 is inserted to secure the joining member 358 to the two support rails 252 of the adjacent apparatuses 10*a*/10*b*, as shown in FIGS. 58 and 59. The securing member 366 can be a pin-shaped member having a relatively thin or narrow elongated section 368 that fits through the arm apertures 364 in the two arms 360 of the joining member 358 and an enlarged section 370 that prevents the securing member 366 from passing entirely through the arm apertures 364. The use and configuration of such securing devices, as well as generally similar or equivalent devices, are generally well known in the art. In the configuration shown in FIGS. 58 and 59, the joining member 358 is inserted through the joining apertures 356*b* at the second end 268 of the support rail 252 of a first apparatus 10*a* and the joining apertures 356*b* at the first end 266 of the support rail 252 of a second apparatus 10*b* to connect the two apparatuses 10*a*/10*b* in a generally linear or end-to-end manner.

As will be readily appreciated by persons skilled in the art, a wide variety of differently configured joining mechanisms 354 can be utilized to secure the support rail 252 of a first apparatus 10*a* to the support rail 252 of a second apparatus 10*b* in the linear manner described above or to otherwise connect two apparatuses 10*a*/10*b* together. As will also be readily appreciated by persons skilled in the art, two apparatuses 10*a*/10*b* can be placed in an end-to-end or linear configuration without utilizing any joining mechanism 254. One benefit of utilizing joining mechanism 354, however, is with regard to installing multiple apparatuses 10 of the present invention so the user can support multiple storage containers 14. Without the joining mechanism 354, the user has to position and hold each of the apparatuses 10 and use one or more connecting mechanisms 58 to secure each apparatus 10 to the area supports 52. With the joining mechanism 354, specially the joining mechanism 354 of the configuration shown in FIGS. 53-60, once the first apparatus 10a is secured in place, the second apparatus 10b is very easy to install. More particularly, once the user secures the first apparatus 10a to the area supports 52, all he or she has to do is to place the second apparatus 10b in an end-to-end position and then insert the arms 360/362 of the joining member 358 through the joining apertures 356 of the two adjacent support rails 252 to hold the second apparatus 10b in place while he or she uses a connecting mechanism 58 to secure the second apparatus 10b to the area supports 52. Preferably, the joining member 358 will be made out of materials and sized to be sufficiently strong enough to support the weight of the second apparatus 10b while it "hangs" from an end 266/268 of the support rail 252 of the first apparatus 10a in a hands-free manner. The user will be able to very easily install the connecting mechanism 58 to secure the second apparatus 10b in place. This is likely to be one of the major benefits of the fourth embodiment of the present invention.

As set forth above, another one of the major benefits of the fourth embodiment of the apparatus 10 of the present invention is that the apparatus 10 is adaptable to being very easy, convenient and likely less expensive to store and ship. In the preferred configuration of the apparatus 10 of the fourth embodiment, the various components are connected together using screws, bolts and other devices that make it easy to assemble and disassemble the apparatus 10. In addition, the components of the static container support assembly 248 and the dynamic container support assembly 90 are sized and configured such that when the apparatus 10 is disassembled, all of these components will fit inside the interior channel of the support rail 252. In effect, therefore, when the apparatus is in its disassembled condition it will be no larger, or not much larger, than the size of the support rail 252. As will be readily appreciated by persons skilled in the relevant art, this will make it much easier and likely less expensive for the manufacturer, distributor or others to ship the apparatus 10 to a retail location, distribution center and/or an end user. In addition, the much smaller disassembled apparatus 10 will be much easier for the manufacturer, distributor, retailer and user to store (taking less space) and handle when the apparatus 10 is not in use.

As will be readily appreciated by persons skilled in the relevant art, the various components of the static container support assembly 248 and dynamic container support assembly 90 set forth above can be modified in a wide variety of different manners and still accomplish the objects of the apparatus 10 and system 12 of the present invention. For instance, although the ability of the components to easily disconnect from each other has certain advantages with regard to storing and shipping the present invention (as set forth above), these components may be fixedly connected, such as by welding or the like, or integrally formed and still accomplish the desired objectives.

Although the features described above are shown with regard to the fourth embodiment of the apparatus 10 and system 12 of the present invention, persons skilled in the art will readily appreciate that some or all of these features may also be incorporated into the apparatus 10 or system 12 of the first, second and/or third embodiments of the present invention.

To store storage containers 14 in the apparatus 10, the user places the bottom of one of the container lips, such as second lip 44, alongside the length of the lip engaging device 102 or lip engaging member 316 of the dynamic support 100 and applies pressure, via the container 14, to push the dynamic support 100 rearward to increase the area in the container space 92 to open a gap larger than the width W of the container 14. For the first embodiment (FIGS. 3-14), pushing the lip engaging device 102 rearward pushes against the insert member 104 and biasing member 108 of the dynamic support 100 to move the inset member 104 rearward in the tubular receiving member 106 to increase the amount of space in the container space 92. With regard to the second embodiment (FIGS. 15-22), pushing the lip engaging device 102 rearward pushes the moving mechanism 142 that is associated with a dynamic support 100 rearward along the transverse frame members 68/70/71 and extends the spring 118. For the third embodiment (FIGS. 23-38), pushing lip engaging device 102 rearward moves the moving mechanism 142 associated with a dynamic support 100 rearward along its dynamic support rail assembly 202 to extend (i.e., un-retract) the elongated member 210 outward from retractable cable wheel 208. For the fourth embodiment (FIGS. 39-60), pushing the dynamic support member 314 rearward moves the moving mechanism 142 associated and the dynamic support 100 rearward along track 214 associated with the support rail 252 (e.g., along the upturned sections 272a/272b inside the interior channel 260 of the support rail 252). Once the container 14 is positioned in the container space 92, the person allows the biasing mechanism 108 to push or pull the lip engaging device 102 or dynamic support member 314 and the container 14 toward the static container support member 88 or static container support assembly 248 until the lip engaging member 98 thereof engages the container 14 just below the first lip 44 thereof, thereby placing the apparatus 10 in its second/container storage position 264. At that point, the width of the container space 92 will be slightly larger (very little) than the width W of the storage container 14, but smaller than the width at the lips 44/46, allowing the lip engaging member 98 of the static container support member 88 and the lip engaging device 102 or lip engaging member 316 of the dynamic container support assembly 90 to support the container 14 by its lips 44/46 in the container space 92 to removably store the storage container 14 in the apparatus 10. The bottom surface of the container lips 44/46 will be resting on the upper surface of the lip engaging member 98 and the lip engaging device 102 or lip engaging member 316, with the remaining portion of the container body 15, which will be most of the container 14, hanging below the apparatus 10. As shown in FIG. 60, the bottom wall 36 of the container 14 will be in spaced apart relation to the floor, ground or other lower surface 250. To remove a container 14, the person merely pushes the storage container 14 against the lip engaging device 102 or dynamic support member 314 of the dynamic support 100 to overcome the biasing force of the biasing mechanism 108 and increase the width of the container space 92. The person then takes the container lips 44/46 off of the lip engaging member 98 and the lip engaging device 102 or lip engaging member 316 to remove the container 14 from the apparatus 10. The biasing force of the biasing mechanism 108 will push or pull the components of the dynamic support 100 back into the container space 92, placing the apparatus 10 in its first/biased position 262.

The apparatus 10 and system 12 of the present invention make it easier and more efficient to organize containers 14 in a garage, shed, room, closet, storage area, warehouse or other area where such containers 14 will be stored, particularly for items stored therein that are only occasionally utilized. Specifically, the apparatus 10 and system 12 of the present invention allow a person to better organize the storage of containers 14 by utilizing previously unutilized/ underutilized or inconveniently or inefficiently used space below the ceiling 56 or roof above a lower surface 250 in the area. The new apparatus 10 and system 12 allow the person to easily, quickly and efficiently place, store and retrieve storage containers 14. As set forth above, the apparatus 10 is configured to allow a person to retrieve a storage container 14 from any place in the container space 92 between the dynamic support(s) 100 of the dynamic container support assembly 90 and the static container support member 88 or static container support assembly without having to move additional storage containers 14. Unlike prior art storage container organizers, particularly the I-beam type, the apparatus 10 of the present invention does not require an open end to slide the containers 14 onto the spaced apart flanges of the apparatus 10. Instead, a storage container 14 can be placed into the apparatus 10 at any location where there is an empty spot in the container space 92. Because there is no need to measure the containers 14 and it is not necessary to carefully position the opposing I-beams, for the prior art system, the apparatus 10 and system 12 are much easier to install and use than prior art apparatuses and systems for storing storage containers 14.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A container storage apparatus for storing a storage container below one or more area supports, the storage container having a container body with a first lip extending outward from a first sidewall and a second lip extending outward from a second sidewall disposed in opposing relation to the first sidewall, said apparatus comprising:

a mounting section comprising an elongated support rail structured and arranged to attach said apparatus to at least one of the one or more area supports, said support rail having an upper wall defining an upper mounting surface configured to be attached to at least one of the one or more area supports so as to position said support rail below the area supports; and a container engaging section attached to or integral with said mounting section, said container engaging section structured and arranged to engage the container body so as to position the storage container in a container space of said container engaging section, said container engaging section comprising a static container support assembly and a dynamic container support assembly, said static container support assembly attached to or integral with said support rail, said dynamic container storage assembly having a dynamic support moveably engaged with said support rail in spaced apart relation to said static container support assembly so as to define said container space therebetween, said static container support assembly having an elongated static support member disposed perpendicular to said support rail and structured and arranged to be positioned under and engagedly support the first lip of the storage container, said dynamic support having an elongated dynamic support member disposed perpendicular to said support rail parallel to said static support member and structured and arranged to be positioned under and engagedly support engage the second lip of the storage container so as to support the storage container in said container space below said support rail.

2. The apparatus of claim 1, wherein said dynamic support comprises a biasing mechanism, said biasing mechanism interconnecting said dynamic support member and one of said support rail and said static container support assembly so as to bias said dynamic support toward said static container support assembly, said dynamic support member moveably supported on said support rail so as to be biased by said biasing mechanism toward said static container support assembly to engage and support the storage container therebetween.

3. The apparatus of claim 2, wherein said static container support assembly has a lip engaging member attached to or integral with said static support member sized and configured to engagedly support the first lip of the container body and said dynamic support member has a lip engaging member sized and configured to engagedly support the second lip of the container body to securely hold the storage container between said lip engaging member of said static container support assembly and said lip engaging member of said dynamic support member so as to removably support the storage container in said container space.

4. The apparatus of claim 1, wherein said support rail has one or more sidewalls extending at least generally between a first end of said support rail and a second end of said support rail to define an interior channel in said support rail and said dynamic support has a moving mechanism connected to said dynamic support member, said moving mechanism being sized and configured to be disposed in and move through said interior channel and engage said support rail so as to allow said dynamic support to move along said support rail.

5. The apparatus of claim 4, wherein said moving mechanism is cooperatively sized and configured with said support rail so as to move in said interior channel of said support rail without tilting said dynamic support member.

6. The apparatus of claim 5, wherein said support rail has a track disposed in said interior channel thereof so as to define a channel height between said track and said upper wall of said support rail with said moving mechanism being structured and arranged to engage said track and substantially fill said channel height while moving along said track in said interior channel so as to prevent tilting of said dynamic support member.

7. The apparatus of claim 6, wherein said moving mechanism comprises one of a track engaging member and one or more track engaging devices rotatably mounted on a frame, with said track engaging member and said track engaging devices being sized and configured to at least substantially extend between said track and said upper wall of said support rail when moving said dynamic support along said support rail.

8. The apparatus of claim 7, wherein said track engaging devices comprise one or more wheels and said track engaging member is a block.

9. The apparatus of claim 1, wherein said static support member has a lip engaging member sized and configured to be positioned under and engagedly support the first lip of the storage container.

10. The apparatus of claim 1, wherein said static container support assembly further comprises a static bracket interconnecting said static support member and said support rail.

11. The apparatus of claim 10, wherein said static bracket has an upper end structured and arranged to be secured to said support rail by one of a connector received through an aperture in a sidewall of said support rail and a connecting element sized and configured to clamp said upper end to said support rail.

12. The apparatus of claim 1, wherein said apparatus is defined as a first apparatus and said support rail of said first apparatus comprises a joining mechanism that is structured and arranged to connect said first apparatus in an end-to-end manner to a second apparatus having a support rail with a joining mechanism cooperatively configured with said support rail of said first apparatus.

13. The apparatus of claim 12, wherein said joining mechanism comprises a first joining aperture in opposing sidewalls of said support rail of said second apparatus at or near a first end of said second apparatus, a second joining aperture in opposing sidewalls of said support rail of said first apparatus at or near a second end of said first apparatus and a U-shaped joining member sized and configured to be received through each of said first joining aperture and said second joining aperture to connect said support rail of said second apparatus to said support rail of said first apparatus, said U-shaped joining member having a first arm and a second arm that are each sized and configured to extend through said opposing walls of said support rails.

14. A container storage apparatus for storing a storage container below one or more area supports, the storage container having a container body with a first lip extending outward from a first sidewall and a second lip extending outward from a second sidewall disposed in opposing relation to the first sidewall so as to position the first lip parallel to the second lip, said apparatus comprising:
a mounting section comprising an elongated support rail structured and arranged to attach said apparatus to at least one of the one or more area supports, said support rail having an upper wall defining an upper mounting surface configured to be attached to at least one of the one or more area supports so as to position said support rail below the area supports; and
a container engaging section attached to or integral with said mounting section, said container engaging section structured and arranged to engage the container body so as to position the storage container in a container space of said container engaging section, said container engaging section having a static container support assembly and a dynamic container support assembly, said static container support assembly comprising an elongated static support member attached to or integral with said support rail so as to be disposed perpendicular to said support rail, said static support member having a lip engaging member sized and configured to be placed under and engagedly support the first lip of the storage container when the storage container is in said container space, said dynamic container storage assembly comprising a dynamic support moveably engaged with said support rail in spaced apart relation to said lip engaging member of said static container support assembly so as to define said container space therebetween, said dynamic support comprising a biasing mechanism and an elongated dynamic support member, said dynamic support member disposed perpendicular to said support rail so as to be parallel to said static support member, said biasing mechanism interconnecting said dynamic support member and one of said support rail and said static container support assembly so as to bias said dynamic support toward said static container support assembly, said dynamic support member moveably supported on said support rail so as to be biased by said biasing mechanism toward said static container support assembly, said static container support assembly and said dynamic container support assembly structured and arranged to support the storage container in said container space below said support rail by engaging the first lip of the storage container with the static support member and the second lip of the storage container with the dynamic support member.

15. The apparatus of claim 14, wherein said dynamic support member has a lip engaging member sized and configured to be positioned under and engagedly support the second lip of the container body to securely hold the storage container between said lip engaging member of said static container support assembly and said lip engaging member of said dynamic support member so as to removably support the storage container in said container space.

16. The apparatus of claim 14, wherein said support rail has one or more sidewalls extending at least generally between a first end of said support rail and a second end of said support rail to define an interior channel in said support rail and said dynamic support has a moving mechanism connected to said dynamic support member, said moving mechanism being sized and configured to be disposed in and move through said interior channel and engage said support rail so as to allow said dynamic support to move along said support rail.

17. The apparatus of claim 16, wherein said moving mechanism is cooperatively sized and configured with said support rail so as to move in said interior channel of said support rail without tilting said dynamic support member.

18. The apparatus of claim 17, wherein said support rail has a track disposed in said interior channel thereof so as to define a channel height between said track and said upper wall of said support rail with said moving mechanism being structured and arranged to engage said track and substantially fill said channel height while moving along said track in said interior channel so as to prevent tilting of said dynamic support member.

19. A container storage apparatus for storing a storage container below one or more area supports, the storage container having a container body with a first lip extending outward from a first sidewall and a second lip extending outward from a second sidewall disposed in opposing relation to the first sidewall so as to position the first lip parallel to the second lip, said apparatus comprising:
a mounting section comprising an elongated support rail structured and arranged to attach said apparatus to at least one of the one or more area supports, said support rail having a plurality of walls defining an interior channel in said support rail, said plurality of walls of said support rail comprising an upper wall defining an upper mounting surface and one or more sidewalls, said upper mounting surface configured to be attached to at least one of the one or more area supports so as to position said support rail below the area supports; and
a container engaging section attached to or integral with said mounting section, said container engaging section structured and arranged to engage the container body so as to position the storage container in a container space of said container engaging section, said container engaging section having a static container support assembly and a dynamic container support assembly, said static container support assembly comprising an elongated static support member attached to or integral with said support rail, said static support member having a lip engaging member disposed perpendicular to said support rail, said lip engaging member sized and configured to be positioned under and engagedly support the first lip of the storage container when the storage container is in said container space, said dynamic container storage assembly comprising a dynamic support moveably engaged with said support rail in spaced apart relation to said lip engaging member of said static container support assembly so as to define said container space therebetween, said dynamic support comprising a biasing mechanism, a moving mechanism and an elongated dynamic support member, said biasing mechanism interconnecting said dynamic support member and one of said support rail and said static container support assembly so as to bias said dynamic support toward said static container support assembly, said moving mechanism integral with or connected to said dynamic support member and sized and configured to be disposed in and move through said interior channel and engage said support rail so as to allow said dynamic support to move along said support rail when biased by said biasing mechanism toward said static container support assembly, said dynamic support member having a lip engaging member disposed perpendicular to said support rail so as to be parallel to said lip engaging member of said static support member, said lip engaging member of said dynamic support member sized and configured to be positioned under and engagedly support the second lip of the storage container when the storage container is in said container space, each of said static container support assembly and said dynamic container support assembly structured and arranged to support the storage container in said container space below said support rail by engaging the first lip of the storage container with said static support member and the second lip of the storage container with said dynamic support member.

20. The apparatus of claim 19, wherein said support rail has a track disposed in said interior channel of said support rail and said moving mechanism is cooperatively structured and arranged with said interior channel of said support rail so as to move in said interior channel while engaging said track so as to move along said track in said interior channel without tilting said lip engaging member of said dynamic support member.

21. A container storage system, comprising:
one or more area supports;
a storage container having a container body with a first lip extending outward from a first sidewall and a second lip extending outward from a second sidewall disposed in opposing relation to said first sidewall; and
a container storage apparatus having a mounting section to mount said apparatus to said one or more area supports and a container engaging section attached to or integral with said mounting section to store said storage container below said one or more area supports, said mounting section comprising an elongated support rail structured and arranged to attach said apparatus to said one or more area supports, said support rail having a plurality of walls defining an interior channel in said support rail, said plurality of walls of said support rail comprising an upper wall and one or more sidewalls, said upper wall configured to be attached to said one or more area supports so as to position said support rail below said area supports, said container engaging section structured and arranged to engage said container body so as to position said storage container in a container space of said container engaging section, said container engaging section having a static container support assembly and a dynamic container support assembly, said static container support assembly comprising an elongated static support member attached to or integral with said support rail so as to be disposed perpendicular to said support rail, said static support member having an elongated lip engaging member sized and configured to be positioned under and engagedly support said first lip of said storage container when said storage container is in said container space, said dynamic container storage assembly comprising a dynamic support moveably engaged with said support rail in spaced apart relation to said lip engaging member of said static container support assembly so as to define said container space therebetween, said dynamic support comprising a biasing mechanism and an elongated dynamic support member, said dynamic support member disposed perpendicular to said support rail so as to be parallel to said static support member, said biasing mechanism interconnecting said dynamic support member and one of said support rail and said static container support assembly so as to bias said dynamic support toward said static container support assembly, said dynamic support member moveably supported on said support rail so as to be biased by said biasing mechanism toward said static container support assembly, said static container support assembly and said dynamic container support assembly structured and arranged to support said storage container in said container space below said support rail by engaging said first lip of said storage container with said static support member and said second lip of said storage container with said dynamic support member.

22. The system of claim 21, wherein said dynamic support has a moving mechanism connected to said dynamic support member, said dynamic support member has a lip engaging member attached to or integral therewith, and said support rail has a track disposed in said interior channel thereof, said moving mechanism cooperatively structured and arranged with said interior channel of said support rail engage said track and move along said track in said interior channel so as to move said dynamic support along said support rail without tilting said lip engaging member of said dynamic support member.

* * * * *